United States Patent [19]
Graham

[11] Patent Number: 5,913,428
[45] Date of Patent: Jun. 22, 1999

[54] VIBRATORY BOWL AND ASSOCIATED PARTS ORIENTING TOOLING WITH PIVOTAL TOP CONFINEMENT

[76] Inventor: S. Neal Graham, 12997 Fawns Ridge, Fishers, Ind. 46038

[21] Appl. No.: 08/904,171

[22] Filed: Jul. 31, 1997

Related U.S. Application Data

[63] Continuation-in-part of application No. 08/800,652, Feb. 4, 1997, which is a continuation-in-part of application No. 08/389,241, Feb. 16, 1995, Pat. No. 5,630,497.

[51] Int. Cl.$^6$ .......................... B07B 13/05; B65G 27/00; B23Q 7/12
[52] U.S. Cl. .......................... 209/676; 198/391; 198/389; 198/380; 221/160
[58] Field of Search .......................... 198/391, 389, 198/380, 757, 756; 221/160, 167; 209/666, 668, 674, 676

[56] References Cited

U.S. PATENT DOCUMENTS

| | | | |
|---|---|---|---|
| 3,031,060 | 4/1962 | Philippovic et al. | 198/757 |
| 3,150,762 | 9/1964 | Tricinci . | |
| 3,295,661 | 1/1967 | Mitchell, Jr. et al. . | |
| 3,474,890 | 10/1969 | Center . | |
| 3,521,735 | 7/1970 | Gallatin . | |
| 3,578,142 | 5/1971 | Burgess, Jr. . | |
| 3,655,028 | 4/1972 | Hodgins | 198/33 |
| 3,907,099 | 9/1975 | Smith . | |
| 3,917,052 | 11/1975 | Burgess | 198/757 |
| 4,148,389 | 4/1979 | Dixon . | |
| 4,206,539 | 6/1980 | Weresch . | |
| 4,436,197 | 3/1984 | MacDonald . | |
| 4,450,948 | 5/1984 | Naito et al. . | |
| 4,453,626 | 6/1984 | Roberts et al. | 198/391 |
| 4,700,827 | 10/1987 | Haaser . | |
| 4,709,798 | 12/1987 | Herzog . | |
| 4,947,982 | 8/1990 | Miyaki . | |
| 5,083,654 | 1/1992 | Nakajima et al. . | |
| 5,191,960 | 3/1993 | Wareham . | |

*Primary Examiner*—William E. Terrell
*Assistant Examiner*—Joe Dillon, Jr.
*Attorney, Agent, or Firm*—Woodard, Emhardt, Naughton, Moriarty & McNett

[57] ABSTRACT

A vibratory bowl defines a number of predetermined attachment locations in one side thereof adjacent to a parts discharge port defined by the bowl. One or more support plates are detachably mounted to the bowl side in a vertical position via the number of predetermined attachment locations, and each of the one or more support plates defines a horizontal support edge having a parts receiving unit detachably mounted thereto. The parts receiving unit is supported by the one or more support plates and has one end thereof positioned adjacent to the parts discharge port of the bowl and an opposite end extending away from the discharge port. The parts receiving unit may be configured to orient parts supplied by the vibratory bowl according to a desired orientation. A parts confining member is detachably mounted to one of the one or more support plates and is operable to confine parts within the parts receiving unit. The bowl may have a counterweight structure attached to, or contained within, a side of the bowl adjacent to the parts receiving unit, and may further have a portion of an inner surface thereof extending into a helical parts path defined within the vibratory bowl.

32 Claims, 39 Drawing Sheets

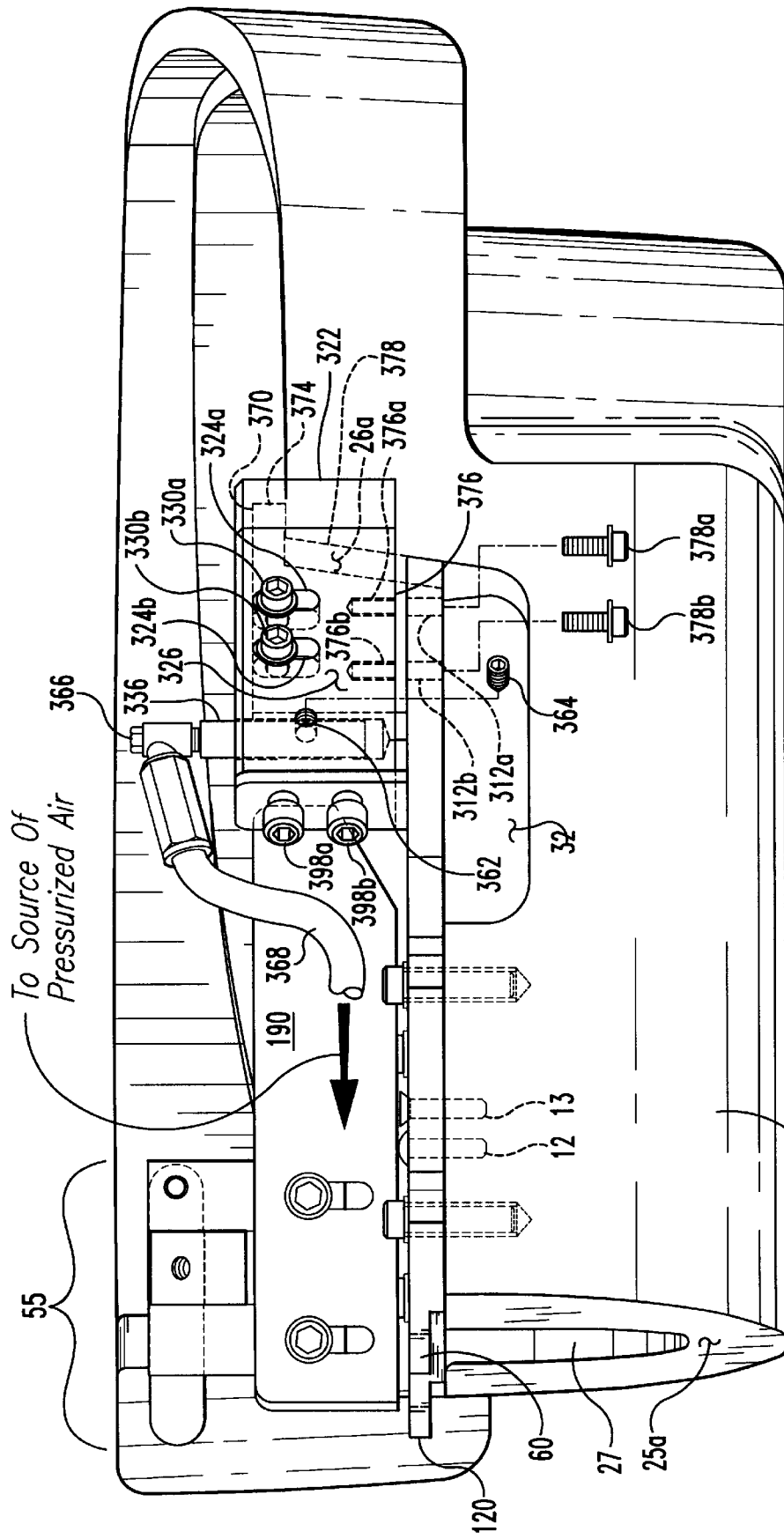

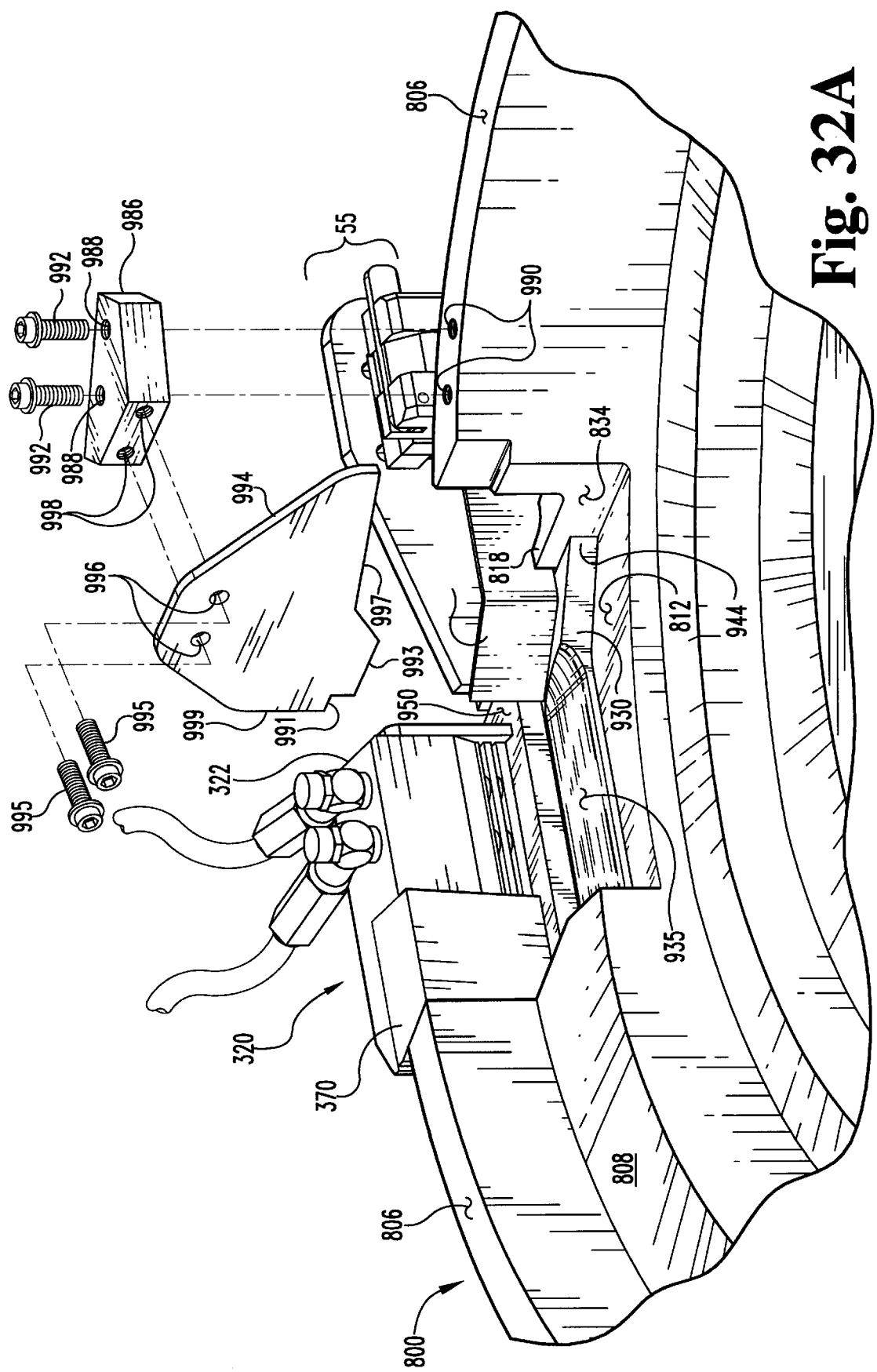

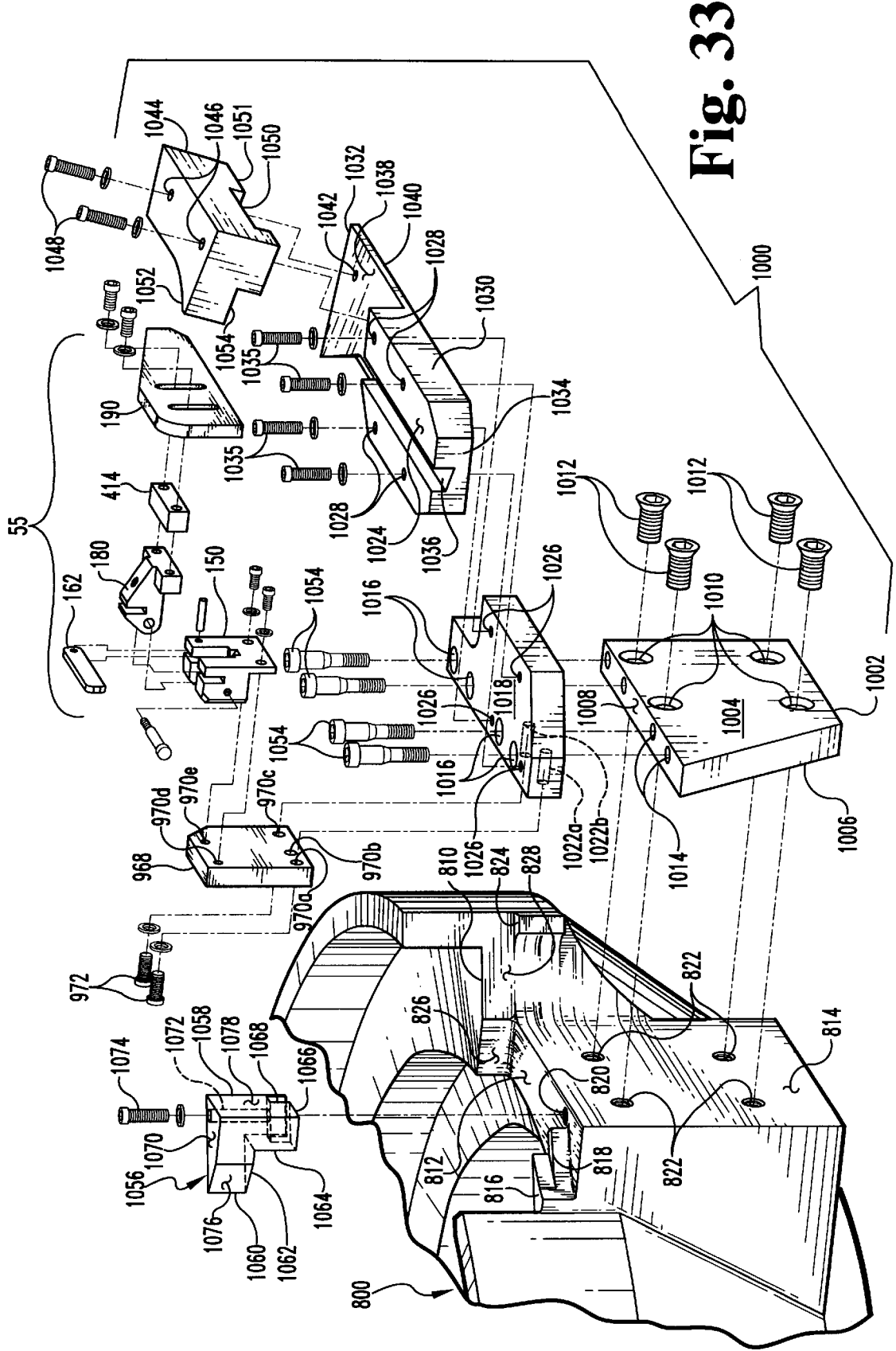

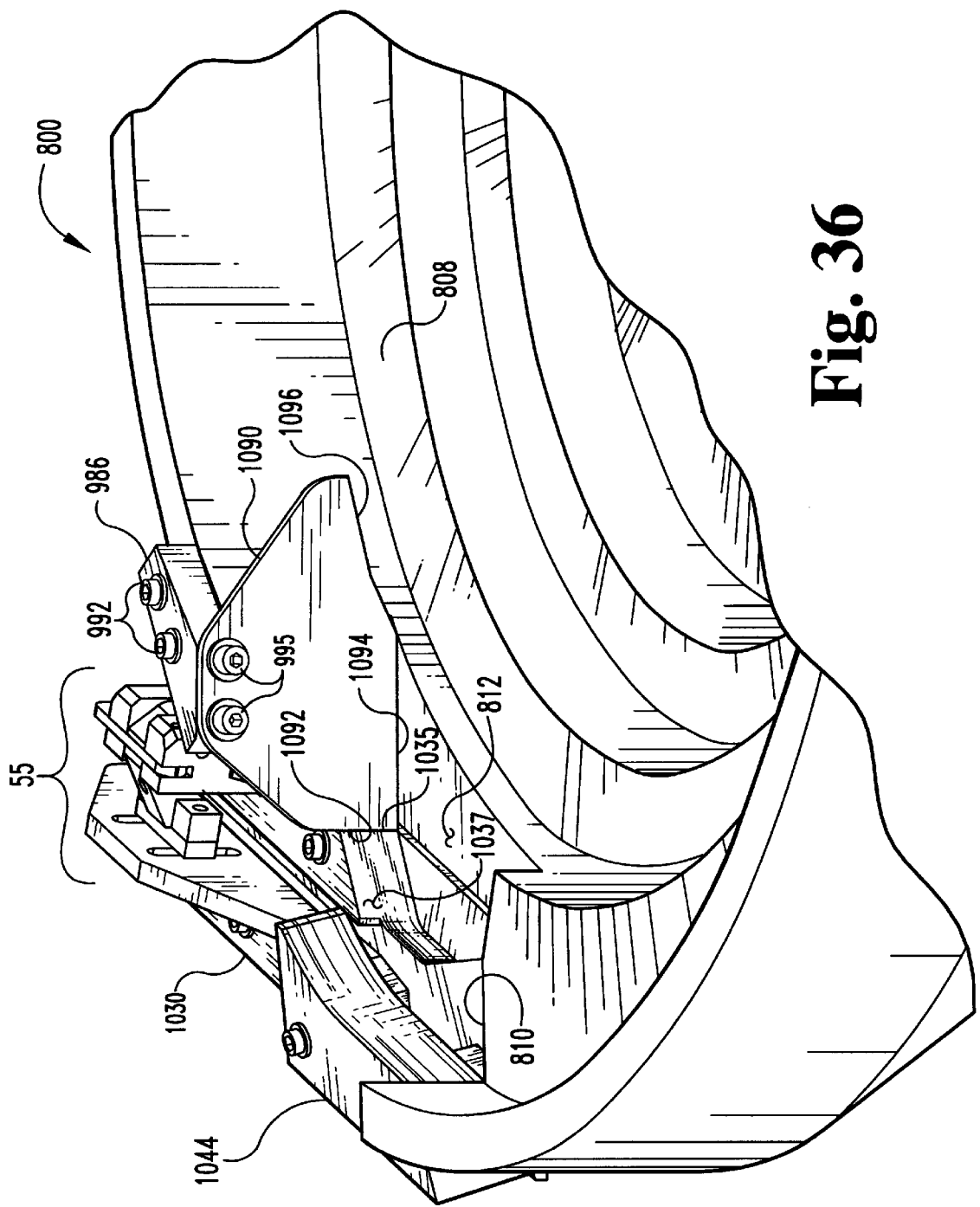

VIBRATORY BOWL AND ASSOCIATED PARTS ORIENTING TOOLING WITH PIVOTAL TOP CONFINEMENT

CROSS-REFERENCE TO RELATED APPLICATIONS

The present application is a continuation-in-part of application Ser. No. 08/800,652, filed Feb. 4, 1997, and entitled CONFINEMENT TOOLING FOR A VIBRATORY PARTS FEEDER, which is a continuation-in-part of application Ser. No. 08/389,241 filed Feb. 16, 1995, now U.S. Pat. No. 5,630,497, issued May 20, 1997.

FIELD OF THE INVENTION

The present invention generally relates to the field of article feed mechanisms and sorters, and more particularly to vibratory parts feeders.

BACKGROUND OF THE INVENTION

Vibratory parts feeders are commonly known apparata for providing oriented parts from a mass of disoriented parts, or for transporting parts along a processing path. In providing oriented parts, a vibratory parts feeder typically includes a vibratory bowl which is driven by a vibratory drive unit. The bowl is internally configured, typically with a helically oriented path, to transport the parts under vibratory action to a bowl exit location near the top of the bowl.

A variety of mechanisms for orienting the parts are known to be operatively associated with a vibratory bowl apparatus. U.S. Pat. No. 4,436,197, for example, discloses a pair of spaced-apart rails which slope downwardly so that properly oriented parts may slide down the path to the lower section of the track. A gate associated with the track permits only those parts having the desired orientation to continue sliding down the track. U.S. Pat. No. 3,578,142 utilizes a different approach in that the parts transportation path of the bowl is configured to define an adjustable slot for receiving only parts having a particular orientation therein. As the parts are thereafter transported to the exit location near the top of the bowl, the adjustable slot manipulates the parts into the desired orientation.

A common problem associated with serially providing oriented parts from a vibratory bowl is maintaining the orientation of the properly oriented parts under the continuing vibratory action. As a solution to this problem, several vibratory parts feeders utilize some type of top confinement mechanism to minimize further agitation of the oriented parts. For example, U.S. Pat. Nos. 3,907,099, 4,206,539 and 5,191,960 include a downwardly sloped parts track having fixed top surface for confining the orient parts to the track. Other known vibratory parts feeders utilize hinged top confinement structures that are moveable away from their confining positions to thereby allow access to the parts orientation track for clearing jams and performing other maintenance related functions.

Common problems associated with such known hinged confinements include excessive movement of the top confinement mechanism due to inadequate securing of the hinge mechanism, and an adequate lock operable to fixedly position the top confinement member as it is returned to its operating position. Such hinged confinement mechanisms have not gained popularity since, due to the nature of the vibratory action, confinement structures inadequately secured to the vibratory bowl create dead spots and operation inefficiencies that result in fluctuations in feed rate. One solution to the adequate securing problem is disclosed in U.S. Pat. No. 4,700,827 as including a top confinement structure with a series of zero lash hinges at one end and a corresponding series of clasp-type latches at the other. The problem of lack of fixed positioning is not discussed in this reference.

What is therefore needed is a top confinement apparatus that is moveable to permit access to the parts orientation track, but which securely attaches in a repeatably accurate location to the vibratory bowl in its operable position to provide a reliable and accurate top confinement mechanism.

SUMMARY OF THE INVENTION

The present invention overcomes the drawbacks of prior art parts orientation units described in the BACKGROUND section. In accordance with one aspect of the present invention, a parts feeding apparatus for providing oriented parts having common configuration comprises a vibratory bowl configured to receive a disoriented mass of parts therein and transport the parts toward a bowl discharge port under vibratory action, wherein the bowl defines a number of attachment locations therein adjacent the discharge port, a first support plate defining an inside plate surface, an opposite outside plate surface and a first edge surface therebetween, wherein the first support plate defines a first number of bores therethrough from the inside surface to the outside surface thereof aligned with the number of attachment locations, each aligned pair of the first number of bores and the attachment locations adapted to receive a fastener therein for detachably mounting the first support plate to the vibratory bowl, a parts receiving unit detachably mounted to the first edge surface of the support plate, wherein the parts receiving unit is adapted to receive parts having a number of orientations from the discharge port and serially provide the parts with a predefined orientation, and a confining member detachably mounted to the first support plate, wherein the confining member is operable in a first position adjacent the parts receiving unit for confining parts having the predetermined orientation therein.

In accordance with another aspect of the present invention, a parts feeding apparatus for providing oriented parts having common configuration comprises a polycast vibratory bowl configured to receive a disoriented mass of parts therein and transport the parts, under vibratory action, toward a bowl discharge port defined by the bowl, a parts orientation unit mounted to the bowl adjacent the discharge port, wherein the parts orientation unit receives parts from the discharge port and orients the parts according to a predetermined orientation, and a counterweight cast within an area of the vibratory bowl generally opposite the parts orientation unit, wherein the counterweight has a weight approximately equal to a weight of the parts orientation unit.

In accordance with a further aspect of the present invention, a vibratory parts feeder comprises a vibratory bowl having a bottom and a sidewall extending therefrom to an open top, a helical parts path formed adjacent an inner surface of the bowl sidewall, a parts discharge port formed adjacent the open top, wherein the helical parts path is configured to transport parts thereon from within the bowl to the parts discharge port under vibratory action, and wherein a portion of the inner surface of the bowl sidewall extends partially into the helical parts path adjacent the parts discharge port to thereby create a bend in the helical parts path.

One object of the present invention is to provide a vibratory bowl having one or more support plates vertically mounted to a side thereof, wherein the one or more support plates support a parts orientation unit mounted thereto adjacent to a parts discharge port of the bowl and rigidly secure the parts orientation unit to the vibratory bowl.

Another object of the present invention is to provide a vibratory bowl having a parts orientation unit mounted to a side thereof and a counterweight attached to, or integral with, the bowl on a side of the bowl generally opposite to the parts orientation unit to thereby compensate for the weight of the parts orientation unit.

Yet another object of the present invention is to provide a vibratory bowl defining a helical parts path therein for transporting parts thereon to a parts discharge port of the bowl, wherein a portion of the bowl sidewall extends into the helical parts path adjacent to the parts discharge port to thereby relieve back pressure of parts advancing toward the discharge port.

These and other objects of the present invention will become more apparent from the following description of the preferred embodiments.

BRIEF DESCRIPTION OF THE DRAWINGS

FIG. 3A is a cross-sectional view of the pivoting lever taken along section lines 3A—3A of FIG. 3.

FIG. 6A is a cross-sectional view of a portion of the inside parallel blade of the embodiment shown in FIG. 1, taken along section lines 6A—6A of FIG. 6.

FIG. 14a is an assembly drawing illustrating various components of the air supply unit of FIG. 13.

FIG. 14b is an end elevational view of the air supply unit in FIG. 14a.

FIG. 14c is a cross-sectional view of the air supply unit of FIG. 14a taken along section lines 14c—14c thereof.

FIG. 15a is a view similar to that of FIG. 12 showing further details of the air supply unit of FIGS. 13–14c.

FIG. 15b is a view similar to that of FIG. 13 showing further details of the air supply unit of FIGS. 13–15a.

FIG. 32A is a perspective view of the parts orientation tooling and vibratory bowl of FIGS. 29 and 30 showing a parts sweep assembly mountable to the bowl adjacent to the parts orientation tooling.

FIG. 33 is an assembly drawing illustrating another embodiment of parts orientation tooling detachably mountable to the vibratory bowl of FIG. 28, in accordance with yet another aspect of the present invention.

FIG. 36 is a perspective view of the parts orientation tooling and vibratory bowl of FIGS. 33 and 34 showing a parts sweep assembly mounted to the vibratory bowl adjacent to the parts orientation tooling.

DESCRIPTION OF THE PREFERRED EMBODIMENTS

Figure 1:
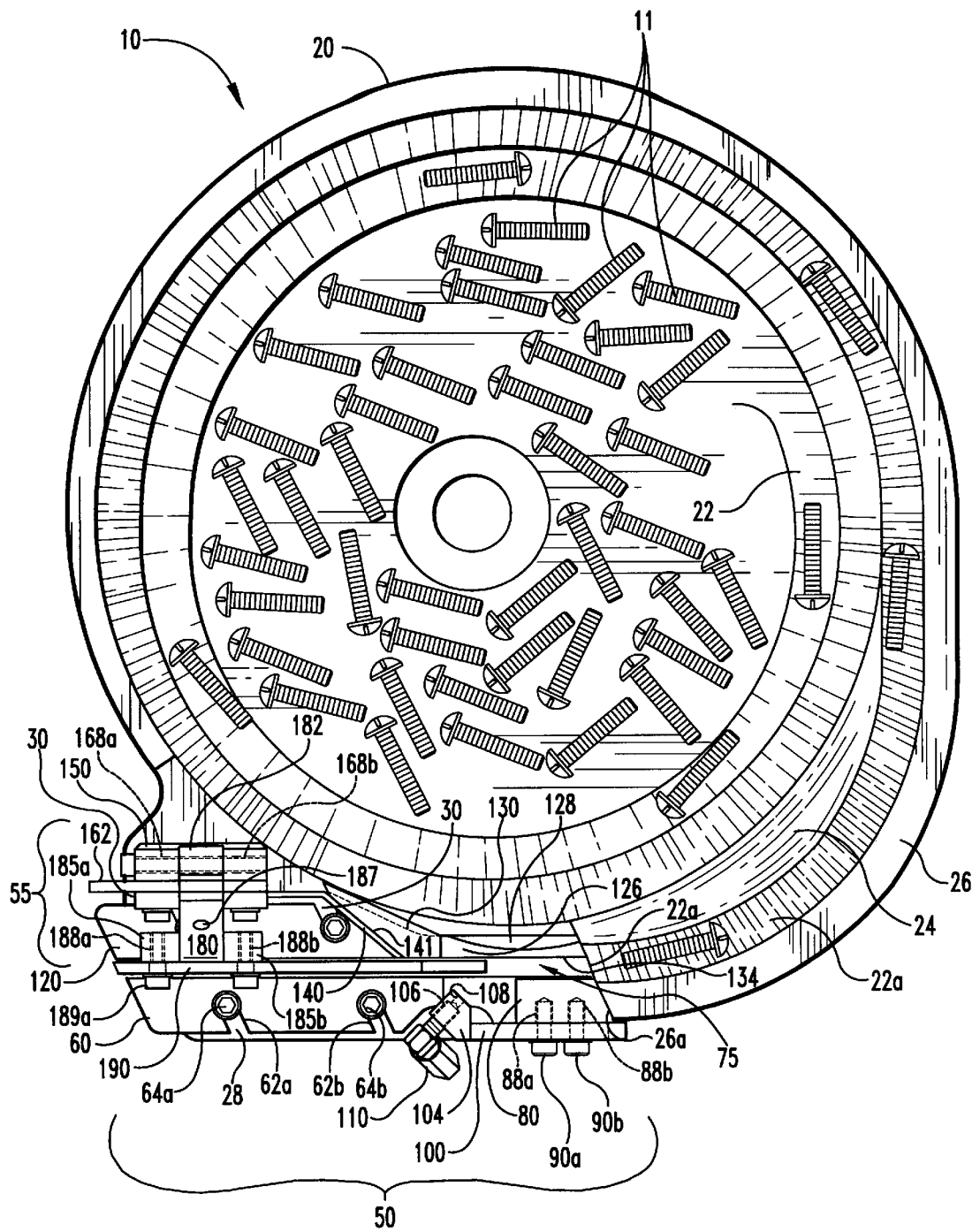
FIG. 1 is a top plan view of a vibratory parts feeder with pivotal top confinement in accordance with one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIGS. 1–4, a vibratory parts feeder for providing oriented headed parts, in accordance with one embodiment of the present invention, is shown. The vibratory parts feeder 10 may be used to orient a variety of headed parts including, for example, screws, nails, bolts, rivets, and the like. The parts feeder 10 generally includes a vibratory bowl 20 having a helical parts track 22 defined therein, and a parts orientation unit 50 which includes a pivotal top confinement apparatus 55.

As is commonly known in the industry, vibratory bowl 20 is actuated by a vibratory drive unit (not shown) to thereby cause disoriented parts 11 contained within the bowl 20 to travel up the helical parts path 22, to a parts discharge port 22a. In a preferred embodiment, vibratory bowl 20 is a polycast bowl, although the present invention contemplates that vibratory bowl 20 may be constructed from other suitable materials such as, for example, stainless steel. As is common with many vibratory bowls, the parts track 22 includes a sloped portion 24 located near the discharge port 22a, so that certain disoriented parts, such as side-by-side or sideways parts, will slide back into the interior of the bowl 20. Additionally, the bowl 20 includes an upper rim 26 which is positioned sufficiently above the parts track 22 to keep the parts from being ejected from the bowl 20 under the vibratory action. Vibratory bowl 20 further defines a parts orientation member 25 extending from the discharge port 22a. Parts orientation member 25 includes surfaces 28, 30, 34, and 36 for mounting the parts orientation unit 50 and pivotal top confinement apparatus 55 thereto.

Parts orientation unit 50 includes a pair of parallel blades 60 and 120 which define an adjustable-width channel 75 therebetween for orienting the headed parts in a manner to be more fully described hereinafter. Outside parallel blade 60 includes a pair of grooves 62a and 62b for adjustably securing the blade 60 to surface 28 of vibratory bowl 20 via threaded screws or bolts 64a and 64b. As most clearly shown in FIG. 2, polycast bowl 20 includes a pair of rigid threaded inserts 42a and 42b molded within the bowl 20 for receiving corresponding threaded screws 64a and 64b. Inserts 42a and 42b are an important aspect of the present invention in that they provide a secure threaded attachment for screws 64a and 64b, and at the same time provide a wear-resistant attachment mechanism for permitting multiple adjustments of blade 60. Preferably, inserts 42a and 42b are made of a wear-resistant metal such as, for example, steel. Parallel blade 60 can thus be adjustably positioned toward and away from parallel blade 120 by loosening screws 64a and 64b and manually adjusting the blade 60. Blade 60 can thereafter be secured to orientation member surface 28 by tightening screws 64a and 64b into threaded inserts 42a and 42b.

Figure 3:
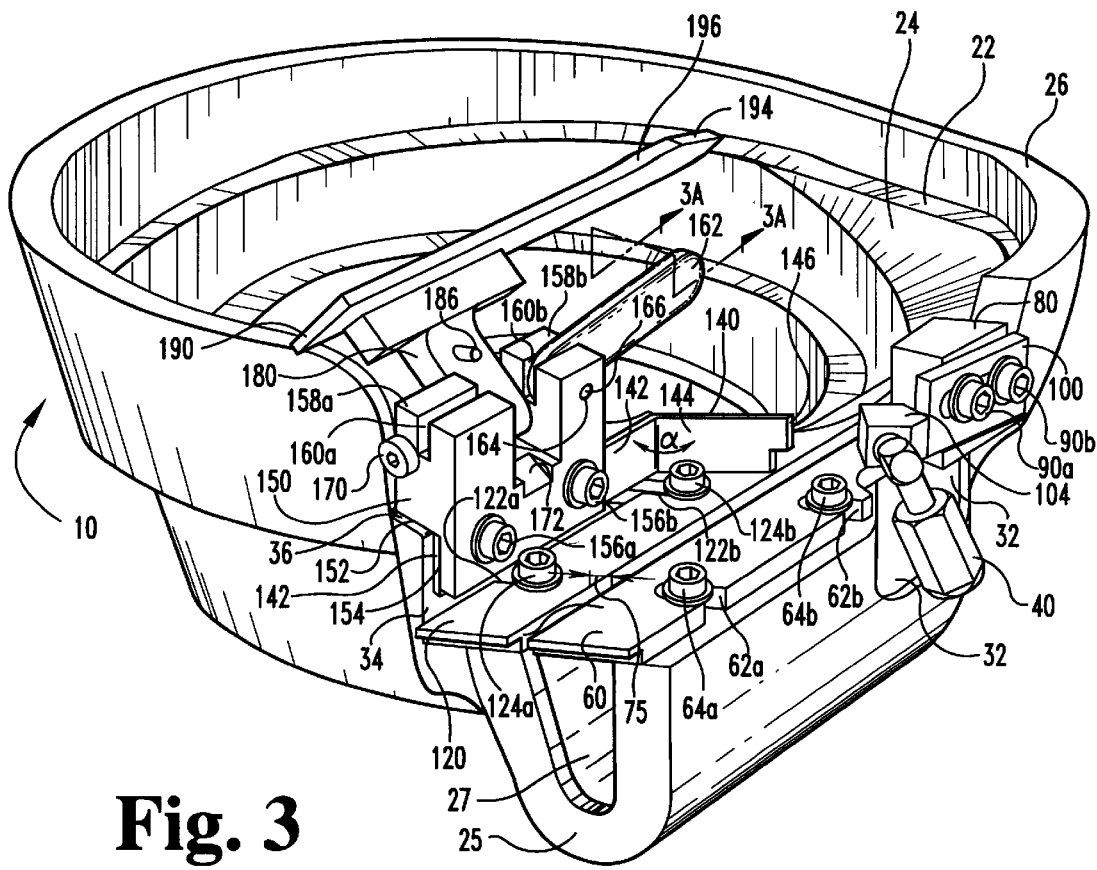
FIG. 3 is a right front perspective view of the embodiment shown in FIG. 1 showing the top confinement member pivoted away from its parts confining position.
Figure 5:
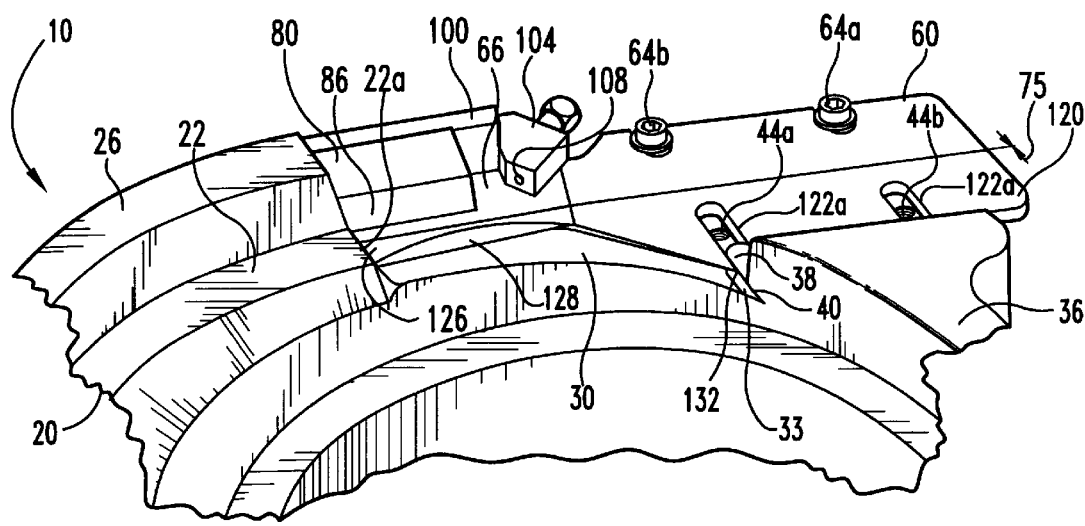
FIG. 5 is a left perspective view of the embodiment shown in FIG. 1, with the pivotal top confinement structure omitted therefrom for clarity, showing the parts receiving unit adjusted for minimal channel width.
Figure 6:
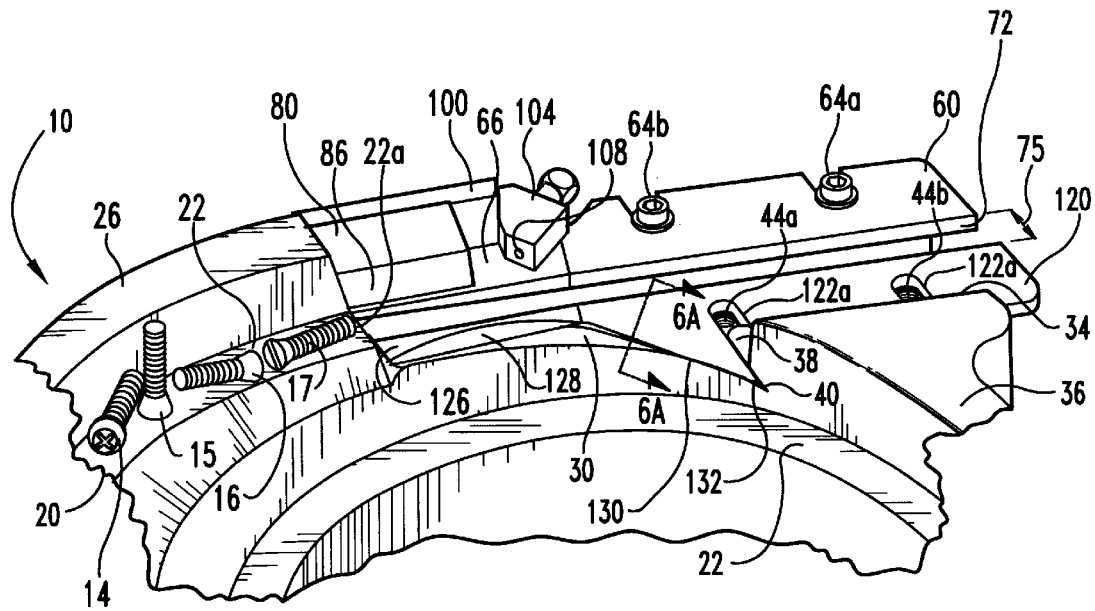
FIG. 6 is a view similar to that of FIG. 5 showing the parts receiving unit adjusted for maximum channel width.

As most clearly shown in FIG. 3, parallel blade 120 includes corresponding channels 122a and 122b for receiving screws 124a and 124b. As shown in FIGS. 5 and 6, orientation member surface 30 includes rigid inserts 44a and 44b, identical to inserts 42a and 42b, molded therein for receiving screws 124a and 124b.

Parallel blade 120 may therefore be adjustably positioned relative to blade 60 in a manner identical to that described in relation to the adjustable positioning of blade 60. Opposing faces 72 of blade 60 and 134 of blade 120 thus define an adjustable-width channel 75 therebetween. The channel width 75 may be adjusted in the manner just described such that the heads of the headed parts to be oriented are supported by the parallel blades 60 and 120 while the shafts of the headed parts extend into a hollow recess 27 of the parts orientation member 25, as shown with respect to oriented screws 12 and 13 of FIG. 2.

Referring now to FIGS. 5 and 6, the parallel blades 60 and 120 are shown in their extreme positions. In FIG. 5, blades 60 and 120 are adjusted toward each other so that channel 75 has minimal width. With blades 60 and 120 in this position, vibratory parts feeder 10 could be used, for example, to provide oriented pins such as those used in garment and sewing industry. In FIG. 6, blades 60 and 120 are adjusted away from each other so that channel 75 has maximum width.

As seen in FIGS. 5 and 6, blade 120 and bowl 20 are configured to provide an important aspect of the present invention. Bowl 20 defines a projection 38 which extends from bowl surfaces 30 and 34 and is configured to be received within channel 122a. Bowl 20 further defines a recess 40 between the projection 38 and the bowl surface 30 for receiving a projection 132 of parallel blade 120. In operation, projection 132 cooperates with projection 38 and recess 40 to provide a continuous surface 33 for directing misoriented parts back into the interior of the bowl 20 regardless of the position of the blade 120. When the channel 75 is adjusted to maximum width, as shown in FIG. 6, projection 132 is received within recess 40 and projection 38 is fully received within channel 122a. However, as channel 75 is decreased in width, pointed projection 132 moves toward channel 75 while maintaining contact with surface 33 of projection 38. Thus, regardless of the position of blade 120 relative to the bowl 20, a substantially continuous surface 33 is maintained between the projection 132 and projection 38. In the absence of such a projection 38 a recess or slot would exist, thereby providing a potential parts jamming location. The configuration of projections 38 and 132 overcome this potential problem by providing continuous bowl surface 33 regardless of the position of blade 120.

Referring now to FIGS. 6 and 6A, the underside of blade 120, in the vicinity of projection 132, defines a sloped surface 130. Surface 130 extends from the top surface of blade 120 toward surface 30 of bowl 20 at an angle β. Preferably, β is approximately 21 degrees, although the present invention contemplates β angles of between approximately 5 degrees and 75 degrees. In operation, surface 130 may extend beyond surface 30 toward the interior of bowl 20 when, for instance, blade 120 is adjusted, to provide a maximum channel width 75. In such case, surface 130 could, if not properly configured, provide a potential parts jamming location between, for example, surface 130 and the parts track 22 located just beneath surface 130. However, by providing surface 130 at an angle β as shown in FIG. 6A, the potential for parts jams is greatly reduced. As parts progress along track 22, the angled surface 130 permits parts to reposition themselves on track 22 so that jams are thereby avoided.

Figure 2:
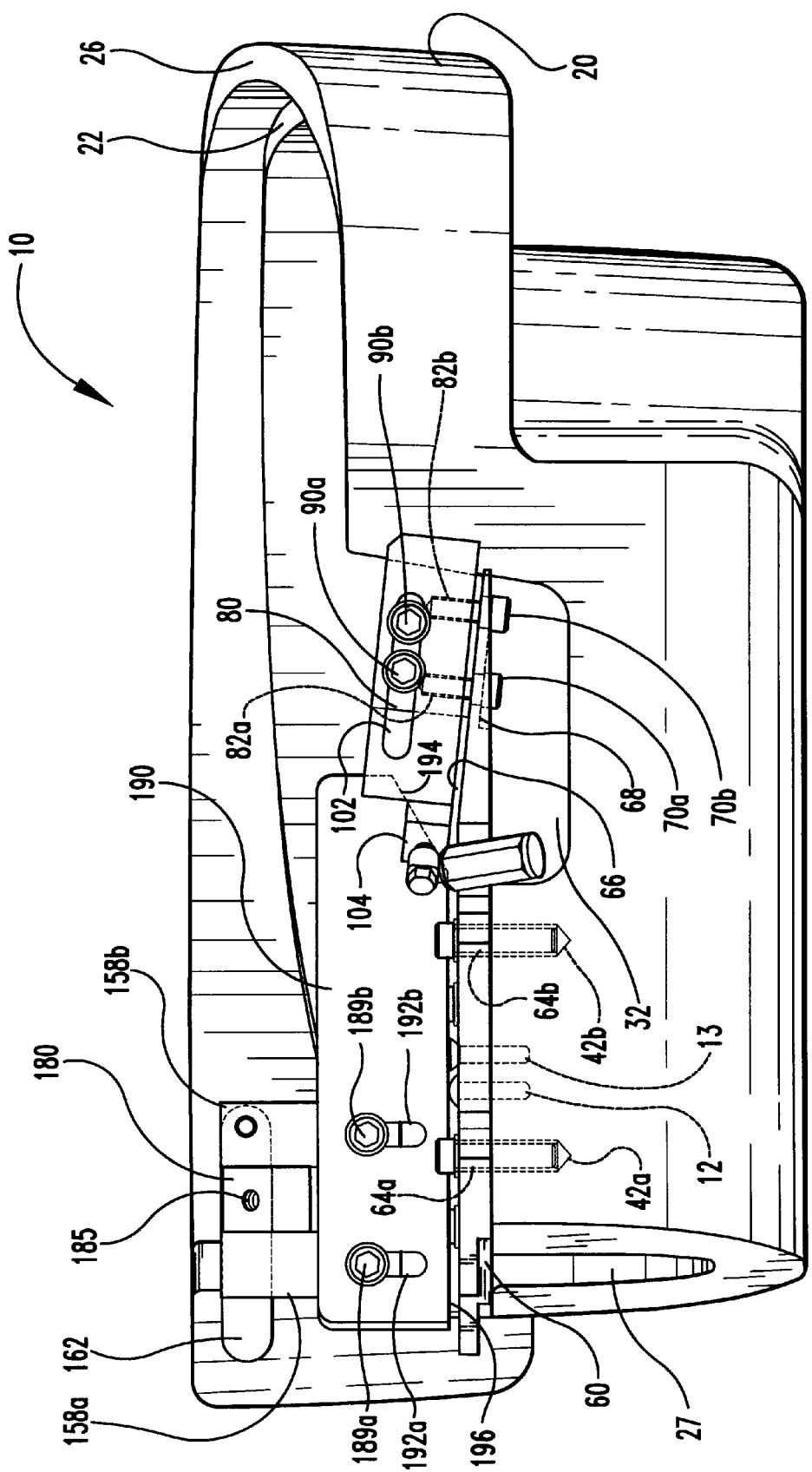
FIG. 2 is a side elevational view of the embodiment shown in FIG. 1.

Referring now to FIGS. 1–6, blade 60 includes a sloped face 66 between screw 64b and the parts discharge port 22a, as most clearly shown in FIG. 2. Parallel blade 120 includes an identically sloped face 126 located adjacent sloped face 66. Sloped faces 66 and 126 provide a slight ramp to facilitate proper orientation of the headed parts. Although a ramp provided by sloped faces 66 and 126 may be unnecessary in certain applications, it has been found that such a ramp slows headed parts having long shafts sufficiently to permit the shafts to drop into the open channel 75 before reaching the top confinement blade 190. Preferably, faces 66 and 126 are sloped at approximately 10 degrees, although the present invention contemplates both greater and lesser slopes depending upon the shaft lengths of the parts being oriented, and on the corresponding desired degree of slowing of the parts.

The parts orientation unit 50 further includes a guide block 80 attached to blade 60 via screws 70a and 70b. As most clearly shown in FIG. 2, blade 60 includes on its underside a recessed portion 68 which is sloped identically with surface 66. Such a sloped recess 68 permits the guide block 80 to be mounted flush with the sloped surface 66 via screws 70a and 70b into correspondingly threaded holes 82a and 82b of the guide block 80. As most clearly shown in FIG. 6, guide block 80 has a face 86 which is more or less vertically flush with surface 72 of parallel blade 60. Guide face 86 helps to maintain axial alignment of the headed parts with the longitudinal axis of the open channel 75. This feature will be illustrated for two separate cases. In the first case, a headed part, such as part 17 of FIG. 6, is advancing, shaft first, toward the discharge port 22a. As the shaft continues to advance over open channel 75, guide face 86 maintains axial alignment of the shaft with the longitudinal axis of the channel 75 until a sufficient portion of the shaft has advanced over the channel 75 so that the weight of the shaft causes the shaft to drop into the channel 75, and the headed part assumes the position of screw 12 shown in FIG. 2. In a second case, a headed part, such as part 16 of FIG. 6, is advancing, head first, toward discharge port 22a. In order for the shaft to drop into channel 75, as previously described, the part must advance over the channel 75 until the end of the shaft is free to drop within the slot 75. Guide face 86 maintains axial alignment of the headed part with the longitudinal axis of channel 75 until the end of the shaft can drop into the channel 75. In either case, guide face 86 keeps the headed part from moving transverse to the longitudinal axis of channel 75 until a properly oriented part can assume the position of, for example, screw 12 of FIG. 2. Misoriented parts traveling towards discharge port 22a are returned to the interior of the vibratory bowl 20 in one of at least four ways to be fully described hereinafter.

Guide block 80 further includes a pair of threaded holes 88a and 88b for receiving screws 90a and 90b, respectively, for attaching air block 100 thereto. Air block 100 includes an open channel 102 for receiving screws 90a and 90b. Air block 100 may therefore be adjustably positioned along an axis parallel with the longitudinal axis of channel 75, by sliding screws 90a and 90b within channel 102. Air block 100 may thereafter be rigidly secured to guide block 80 by tightening screws 90a and 90b. Air block 100 further includes a nozzle portion 104 having a bore 106 defined partially therein for receiving an air source fitting 110. An air outlet passage 108 is connected to bore 106 and provides air supplied to air source nozzle 110 across channel 75. Another important aspect of the present invention is the positioning of the air nozzle 104 such that air is blown from air outlet 108 at an acute angle relative to an axis parallel to the longitudinal axis of channel 75. Thus, air nozzle 104 provides a stream of air not directly transverse to channel 75, but in a direction slightly opposing the flow of headed parts through the parts orientation unit 50. Such a stream of air is one method of returning misoriented parts, such as headed part 15 standing on its head, into the vibratory bowl 20. It has been found that providing a transverse, and slightly upstream, flow of air relative to the flow of parts is more effective for rejecting misoriented parts back into the vibratory bowl 20 than by merely providing an air stream transverse to the flow of parts. Preferably, the acute angle is set at approximately 45 degrees, although the present invention contemplates acute angles of between approximately 10 degrees and just under 90 degrees. The height of air nozzle 104, and proximity of air nozzle 104 with respect to the guide block 80, is adjustable via screws 90a and 90b.

A second mechanism for returning misoriented parts, traveling toward discharge port 22a, is provided by appropriately configuring a portion of the sloped face 126 of the parallel blade 120. As most clearly seen in FIGS. 1 and 6, sloped face 126 includes a second sloped face 128 which slopes downwardly toward the interior of the vibratory bowl 20. Headed parts, such as part 14, which are unable to maintain axial orientation with the longitudinal axis of channel 75 may, either on their own or under the influence of the air stream exiting outlet 108, slide down the sloped face 128 and back into the vibratory bowl 20.

Referring now to FIGS. 1–4, the parts confinement unit 55 will now be described in detail. Confinement unit 55 includes a pivot support block 150 which has a bottom surface 152 adapted to rest on surface 36 of the vibratory bowl 20. Pivot support block 150 further includes a vertical surface 154 for engagement with a portion 142 of deflector 140. Portion 142 of deflector 140 is further in contact with vertical wall 34 of the vibratory bowl 20. Pivot support block 150 and deflector 140 have a pair of bores disposed therethrough (not shown) for receiving screws 156a and 156b. Although not shown in the figures, it is to be understood that vertical wall 34 of the vibratory bowl 20 includes threaded inserts, identical to inserts 42a and 42b, molded within the bowl 20 for receiving the screws 156a and 156b. Pivot support block 150 is thus mounted to the vibratory bowl 20 via screws 156a and 156b, received through correspondingly aligned bores in the pivot support block 150 and deflector 140, and secured to threaded inserts molded within the vertical wall 34 of the bowl 20.

Deflector 140 further includes an angle portion 144 which extends from portion 142 at an angle and terminates at the channel 75. In accordance with another important aspect of the present invention, deflector 140 serves two purposes. First, the screws 156a and 156b, more so than screws 64a, 64b, 124a, and 124b, are under considerable force to draw the screws away from the vertical surface 34 of the bowl 20, during operation of the parts confinement unit 55, as will be more fully discussed hereinafter. To prevent screws 156a and 156b from extracting the threaded inserts molded into the vertical face 34 of the bowl 20 under such force, the deflector portion 142, positioned between the pivot support block 150 and the vertical bowl face 34, acts as a washer to retain the threaded inserts within the vertical wall 34. Secondly, deflector 140 includes an angled portion 144 extending from deflector portion 142 at an angle , and terminating at the channel 75. Angled portion 144 includes a surface 141 which provides a third mechanism for directing misoriented screws, advancing toward the discharge port 22a, back into the interior of the bowl 20. As most clearly shown in FIGS. 1 and 6, a misoriented screw, such as screw 14, may be partially received within the channel 75, although incorrectly oriented, and may not be directed back into the interior of the bowl 20 by the air stream exiting outlet 108 or by the sloped surface 128 of parallel blade 120. Such a screw will be directed back into the interior of the bowl upon contact with the surface 141 of deflector 140. Preferably, α is set at approximately 140 degrees, although the present invention contemplates α angles of between just over 90 degrees and approximately 170 degrees.

Pivot support block 150 further includes a pair of projections 158a and 158b extending therefrom. Projection 158a includes a groove 160a therein having a longitudinal axis parallel to the longitudinal axis of channel 75. Projection 158b includes a similar groove 160b which is axially aligned with groove 160a. One end of a locking lever 162 is received within the channel 160b and is pivotably attached to pivot support block 150 thereat. The pivot support block 150 includes a bore 164 defined through projection 158b, which bisects channel 160b. Locking lever 162 includes a similar bore at one end thereof which, when received within channel 160b, is axially aligned with bore 164. A pin 166 extends through the bore 164 and the bore defined within the locking lever 162 to thereby pivotably attach the locking lever 162 within the channel 160b. As most clearly seen in crosssection in FIG. 3A, locking lever 162 has a rounded edge 163 which facilitates the entry of the locking lever 162 within grooves 160a, 160b, and groove 184 of pivot block 180 (FIG. 4).

Parts confining unit 55 further includes a pivot block 180 which is pivotably attached to pivot support block 150 via pin 170. As most clearly shown in FIG. 1, projection 158a of the pivot support block 150 defines a bore 168a therethrough which has a longitudinal axis parallel to the longitudinal axis of channel 160a. Similarly, projection 158b includes a bore 168b disposed therethrough which has a longitudinal axis parallel to the parallel axis of channel 160b. Pivot block 180 includes a bore 182, identical to bores 168a and 168b, through one end thereof. Bore 182 becomes axially aligned with bores 168a and 168b when pivot block 180 is positioned between projections 158a and 158b of pivot support block 150 as shown in FIGS. 1, 3 and 4. Pin 170 extends through bores 168a, 168b and 182 to thereby pivotably attach pivot block 180 to pivot support block 150.

At an end opposite to the pivotable attachment to pivot support block 150, pivot block 180 defines a pair of projections 185a and 185b extending laterally therefrom in opposite directions. Projection 185a defines a bore 188a therethrough for threadingly receiving a screw 189a. Similarly, projection 185b defines a bore 188b therethrough for threadingly receiving a screw 189b. Parts confining unit 55 further includes a parts confining member 190, or top confinement blade, which is attached to pivot block 180 via screws 189a and 189b. As most clearly shown in FIGS. 2 and 4, top confinement blade 190 includes a pair of slots 192a and 192b for receiving screws 189a and 189b, respectively. The position of top confinement blade 190 relative to the pivot block 180, corresponding to the height of the top confinement blade 190 above the channel 75 as show in FIGS. 2 and 4, is therefore adjustable through appropriate positioning of screws 189a and 189b within slots 192a and 192b, respectively. Finally, top confinement blade 190 includes an angled edge 194 which, when disposed in the position shown in FIGS. 2 and 4, is adjacent to the parts discharge port 22a. The purpose of angled portion 194 is two-fold. First, a screw, such as screw 15 of FIG. 6, may be received within the channel 75 headfirst. If the air stream exiting outlet 108 does not direct the screw 15 back into the interior of the bowl 20, the sloped edge 194 of top confinement blade 190 is intended to topple the screw forward so that its shaft may be received within the channel 75. Secondly, a screw, such as screw 14 of FIG. 6, may not be directed back into the interior of the bowl 20 by either the air stream exiting outlet 108 or the sloped face 128 of the parallel blade 120. The sloped edge 194 of the top confinement blade 190 is further intended to provide a fourth mechanism for returning misoriented screws back into the interior of the bowl 20 by allowing such screws, such as screw 14, to continue traveling along the channel 75 until the deflecting surface 141 of the deflector 140 can direct the screw back into the interior of the bowl 20.

Figure 4:
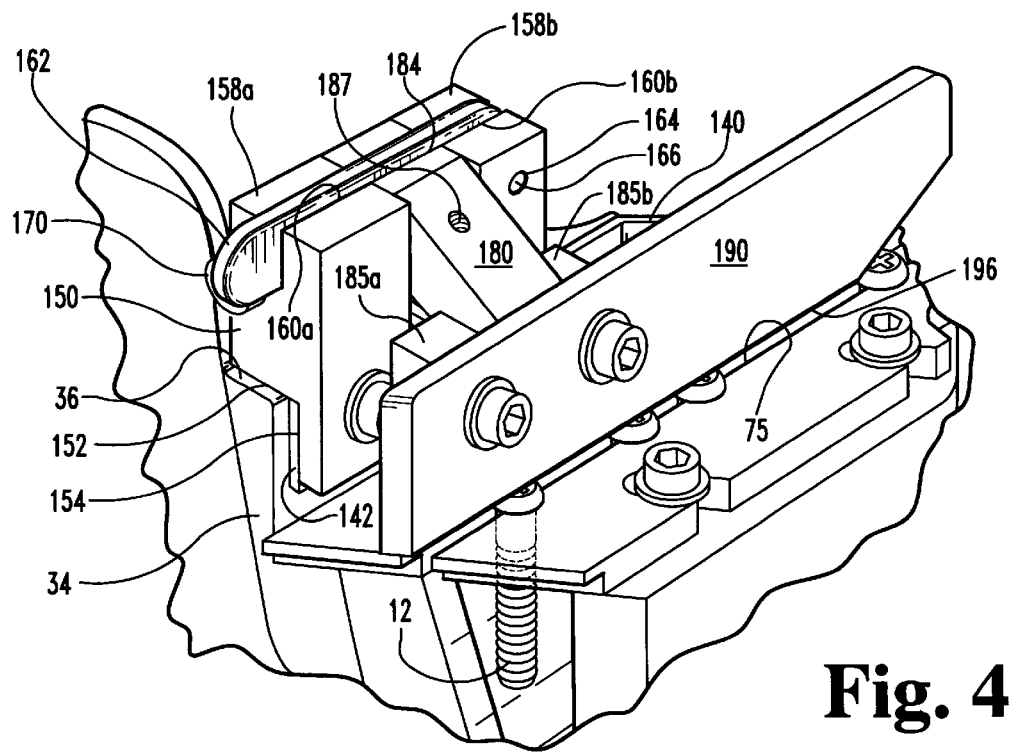
FIG. 4 is a right front perspective view of the embodiment shown in FIG. 1 showing details of the top confinement member in its parts confining position.

With the parts confining unit 55 just described, the top confinement blade 190 may be pivoted between a first position, shown in FIG. 3, and a second position, shown in FIG. 4, wherein the bottom edge 196 of the top confinement blade 190 provides a top confinement mechanism to keep the oriented parts from vibrating out of the channel 75. In its first position, the top confinement blade 190 is pivoted beyond 90 degrees from its second position so that the combination of the pivot block 180 and top confinement blade 190 may maintain the first position under the force of gravity. In such a position, the parts feeding apparatus 10 may be initially set up by adjusting the various components of the parts orientation unit 50 such as the parallel blades 60 and 120, the guide block 80, the air block 100, and the deflector 140, and for clearing any parts jams that may occur during operation of the apparatus 10. In its second position, shown in FIG. 4, the edge 196 of the top confinement blade 190 is rigidly secured at a desired distance above the channel 75, in order to provide top confinement for the oriented parts 12 traveling through channel 75.

In order to rigidly secure the top confinement blade 190 and the pivot block 180 in their second position as shown in FIG. 4, pivot block 180 further includes a projection 186 disposed within bore 187 of pivot block 180 and extending from its underside as shown in FIG. 3. Pivot support block 150 includes an inclined surface 172 which contacts the projection as the top confinement blade 190 is pivoted to its second position. Preferably, projection 186 is configured such that the top confinement blade 190 is positioned just above its second position when the projection 186 is in contact with surface 172 and the locking lever 162 is in its unlocked position as shown in FIG. 3. As most clearly shown in FIG. 4, pivot block 180 further includes a channel 184 which is identical in dimension to channels 160a and 160b. When projection 186 is in contact with surface 172 under the action of gravity, the top confinement blade 190 is positioned just above its second position of FIG. 4. In this position, channel 184 is not quite axially aligned with channels 160a and 160b. As locking lever 162 is pivoted toward channel 160a, the rounded edge 163 contacts one edge of the channel 184, forcing the channel 184 into axial alignment with channels 160a and 160b. Further pivoting of locking level 162 permits the lever 162 to be received within channel 160a as shown in FIGS. 1, 2 and 4. When locking lever 162 is completely received within channel 160a, locking lever 162 is in its locked position. This sequence of pivoting the top confinement blade 190 and pivot block 150 to just above the second position such that the projection 186 contacts the surface 172 under the action of gravity and thereafter pivoting the locking lever 162 from its unlocked position to its locked position, as shown in FIGS. 1, 2 and 4, simulatenously forces the top confinement blade 190 and pivot block 180 into the second position and rigidly forces extension 186 against surface 172 so that the entire parts confining unit 55 is locked in a secure position. This ensures that none of the top confinement components will rattle under vibratory operation. Such a locking force can be put substantial pressure on screws 156a and 156b, tending to force them outwardly toward the channel 75. Without some mechanism to maintain the threaded inserts within the vertical wall 34 of the polycast bowl 20, such a substantial force could result in the extraction of the threaded inserts from the bowl wall 34. The importance of the deflector portion 142 is thus immediately recognized in that it provides a counter force, under the pressure of screws 156a and 156b, to retain the threaded inserts within the bowl wall 34. Although similar threaded inserts are incorporated within other areas of the polycast bowl 20, none are generally subject to such forces that require the inclusion of counter force plates or washers.

In operation, the top confinement bar 190 is pivoted to its first position, as shown in FIG. 3, and the various components of the parts orientation unit 50 are adjusted, as previously described, to suit the dimensions of the particular parts being oriented. Such adjustments include, for example, positioning the top confinement bar 190 relative to the pivot block 180, adjusting the parallel blades 60 and 120 to thereby set the channel width 75, and adjusting the position of the air block 100. Once the set up procedure is completed, the top confinement bar 190 is pivoted to just above its second position, so that projection 186 contacts surface 172. Top confinement blade 190 is thereafter forced into its second position, as shown in FIGS. 1, 2 and 4, by pivoting the locking lever 162 from its unlocked position, shown in FIG. 3, to its locked position, shown in FIGS. 1, 2 and 4. With all of the components of the parts orientation unit 50 adjusted and solidly secured, the vibratory bowl 20 and parts orientation unit 50 may be vibrated, under the action of a vibratory drive unit, (not shown), so that a disoriented mass of parts 11 contained within the bowl 20 are transported, in a circumferential manner, along the parts track 22 toward the discharge port 22a. Parts having certain orientations, as previously discussed, will be oriented within the channel 75, and serially provided from the channel 75 in this oriented fashion. Parts traveling towards discharge port 22a that have orientations other than the number of orientations permitted in order for the parts to be received within the channel 75 are directed back into the interior of the bowl 22 by any of a combination of the downwardly sloped surface 128 of the parallel blade 120, the air jet stream exiting orifice 108 of the air block 100, the deflector surface 141 of deflector 140, and the angled edge 194 of the top confinement blade 190.

Figure 7:
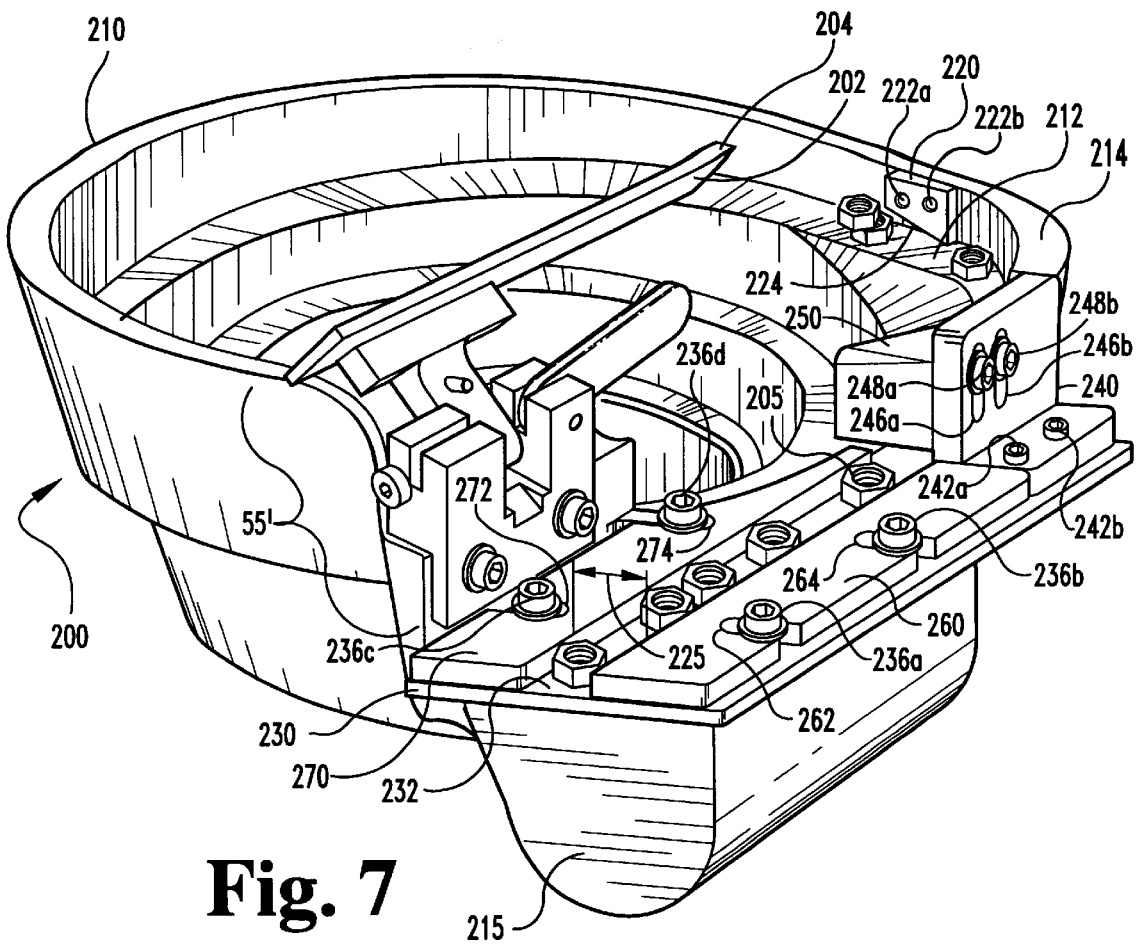
FIG. 7 is a right front perspective view of a vibratory parts feeder with pivotal top confinement in accordance with an alternate embodiment of the present invention.
Figure 8:
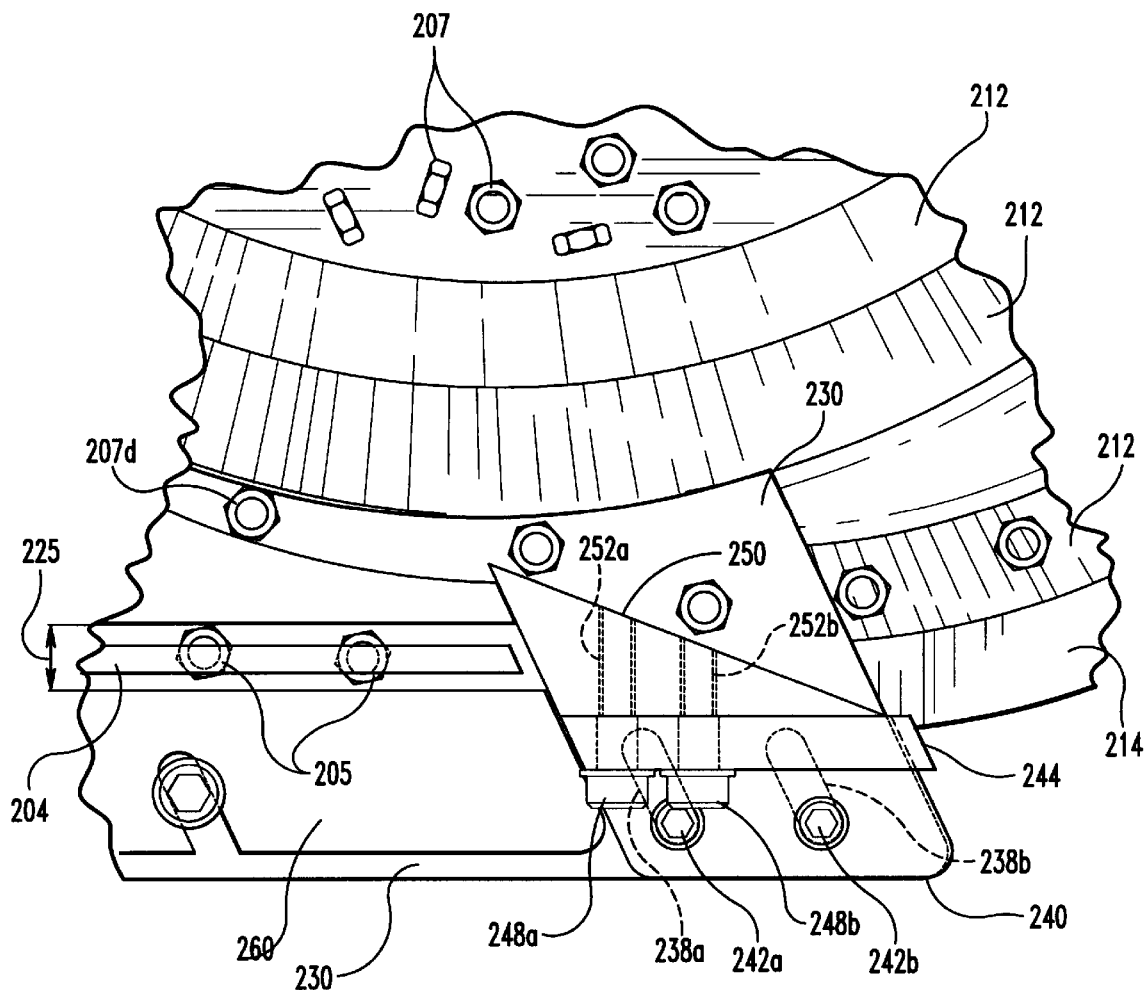
FIG. 8 is a top plan view of the parts receiving portion of the embodiment shown in FIG. 7.

Referring now to FIGS. 7 and 8, an alternative parts feeding apparatus embodiment 200 is shown. Generally, parts feeding apparatus 200 is useful for orienting non-elongated parts such as threaded nuts, washers, coins, and the like, as well as certain compact assemblies and subassemblies. The parts feeding apparatus 200 utilizes a parts confining unit 55' which is identical in most respects to the parts confining unit 55 described with respect to FIGS. 1–6, and will therefore not be discussed further. The sole difference between parts confining unit 55' and the parts confining unit 55 is the configuration of top confinement blade 202. As shown in FIG. 7, top confinement blade 202 lacks the angled edge 194 of top confinement blade 190 and instead includes a right-angled edge 204 in place thereof.

Parts feeding apparatus 200 includes a vibratory bowl 210 which is similar in many respects to the vibratory bowl 20 as described with respect to FIGS. 1–6. For example, vibratory bowl 210 includes a parts transportation track 212 defined therein which terminates at a discharge portion 212a. Similarly, bowl 210 includes an upper rim 214 for preventing the parts from escaping therefrom under vibratory action. However, since the parts feeding apparatus 200 is not intended for use with elongated parts, the parts orientation unit support 215 need not be bifurcated as with the previous embodiment, but may be a solid construction as shown in FIG. 7.

Attached to parts orientation support 215 is a base plate 230. Base plate 230 is intended to provide a surface 232 for directing parts into the channel 225, and for providing a support surface under channel 225.

An outside parallel blade 260, similar to parallel blade 60 of the previous embodiment, includes grooves 262 and 264 for receiving screws 236a and 236b. As with the previous embodiment, the parts orientation unit support 215 includes threaded inserts molded therein for threadingly receiving screws, such as screw 236a. Outside parallel blade 260 is positioned on top of the base plate 230, and may be laterally adjusted relative to screws 236a and 236b to provide a desired channel width 225. An inside parallel blade 270 is also included and has grooves 272 and 274 for receiving screws 236c and 236d, respectively. As with outside parallel blade 260, inside parallel blade 270 may be laterally adjusted to provide a desired channel width 225 therebetween. As with the previous embodiment, vibratory bowl 210 includes a projection 216, and inside parallel blade 270 includes a projection 276 which are correspondingly configured to provide a non-jamming surface regardless of the lateral position of the inside parallel blade 270.

Parts feeding apparatus 200 further includes an entrance mount 240 having an entrance block 250 attached thereto. As most clearly shown in FIG. 8, base plate 230 includes a pair of slots 238a and 238b therethrough, a pair of bores are correspondingly defined within the entrance mount 240 which are axially aligned with slots 238a and 238b. Screws 242a and 242b are provided therethrough for attaching the entrance mount 240 to the base plate 230. Due to the slots 238a and 238b, the entrance mount 240 may be adjusted perpendicularly toward and away from the longitudinal axis of channel 225. Entrance mount 240 may therefore be adjusted so that surface 241 is flush with edge 268 of outside parallel blade 260.

Entrance mount 240 further includes a vertical portion 244 having slots 246a and 246b disposed therethrough. Entrance block 250 includes corresponding threaded bores 252a and 252b for receiving screws 248a and 248b as shown in FIGS. 7 and 8. The height of entrance block 250 above the channel 225 may thereby be adjusted to accommodate parts having different heights.

Finally, parts feeding apparatus 200 includes a sweep 220 attached to the vibratory bowl 210 above the parts track 212 and remote from the discharge port 212a. Sweep 220 defines a pair of bores therethrough for receiving screws 222a and 222b. As with all other screw-type attachments to bowl 210, a pair of threaded inserts, identical to those described with respect to the previous embodiment, are cast within the bowl 210 for receiving screws 222a and 222b. Sweep 220 includes a sloped surface 224 which slopes generally downwardly in the direction of parts movement along parts track 212. In feeding parts having flat surfaces, such as washers and threaded nuts, it is possible that parts may be fed along parts track 212 in a stacked or piggy-back fashion as shown in FIG. 7. The purpose of sweep 220 is to separate such a stack and provide separate or discrete parts to discharge port 212a. Sweep 220 is thus positioned so that its lowest portion of surface 224 permits passage of a single, and properly oriented, part therethrough. The surface 224 is sloped to a sufficient degree to permit a stack of parts to be separated while maintaining the separated parts on the parts track 212. Preferably, surface 224 is sloped at an angle of approximately 20 degrees, although the present invention contemplates slopes of between 5 degrees and 70 degrees.

In operation, a disoriented mass of parts, such as washers, threaded nuts, and the like, are provided within the vibratory bowl 210 as partially shown in FIG. 8. Under vibratory action, provided by a vibratory drive unit (not shown), the parts 207 travel, in a circumferential manner, along the parts track 212 toward the discharge port 212a. If parts become stacked or piggy-backed along the way, sweep 220 separates the stacks into individual or discrete parts for further transportation toward discharge port 212a. Upon reaching discharge port 212a, properly oriented parts, such as part 207a, will pass under the entrance block 250 and be received and oriented within the channel 225, such as part 205 shown in FIGS. 7 and 8. Parts having orientations other than those permitted to be received within the channel 225 are directed back into the vibratory bowl 210. One mechanism for directing parts back into the bowl 210 is the angled surface 254 of entrance block 250. If a part has been turned on its edge, such as part 207b, the part will not be permitted to pass under the entrance block 250, and the angled surface 254 of the entrance block 250 will direct the part back into the vibratory bowl 210. A second mechanism for directing parts back into the vibratory bowl 210 is the edge 278 of inside parallel blade 270. If a part, such as part 207c, is not close enough to the surface 241 of the entrance mount 240, the angled edge 278 of the inside parallel blade 270 will direct the part back into the vibratory bowl 210. If part 207c is located too close to the interior of bowl 210, and does not contact surface 278 of blade 270, it may continue along the top surface of base plate 203 as shown by part 207d in FIG. 8. In such a case, surface 217 of projection 216 will direct the part 207d back into the vibratory bowl 210.

Figure 10:
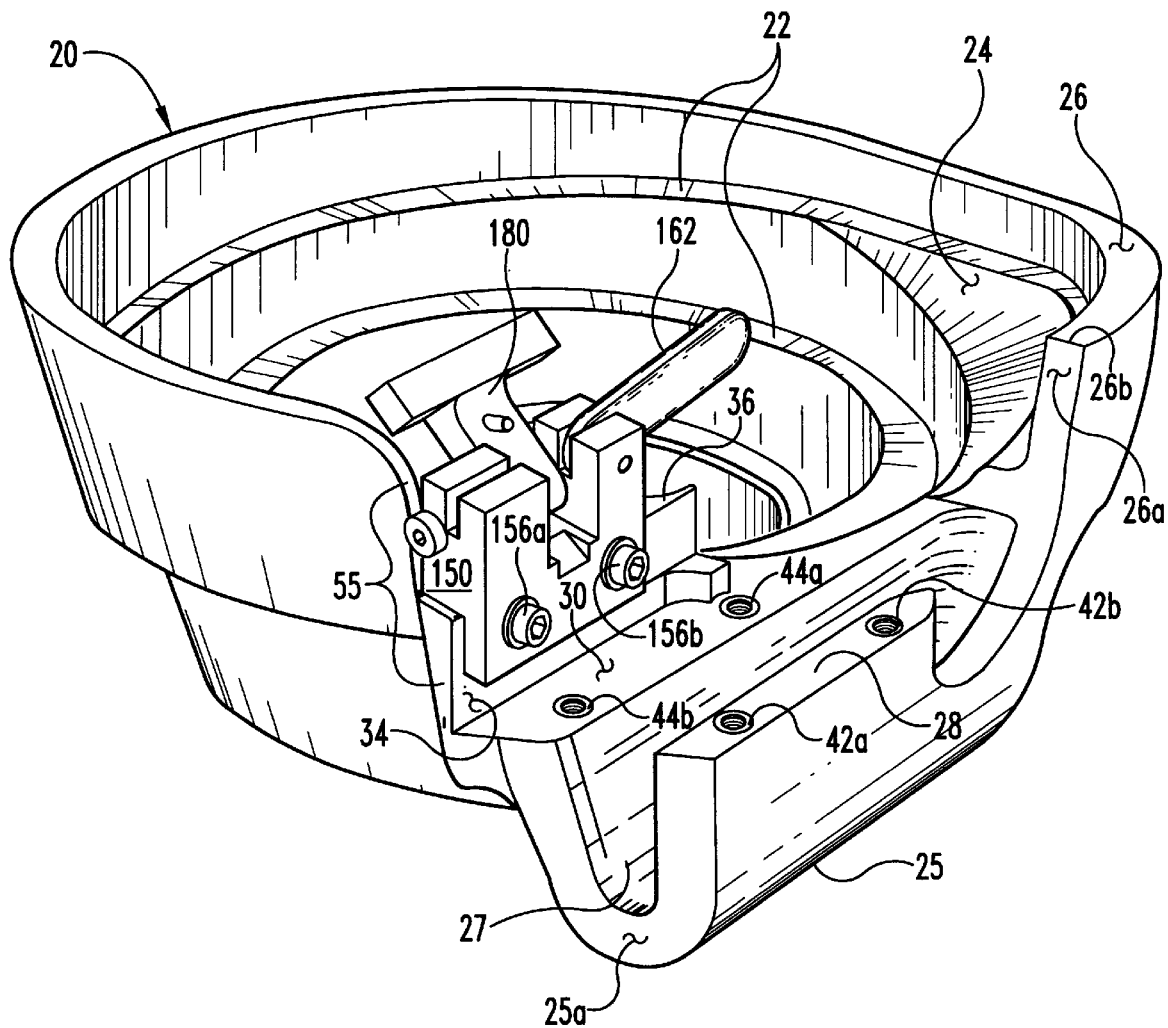
FIG. 10 is a right front perspective view of the vibratory bowl of FIGS. 1–3 showing only the pivotal top confinement apparatus of the present attached thereto.

Referring now to FIG. 10, vibratory bowl 20 is shown having only parts confinement apparatus, or pivotal top confinement apparatus, 55 attached thereto via fasteners 156a and 156b as discussed hereinabove. As used hereinafter, the term "pivotal top confinement apparatus 55" is defined as including all parts of apparatus 55 discussed hereinabove with respect to FIGS. 1–4, with the exception of deflector 140 and top confinement blade 190. As discussed hereinabove, bowl 20 preferably includes a helical parts path 22 terminating at a discharge port 22a. Parts orientation, or feeding, member 25 extends from discharge port 22a to parts orientation member wall 25a and defines a hollow recess 27 between parts orientation unit mounting surfaces 28 and 30. Upper rim 26 terminates at wall 26a, thus defining rim edge 26b thereat. Wall 26a extends downwardly toward parts orientation unit mounting surface 28 and defines a scrap chute 32 therebetween. Parts orientation unit mounting surfaces 28 and 30 each include a number of threaded inserts therein at predefined locations. Preferably, surface 28 includes two such inserts 42a and 42b therein and surface 30 similarly includes two such inserts 44a and 44b therein, although it is to be understood that the present invention contemplates providing any number of inserts within parts orientations mounting surface 28 and 30 at predefined locations.

In accordance with an important aspect of the present invention, a number of parts orientation units, such as parts orientation unit 50 of FIGS. 1–4, are provided for attachment to parts orientation unit mounting surfaces 28 and 30. Such parts orientation units are, in accordance with the present invention, configured with a number of bores and/or channels therethrough which align with the number of threaded inserts included in surfaces 28 and 30. In this manner, any of a number of different parts orientation units may be detachably mounted to parts orientation surfaces 28 and 30 of parts orientation member 25 so that a single vibratory bowl configuration may be used to feed and orient parts having various configurations.

Figure 11:
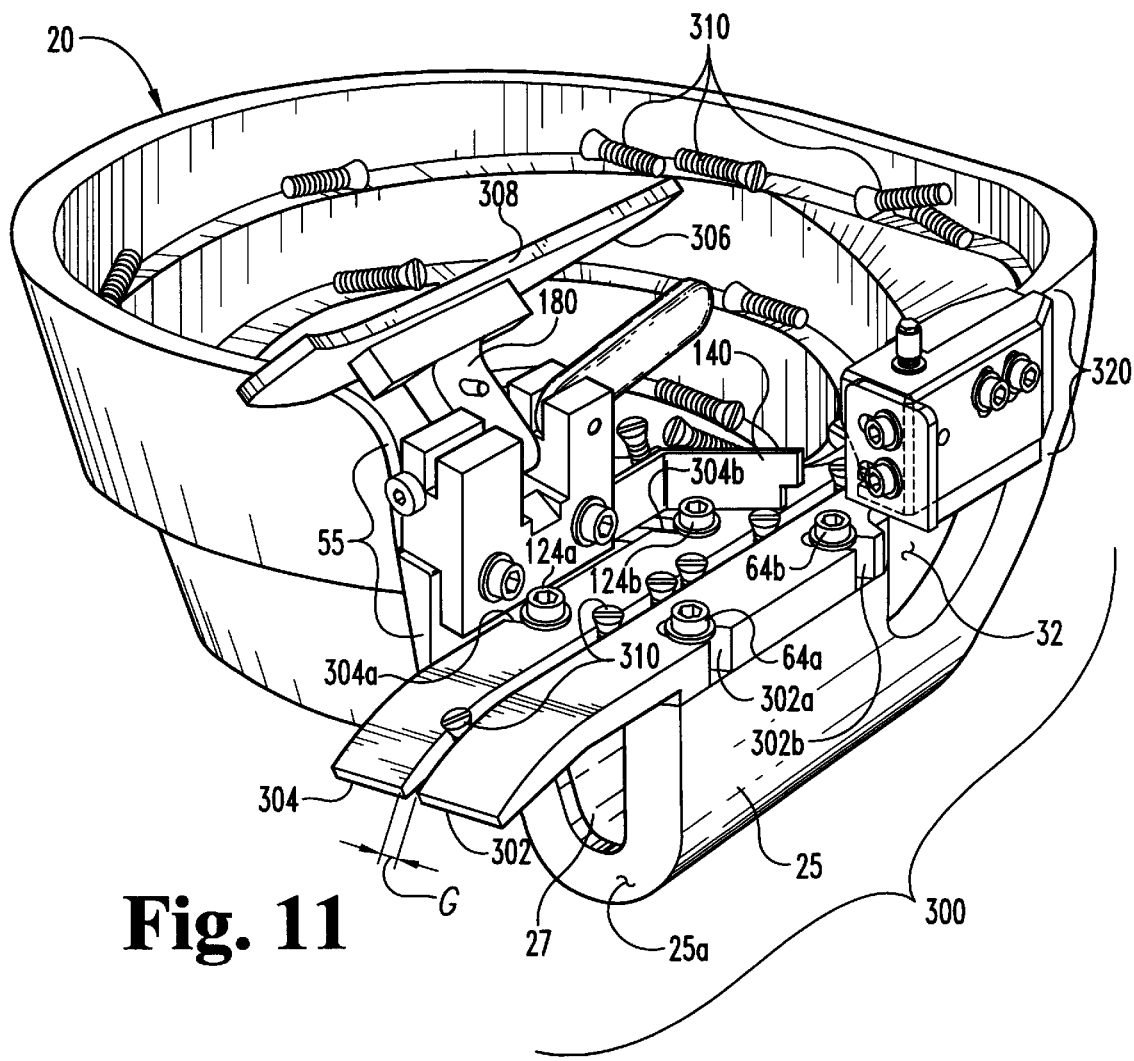
FIG. 11 is a view similar to that of FIG. 10 showing an alternate embodiment of parts orienting tooling, in accordance with the present invention.

Referring now to FIG. 11, another embodiment of a parts orientation unit 300 for use with the vibratory bowl 20 and pivotal top confinement apparatus 55, in accordance with the present invention, is shown. Parts orientation unit 300 is similar in many respects to parts orientation unit 50 of FIGS. 1–4 in that it is intended to feed and orient headed parts such as screws 310. Parts orientation unit 300 includes a pair of parallel blades 302 and 304 which are sloped downwardly at the parts exiting end thereof. Outer blade 302 includes a pair of bores 302a and 302b therethrough which, when blade 302 is mounted to surface 28, are aligned with inserts 42a and 42b respectively. Fastener 64a is received within bore 302a and insert 42a, and fastener 64b is received within bore 302b and insert 42b, to secure blade 302 to surface 28 of parts orientation number 25. Blade 304 includes a bore 304a and channel 304b which, when blade 304 is mounted to surface 30, are aligned with inserts 44b and 44a respectively. Fastener 124a is received within bore 304a and insert 44b, and fastener 124b is received within channel 304b and insert 44a, to secure blade 304 to surface 30 of parts orientation number 25. As with blades 60 and 120, FIGS. 1–4, blades 302 and 304 are adjustably positionable with respect to each other to provide a gap G therebetween of desired width. Headed parts 310 are directed to bowl discharge port 22a, under suitable vibratory action, along helical parts path 22 for eventual orientation within gap G of parts orientation unit 300 as discussed hereinabove.

Figure 12:
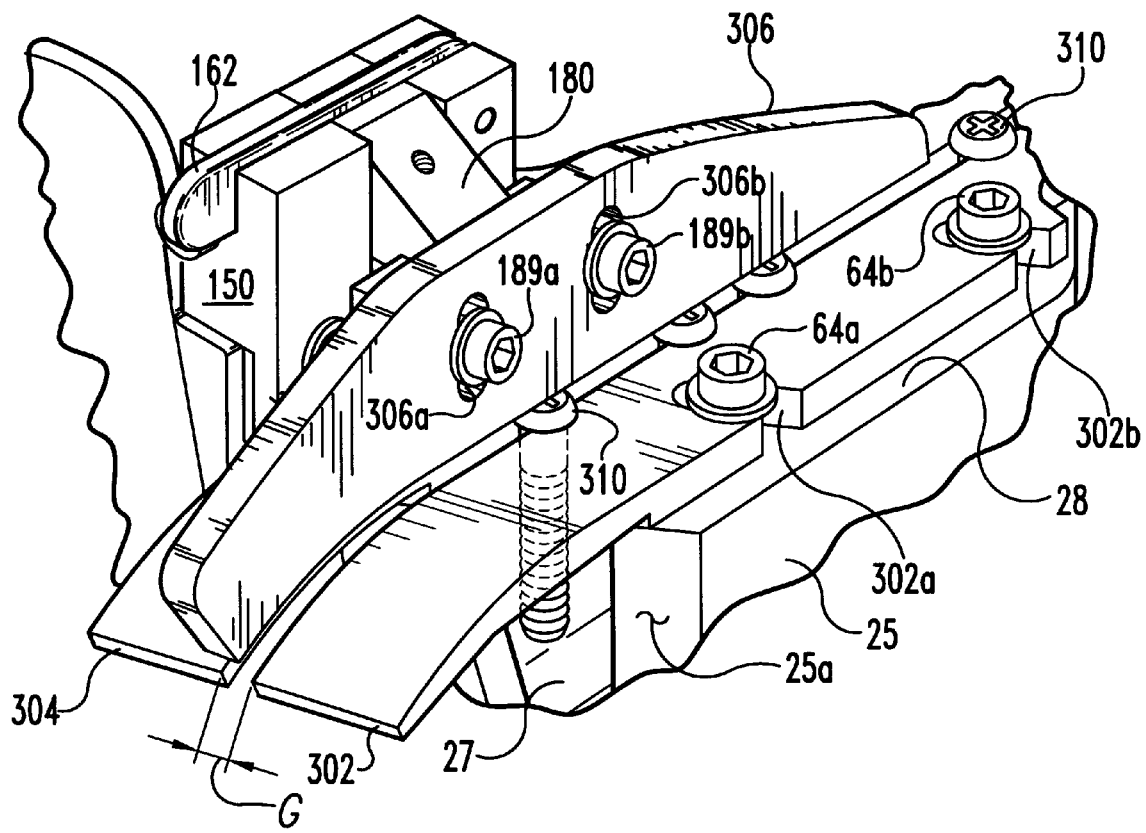
FIG. 12 is a view similar to that of FIG. 4 showing details of the top confinement member of FIG. 11 in its parts confining position.

As shown in FIGS. 11 and 12, a top confinement blade 306 includes a parts confinement surface 308 that is configured complimentarily with the shape of blades 302 and 304. Blade 306 includes a pair of grooves 306a and 306b through which fasteners 189a and 189b extend to secure blade 306 to pivot block 180 of pivotal top confinement apparatus 55. Via fasteners 189a and 189b, and slots 306a and 306b, confinement blade 306 may be adjusted, as may any of the top confinement blades discussed herein, to any desired height above the gap G defined between blades 302 and 304 to confine headed parts 310 therein. Preferably, the curved portions of blades 302, 304 and 306 slope downwardly away from mounting surfaces 28 and 30 at the wall 25a of parts orientation member 25 at an angle at approximately 35° from a horizontal plane defined by surfaces 28 and 30, although the present invention contemplates providing such curved portions having any desired angle from the plane defined by surfaces 28 and 30.

Parts orientation unit 300 further includes a parts entrance unit 320, in accordance with another aspect of the present invention, for directing properly oriented parts into the gap G between blades 302 and 304 (or the gap 75 between blades 60 and 120 of FIGS. 1–4), and for directing misoriented parts back into vibratory bowl 20. Details of the parts entrance unit 320 are shown in FIGS. 13–15b.

Figure 13:
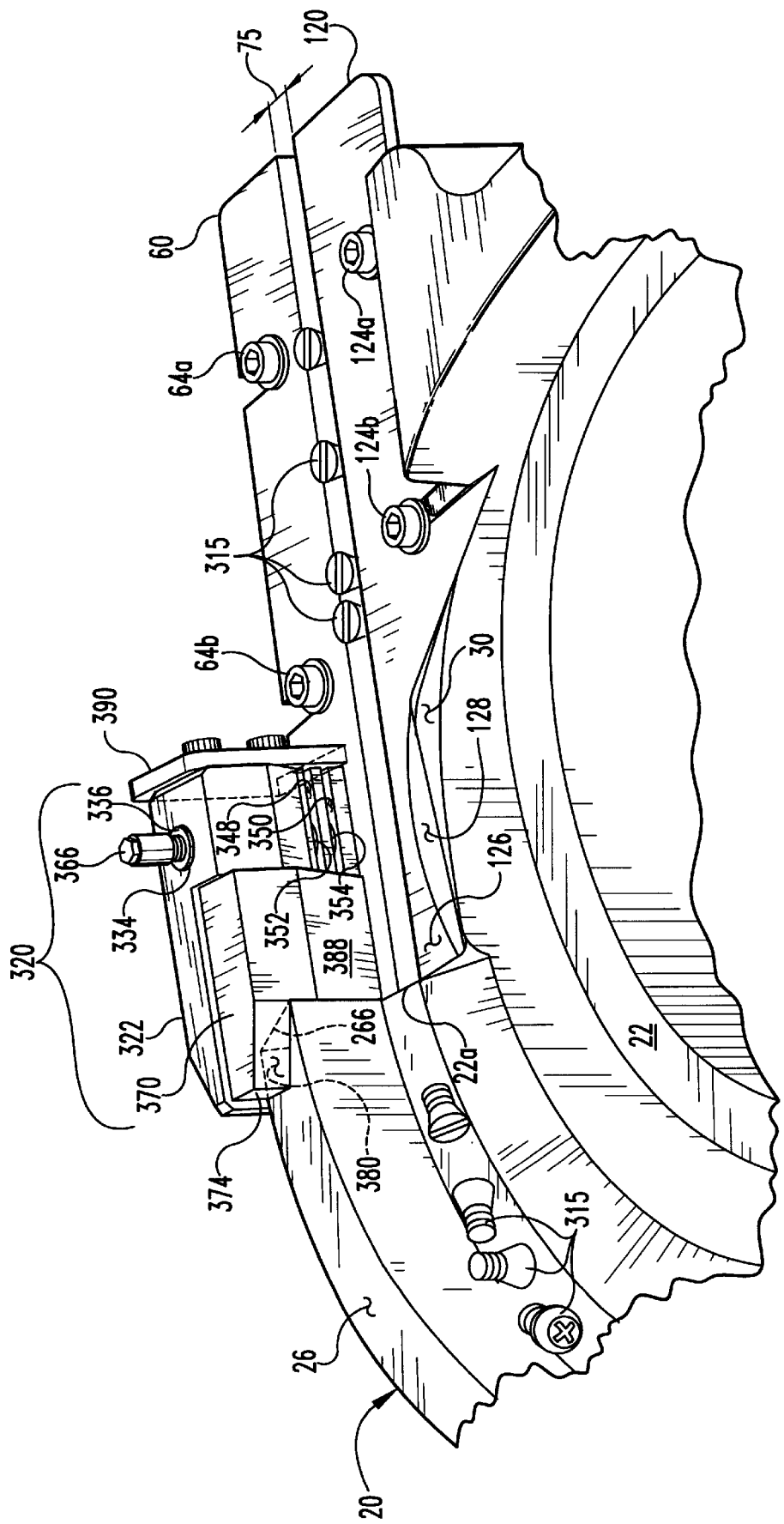
FIG. 13 is a view similar to that of FIGS. 5 and 6 showing details of an alternate embodiment of an air supply block attached to the parts orientation tooling of FIGS. 1–4 in accordance with another aspect of the present invention.
Figures 14A, 14B, 14C:
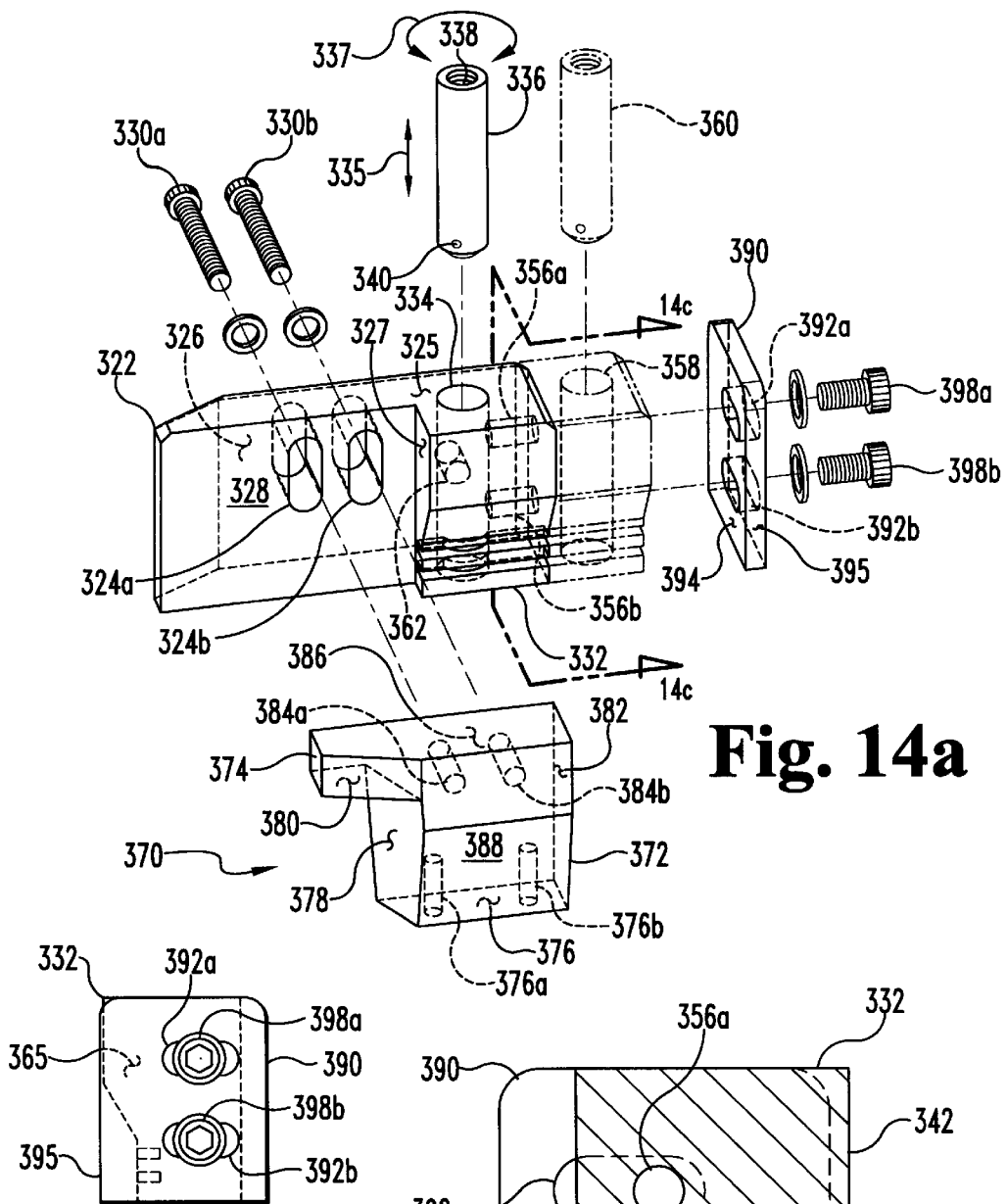
Figure 15B:
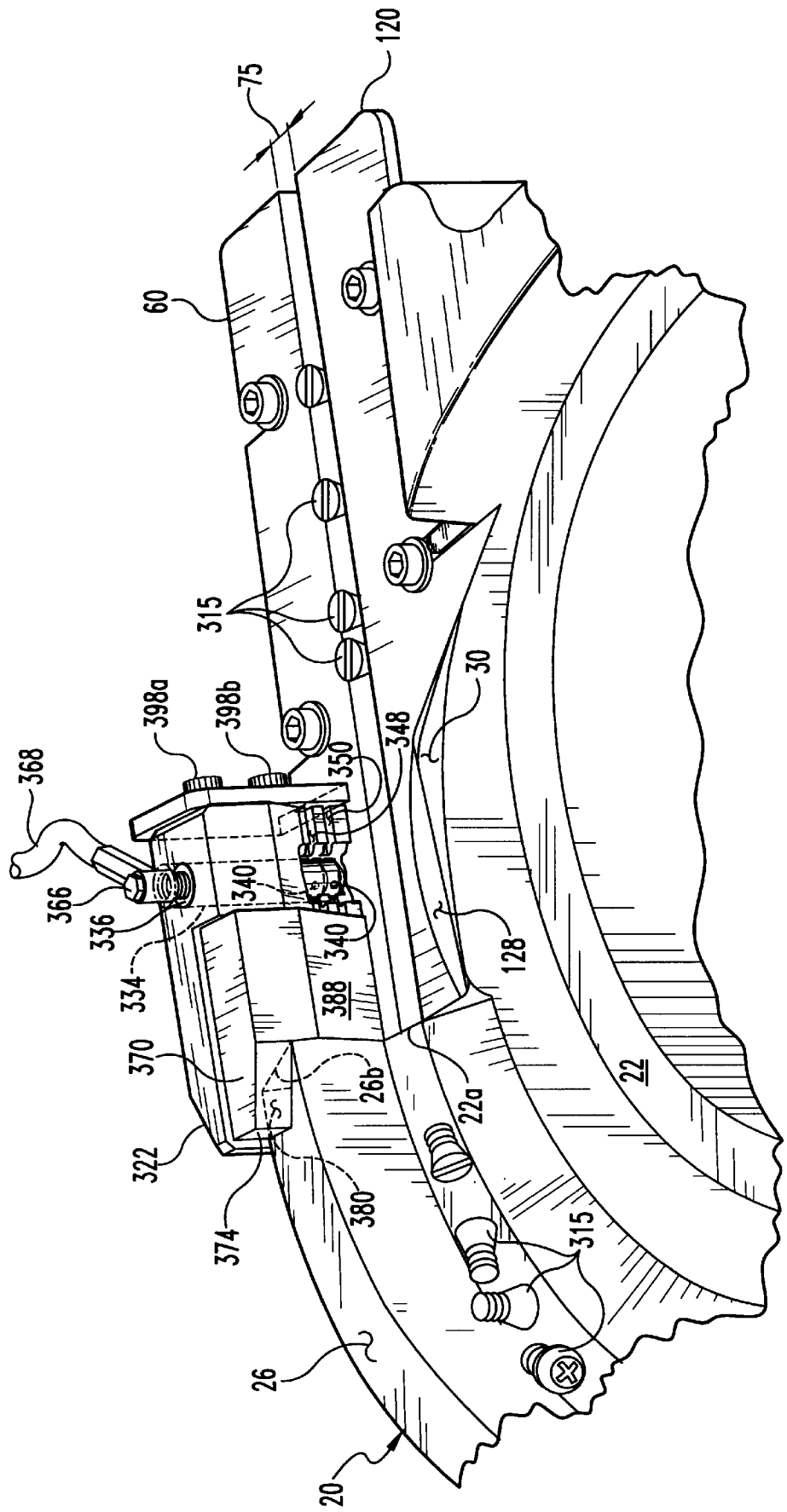

Referring specifically to FIGS. 13–15b, parts entrance unit 320 includes an air supply unit 322 connected to an improved guide block 370 which is attached to the parts orientation unit adjacent to the discharge port 22a of vibratory bowl 20. Although FIGS. 13, 15a and 15b show the parts entrance unit 320 as being connected to parts orientation unit 50 of FIGS. 1–4, it is to be understood that entrance unit 320 may be attached to parts orientation unit 300 in a manner identically to that described hereinafter. It should also be understood that air supply unit 322 is shown, and will be described hereinafter, as being used in conjunction with a parts orientation unit (50 or 300) operable to feed and orient elongated and headed parts as is known in the art, although the present invention contemplates utilizing air supply unit 322 with parts orientation unit configurations operable to feed and orient parts having configurations other than headed parts having elongated shafts extending therefrom. In any event, as most clearly shown in FIGS. 14a and 15a, guide block 370 includes a bottom surface 376 having a number of bores, preferably threaded, defined therein. In one embodiment, bottom surface 376 defines two such bores therein; bore 376a and bore 376b. Outer blade 60 of parts orientation unit 50 (alternatively, outer blade 302 of parts orientation unit 300) defines a pair of matching bores 312a and 312b therethrough. A pair of fasteners 378a and 378b extend through bores 312a and 376a, and 312b and 376b respectively, to attached guide block 370 to blade 60 (alternatively, to blade 302) adjacent parts discharge port 22a.

Guide block 370 defines a guide block body 372 having a bowl clamp member 374 extending from one side 378 thereof. Bowl clamp member 374 defines a bottom surface 380 which, when guide block 370 is attached to blade 60 (alternatively, blade 302) as described hereinabove, is in contact with a portion of upper rim 26 of bowl 20 adjacent edge 26b thereof. Preferably, the distance along side 378 between bottom surface 376 and bottom surface 380 of guide block 370 is sized slightly smaller than the distance between the top surface of blade 60 (alternatively blade 302) and upper rim 26 of vibratory bowl 20. As guide block 370 is attached to blade 60 (alternatively blade 302), bottom surface 380 thus forms a press fit against the upper rim 26 of bowl 20. This configuration permits the end of blade 60 (alternatively blade 302) adjacent to parts discharge port 22a to be rigidly clamped to the vibratory bowl 20 adjacent thereto. Preferably, bores 312a, 376a, 312b and 376b are positioned so that side 378 of guide block 370 contacts wall 26a of bowl 20 as bottom surface 380 of guide block 370 contacts upper rim 26 as discussed hereinabove. Since the end of blade 60 (alternatively, blade 302) adjacent to parts discharge port 22a is not otherwise attached to bowl 20 due to the presence of scrap shoot 32, such a clamping arrangement insures that the end of blade 60 (alternatively, blade 302) adjacent to parts discharge port 22a moves only under the direction of vibratory bowl 20, and does not vibrate separately therefrom.

Guide block 370 further defines a guide face 388 which, when guide block 370 is attached to blade 60 (alternatively, blade 302), faces channel 75 (alternatively, gap G). Guide face 388 provides the same function as guide face 86 of guide block 80 shown and described with respect to FIGS. 1–4, and will therefore not be discussed further here.

Guide block 370 further defines a back surface 386 in which a number of bores, preferably threaded, are defined therein. In one embodiment, back surface 386 of guide block 370 defines two such bores therein; a first bore 384a and a second bore 384b. Air supply block 322 defines a back surface 326 and an opposite front surface 328 through which a number of slots are defined. In one embodiment, two such slots, slot 324a and 324b, are defined through block 322. Face 328 of air supply block 322 terminates at face 327 of air supply housing 332, which face 327 extends perpendicularly away from face 328. A pair of fasteners 330a and 330b extend through slots 324a and 324b respectively, and into bores 384a and 384b respectively, to secure air supply block 322 to guide block 370. In so doing, surface 328 of air supply block 322 is in contact with back surface 386 of guide block 370, and surface 327 of guide block 322 is in contact with surface 382 of guide block 370. Slots 324a and 324b provide for the ability to adjust air supply block 322 vertically with respect to guide block 37.

Air supply housing 332 of air supply block 322 has a top surface 325 defining a bore 334 therein. Preferably, bore 334 is cylindrical in shape and has a predefined diameter. An air turret 336, having a diameter slightly less than the diameter of bore 334, is slidably received within bore 334. Preferably, air turret 336 is moveable within bore 334 both longitudinally, as shown by-directional arrow 335, and rotationally as shown by-directional arrow 337. Air turret 336 defines a bore 338, preferably threaded, longitudinally therein, and a smaller bore 340 transverse to the direction of bore 338. Bores 338 and 340 extend sufficiently into air turret 336 to establish fluid communication therebetween. In one embodiment, one such air turret 336 and corresponding bore 334 are provided, although the present invention contemplates providing multiple air turrets and corresponding bores such as air turret 360 and corresponding bore 358 as shown in phantom in FIG. 14*a*.

In any case, air supply block 322 defines an end face 365 opposite face 327 which defines a number of bores therein. In one embodiment, face 365 defines two such bores, bore 356*a* and 356*b*. A stop member, or plate, 390 defines a pair of slots 392*a* and 392*b* therethrough, and is attached to face 365 of air supply block 322 via a pair of fasteners 398*a* and 398*b* extending through slots 392*a* and 392*b* into bores 356*a* and 356*b* respectively. Stop member 390 defines a front edge 395 which, when stop member 390 is attached to air supply block 322, faces channel 75 of parts orientation unit 50 (alternatively, gap G of parts orientation unit 300). Slots 392*a* and 392*b* permit adjustable positioning of edge 395 toward and away the channel 75 (or gap G).

As most clearly shown in the cross-section of FIG. 14*c*, air supply housing 332 defines a housing face positioned opposite channel 75 of parts orientation unit 50 (alternatively, gap G of parts orientation unit 300). The housing face of air supply housing 332 defines a first portion 342 extending perpendicularly downwardly from top surface 325. Face 344 extends downwardly from face 342 and inwardly toward air supply housing 332. Face 346 extends downwardly from face 344 in a direction generally parallel to face 342. Face 346 defines a pair of slots, or grooves, 348 and 350 horizontally there across from surface 327 to end surface 365. As most clearly shown in FIG. 13, grooves 348 and 350 are provided with sufficient depth, and bore 334 is suitably positioned, such that a portion of grooves 348 and 350 extend into bore 334 to provide bore openings 352 and 354 respectively within grooves 348 and 350.

As most clearly shown in FIG. 15*a*, back surface 326 of air supply block 322 defines a bore, preferably threaded, 362 extending into bore 334 in a direction transverse to the longitudinal axis of bore 334. A set screw 364 extends through bore 362 into contact with air turret 336. By advancing set screw 364 into bore 362, air turret 336 may be secured within bore 334 in any desired position as will be discussed more fully hereinafter. While such a set screw 364 and bore 362 combination is used in one preferred embodiment for securing the position of air turret 336 within bore 334, the present invention contemplates utilizing other clamping techniques for selectively securing air turret 336 within bore 334, the importance of any such technique being that it should be operable to secure air turret 336 in any desired position within bore 334.

In the operation of air supply block 322, an air supply fitting 366 is connected at one end to bore 338 of air turret 336, and at an opposite end to a source of pressurized air via some type of conduit such as a hose 368. As most clearly shown in FIG. 15*b*, air turret 336 is slidably positionable within bore 334 such that air supply bore 340 is aligned with either groove 350, as shown, or with groove 348 as shown in phantom. The air turret 336 may further be rotatably positioned within bore 334 so that air supply bore 340 is positioned at any desired angle with respect to the longitudinal axis of channel 75 of parts orientation unit 50 (alternatively, gap G of parts orientation unit 300). It is to be understood that air supply bore 340 may be positioned at any angle between that directly opposing parts 315 supplied to parts orientation unit 50 via discharge port 22*a* as shown in FIG. 15*b*, and the direction of parts advancing along channel 75 downstream of air supply block 33 as shown in FIG. 15*b*, thereby encompassing approximately 180° of adjustability.

Face 346 of air supply housing 332 is recessed from face 342 in order to decrease the likelihood of parts jamming within the parts orientation unit, as well as the likelihood of parts escaping therefrom. By recessing face 346 within air supply housing 332, and by providing for the attachment of stop plate 390 at end face 365 thereof, an area of air turbulence is created between face 346 and surface 394 of stop plate 390 (see FIG. 14*c*). Thus, any improperly oriented parts 315 (FIG. 15*b*) or 317 (FIG. 14*c*), such as those extending across channel 75, will be directed back into vibratory bowl 20 via such air turbulence.

From the foregoing, it should now be apparent that the air supply block 322 of the present invention provides for a high degree of adjustability of air supply direction. For example, two separate mechanisms are provided for adjusting the height above parts orientation unit 50 (alternatively parts orientation unit 300) at which pressurized air is provided there across. First, air turret 336 may be adjustably positioned within bore 334 to align air supply bore 340 within either of groves 348 or 350. It is to be understood that the present invention contemplates providing any number of such groves within face 346 to provide for either greater or lesser capability for longitudinal adjustment of air supply bore 340 within bore 334. Secondly, the entire air supply block 322 may be adjustably positioned relative to guide block 370 by adjusting the position of fasteners 330*a* and 330*b* within elongated slots 324*a* and 324*b* of air supply block 322. By either of the foregoing mechanisms or a combination of the two, air supply block 322 may be suitably manipulated to provide a supply of pressurized air across parts orientation unit 50 (alternatively, parts orientation unit 300) at any desired height there above. Moreover, one or more air turrets 336 may be rotationally positioned and secured within its corresponding bore to supply the pressurized air at any angle between approximately zero and 180° relative to the longitudinal axis of channel 75 (or gap G).

Figure 16:
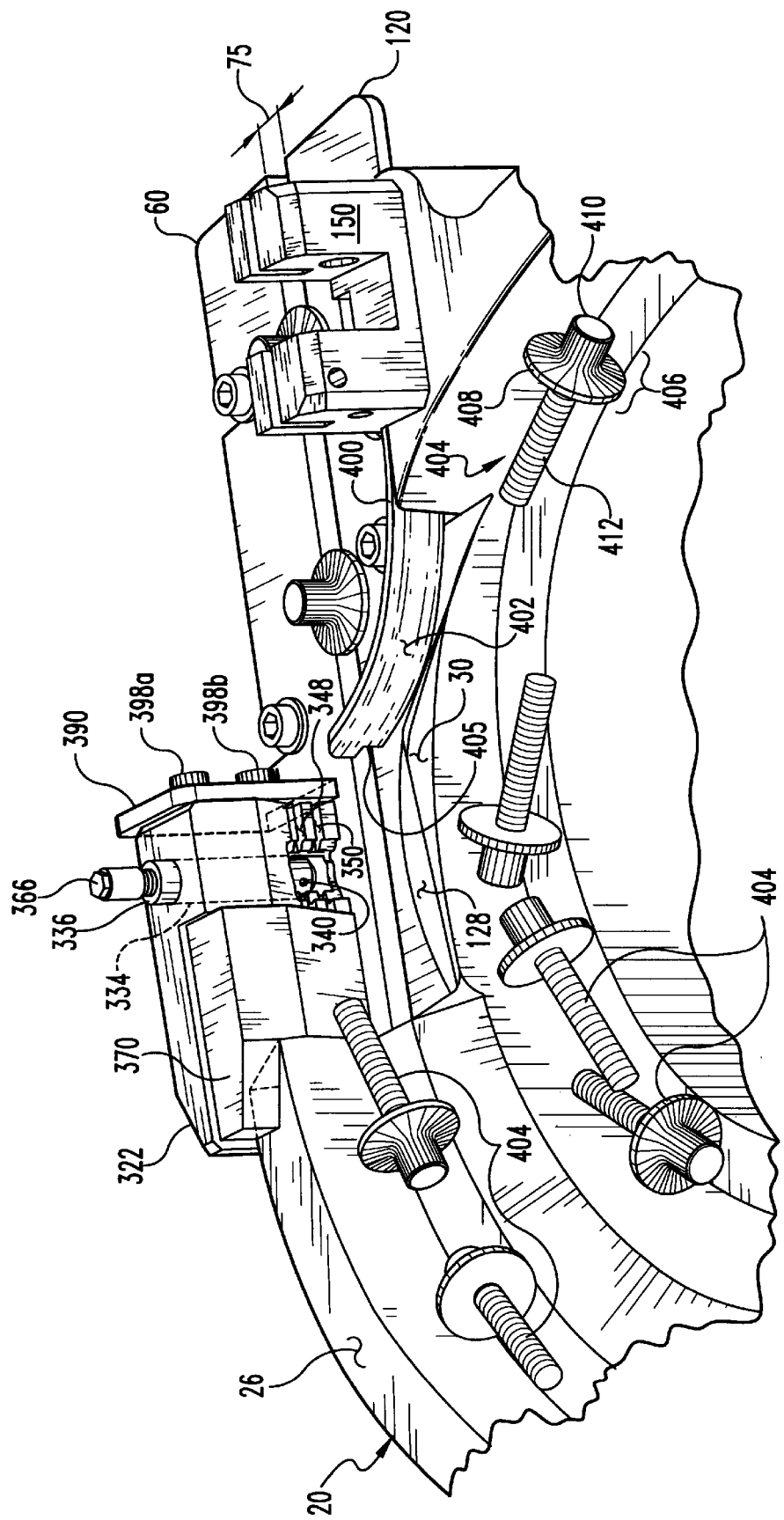
FIG. 16 is a view similar to that of FIG. 15b showing another embodiment of the parts receiving unit, in accordance with the present invention.
Figure 17:
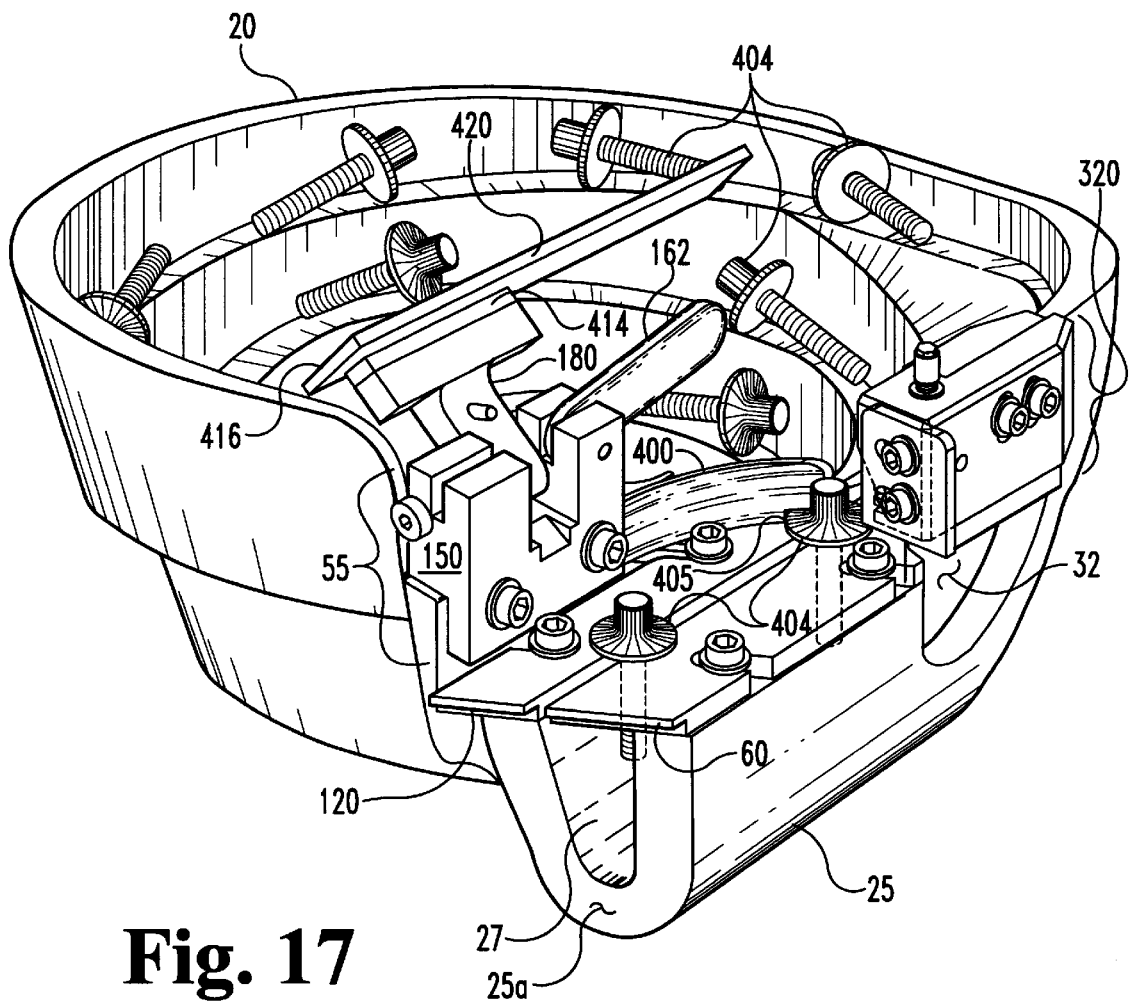
FIG. 17 is a front perspective view of the embodiment shown in FIG. 16.
Figure 18:
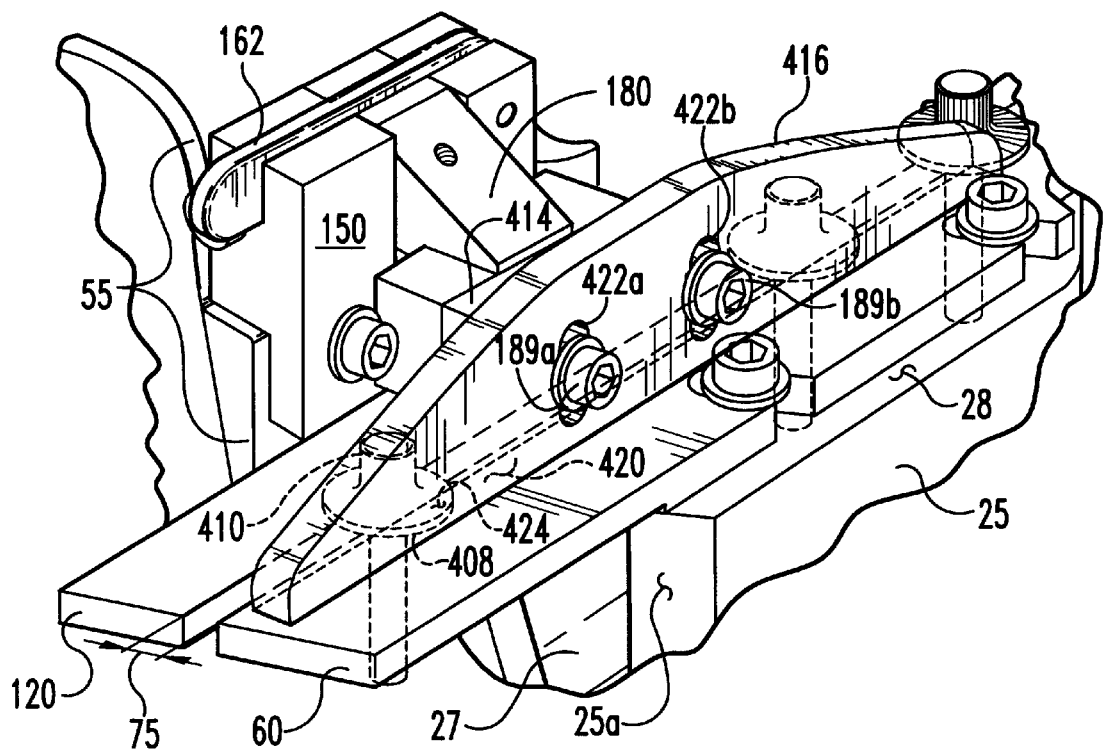
FIG. 18 is a view similar to that of FIGS. 4 and 12 illustrating details of the top confinement member of FIG. 17 in its parts confining position.

Referring now to FIGS. 16–18, alternative embodiments of some of the structural features of either parts orientation unit 50 of FIGS. 1–4 or parts orientation unit 300 of FIGS. 11–12 will now be described. The present invention contemplates providing for the feeding and orientation of a variety of variously configured headed parts. An example of one such headed part 404 is illustrated in FIG. 16 which includes a head portion 406 and an elongated shaft portion 412 extending therefrom. The head portion 406 includes a flange 408 radially extending from a cap portion 410 adjacent to the shaft 412. Such a part 404 includes most of its weight in the head portion 406, and presents unique concerns in the feeding and orientation thereof. For example, if the deflector 140 illustrated in FIGS. 1 and 3 is used with pivotal top confinement apparatus 55, parts 404 may accumulate on the top surface of blade 120 (alternatively, blade 304) adjacent surface 141 of deflector 140 (see FIG. 1) which may then topple over deflector 140 into pivotal top confinement apparatus 55 and eventually cause a parts jam. To address this particular situation, and to otherwise provide an alternatively shaped deflector, another embodiment of a deflector 400 is shown in FIG. 16. As illustrated, the portion of deflector 400 corresponding to the angled portion 144 of deflector 140 is generally sloped or curved rather than providing a distinct angle α relative to the remaining portion of the deflector. Further, this curved feature permits the parts directing surface 402 of deflector 400 to extend to the edge of blade 120 adjacent surface 30 of vibratory bowl 20. Deflector 400 further includes a cutout 405 adjacent to channel 75 (or gap G) for allowing passage of flange 408 therethrough as most clearly shown in FIG. 16. Deflector 400 is thus operable to direct any misoriented parts 404 traveling along the top surface of blade 120 (alternatively, blade 304) back into the vibratory bowl 20. Those skilled in the art will recognize that the use of deflector 400 may be desirable for use with headed parts having configurations other than parts 404.

Referring now to FIGS. 17–18, a modification of pivotal top confinement apparatus 55 is shown which illustrates a technique for providing top confinement at a location other than centrally over the parts orientation channel. Such a technique is particularly well suited for confining parts 404 described hereinabove which have a flange portion 408 radially extending therefrom. In such a case, pivotal top confinement apparatus 55 includes an extension block 414 provided between pivot block 180 and top confinement blade 416. Extension block 414 has sufficient thickness such that the parts confining surface 420 of top confinement blade 416 is disposed over the flange portion 408 of parts 404 with the cap portions 410 positioned between the pivotal top confinement apparatus 55 and the top confinement blade 416. The top confinement blade 416 defines a pair of elongated slots 422a and 422b therethrough and fasteners 189a and 189b extend therethrough, as well as through extension block 414, into engagement with pivoting block 180. The height of confining surface 420 of top confinement blade 416 relative to parts orientation unit So (alternatively, parts orientation unit 300) can thus be adjusted by suitably positioning fasteners 189a and 189b within elongated slots 422a and 422b respectively.

It should now be apparent from the foregoing that the pivotal top confinement apparatus 55 need not position the top confinement blade 416 centrally over the parts to be confined, but may rather be offset therefrom as desired to provide for suitable top confinement. Although FIGS. 17–18 illustrate the use of an extension block to position the parts confining surface 420 of the top confinement blade 416 further away from the pivotal top confinement apparatus 55, it is to be understood that pivot block 180 may alternatively be configured to initially position the parts confining surface 420 of top confinement blade 416 between pivotal top confinement apparatus 55 and channel 75, and extension blocks 414 of varying thickness may be subsequently added to move the confining surface 420 away from pivotal top confinement apparatus 55 and across channel 75 as desired.

Figure 9:
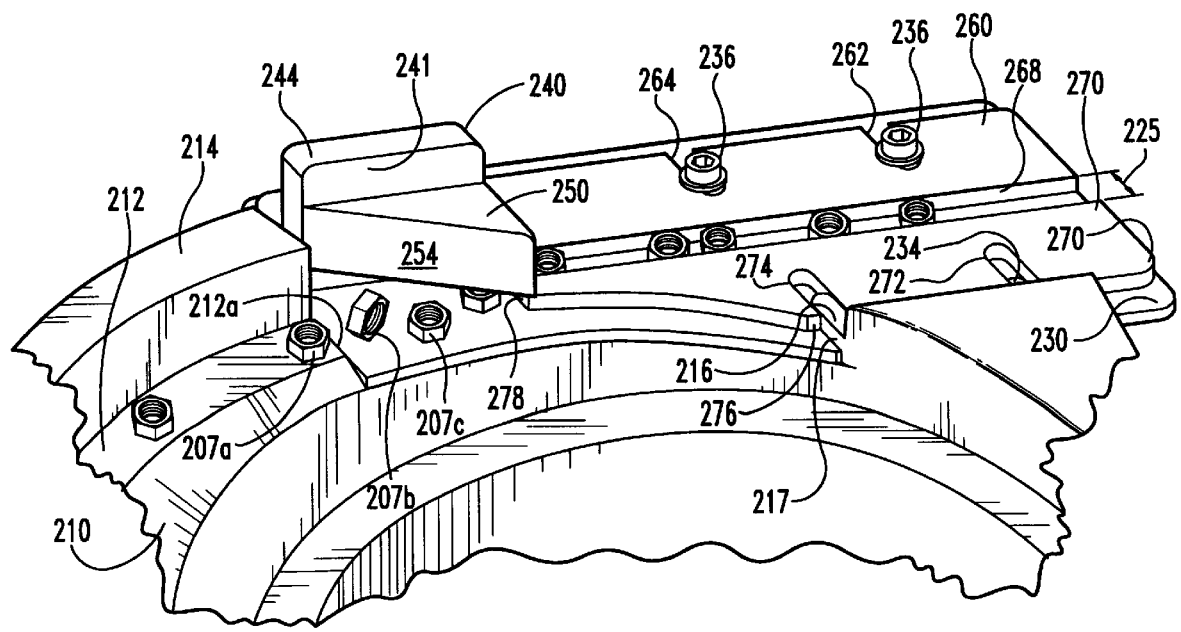
FIG. 9 is a left perspective view of the embodiment shown in FIG. 7, with the pivotal top confinement structure omitted therefrom for clarity, showing details of the parts entrance block and parallel blades.
Figure 19:
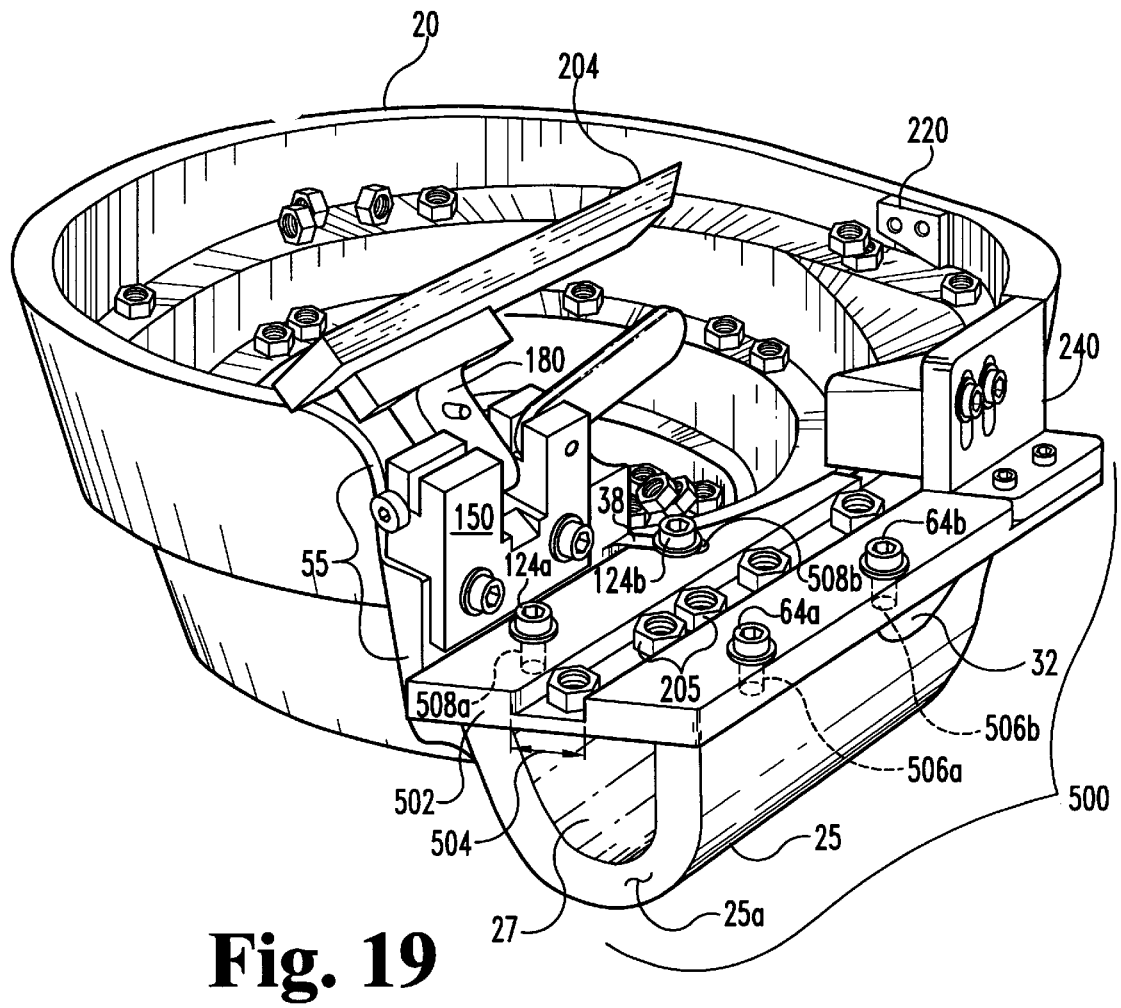
FIG. 19 is a front perspective view of the vibratory bowl of FIG. 10 showing yet another embodiment of parts orientation tooling attached thereto in accordance with the present invention.

Referring now to FIG. 19, another embodiment of a parts orientation unit 500 for use in conjunction with vibratory bowl 20 and pivotal top confinement apparatus 55 of FIG. 10, is shown. Parts orientation unit 500 includes a substantially flat parts orientation tooling unit 502 defining bores 506a, 506b and 508a, as well as channel 508b, therethrough. Bore 506a is aligned with insert 42a, bore 506b is aligned with insert 42b, bore 508a is aligned with insert 44b, and channel 508b is configured to receive projection 38 therein while aligning with insert 44a. Parts orientation tooling unit 502 may thus be attached to surfaces 28 and 30 of parts orientation member 25 via fasteners 64a, 64b, 124a and 124b as discussed hereinabove. Parts orientation tooling unit 502 defines a rectangular channel 504 longitudinally therethrough having a predefined depth and width. The width and depth of channel 504 are appropriately sized to feed and orient low profile parts such as threaded nuts 205, washers, and the like. The remaining components illustrated in FIG. 19 are identical to those previously discussed with respect to FIGS. 7–9, and include top confinement blade 204, sweep 220 and entrance mount 240.

Figure 20:
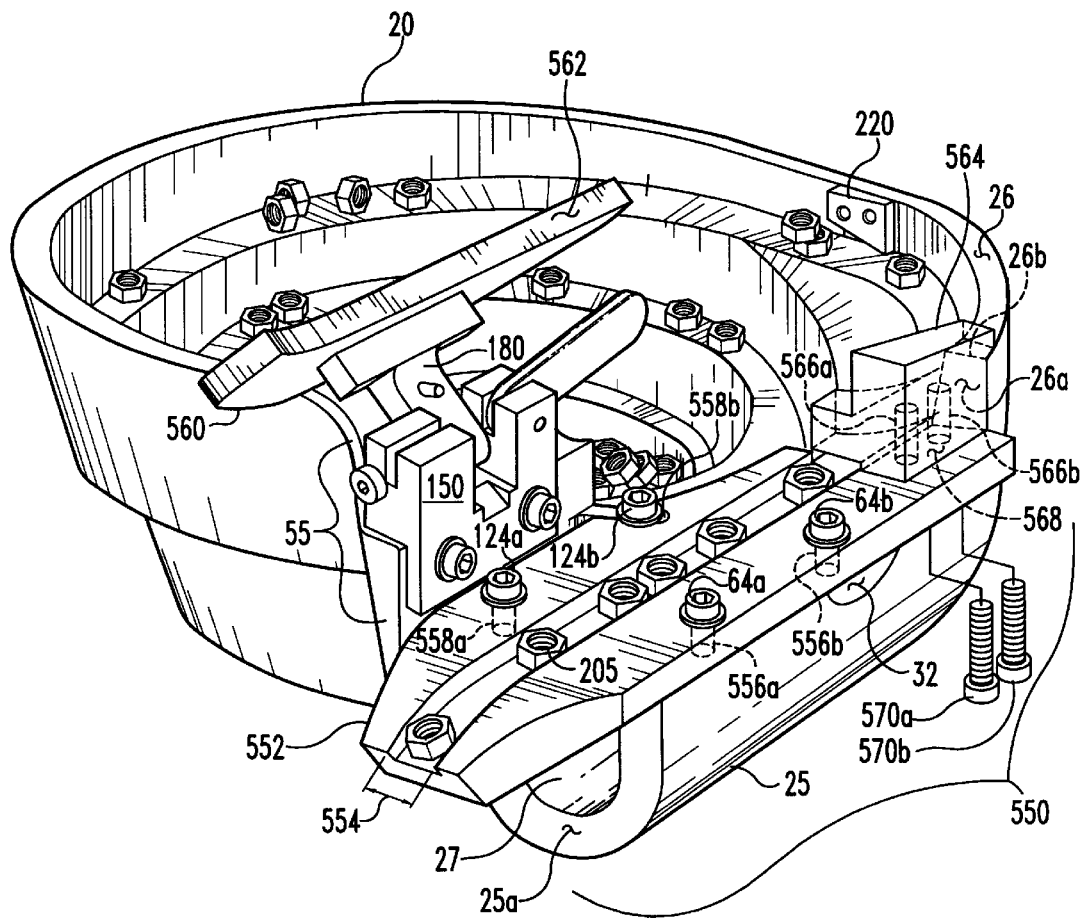
FIG. 20 is a front perspective view of the vibratory bowl of FIG. 10 showing still another embodiment of parts orientation tooling attached thereto in accordance with the present invention.

Referring now to FIG. 20, a modification 550 of the parts orientation unit 500 is shown which includes a parts orientation tooling unit 552 defining bores 556a, 556b, 558a and channel 558b therethrough identical to bores 506a, 506b, 508a and channel 508b of tooling unit 502 respectively. As with tooling unit 502, tooling unit 552 is thus attachable to inserts 42a, 42b, 44a and 44b via fasteners 64a, 64b, 124a and 124b respectively. Tooling unit 552 further defines a rectangular channel 554 longitudinal therethrough having a desired depth and width as discussed hereinabove with respect to channel 504 of FIG. 19. Unlike tooling unit 502, however, tooling unit 552 provides a portion thereof beyond end wall 25a of parts orientation member 25 that is generally curved downwardly with a predefined slope and tapered inwardly toward channel 554. Preferably, tooling unit 552 slopes away from a plane defined by surfaces 28 and 30 of bowl 20 at an angle of approximately 35°, although the present invention contemplates providing the sloped portion of tooling unit 552 at other angles. As with parts orientation unit 300 of FIGS. 11–12, pivotal top confinement apparatus 55 is provided with a top confinement blade 560 having a parts confining surface 562 that is sloped complimentarily to that of tooling unit 552.

Figure 21:
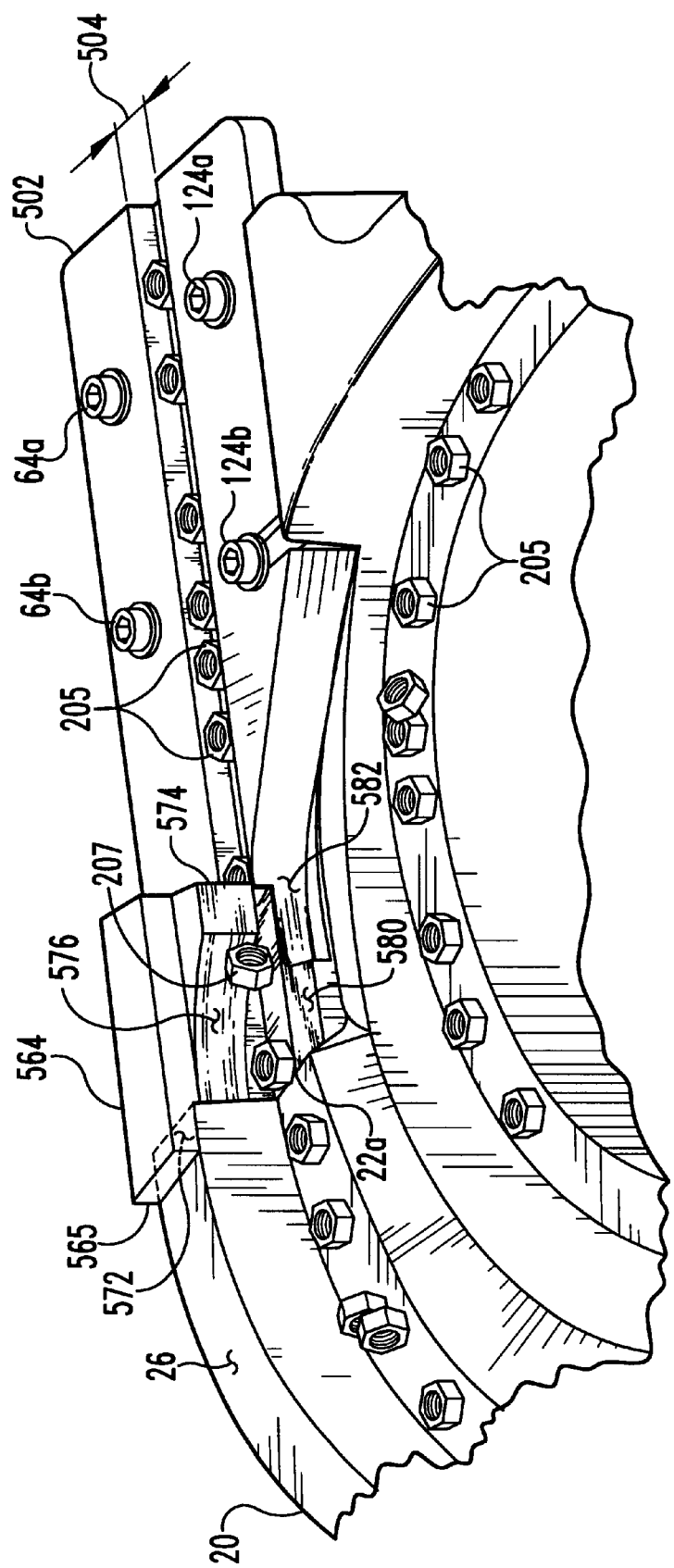
FIG. 21 is a view similar to that of FIGS. 5 and 6 showing the embodiment of FIG. 19 with an alternate entrance block attached thereto, in accordance with another aspect of the present invention.

Referring now to FIGS. 19–21, either of the parts orientation units 500 or 550 may include an alternate entrance block 564 attached thereto. Preferably, tooling units 500 and 552 each define a pair of bores therethrough (not shown) which align with bores 556a and 566b defined in a bottom surface 568 of entrance block 564. Fasteners 570a and 570b thus extend through tooling unit 500 or 550 into bores 566a and 566b respectively to thereby attach entrance block 564 to tooling unit 500 or 550. As most clearly shown in FIG. 21, entrance block 564 preferably includes a clamp member 565 extending therefrom which defines a bottom surface 572 that forms a press fit with upper rim 26 of vibratory bowl 20 when entrance unit 564 is attached to tooling unit 500 or 550. As discussed hereinabove, such a feature insures that the end of tooling unit 500 or 550 extending over scrap chute 32 adjacent to discharge port 22a is secured to vibratory bowl 20.

Entrance unit 564 further includes a projection 574 extending over channel 504 which defines a generally concave vertical face 576 between entrance unit 564 and the end of projection 574. The top surface 580 of tooling unit 500 or 550 between discharge port 22a and protrusion 574 is configured to be level approximately with the bottom of channel 504, and a portion 582 of tooling unit 500 or 550 adjacent to protrusion 574 has been removed. As most clearly illustrated in FIG. 21, parts 205 having orientations other than those aligned with channel 504 are directed back into the vibratory bowl 20. For example, parts standing on end, such as part 207, are directed by concave face 76 into the cutout portion 582 of the tooling unit and back into the interior of vibratory bowl 20. Similarly, flat parts that are not aligned with channel 504 are directed onto surface 580 and into the cutout portion 582 which are thereby directed back into the interior of vibratory bowl 20.

Figure 22:
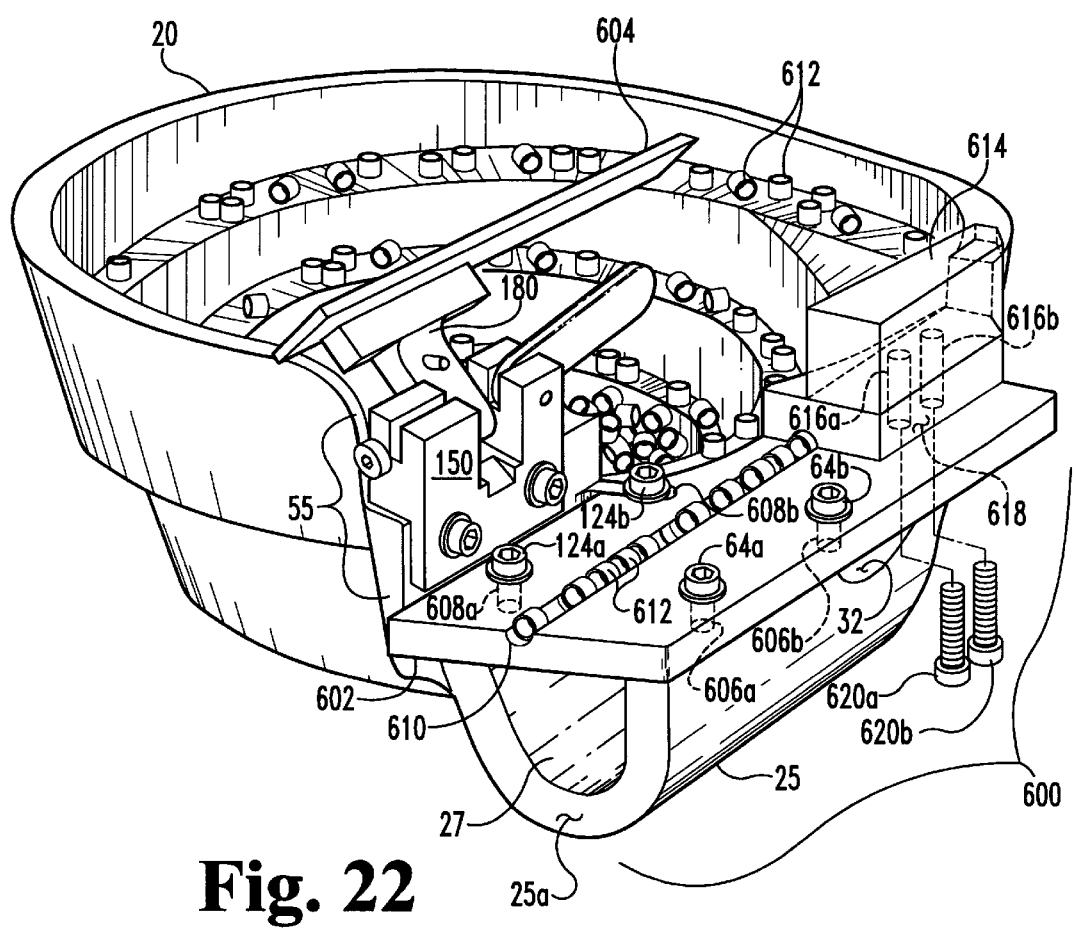
FIG. 22 is a front perspective view of the vibratory bowl of FIG. 10 showing a further embodiment of parts orientation tooling attached thereto in accordance with the present invention.

Referring now to FIG. 22, yet another parts orientation unit 600 for use in conjunction with the vibratory bowl 20 and pivotal top confinement apparatus 55 of FIG. 10 is shown. Parts orientation unit 600 includes a substantially flat parts orientation tooling unit 602 defining bores 606a, 606b, 608a, as well as channel 608b therethrough, which align with inserts 42a, 42b, 44a, and 44b respectively. Tooling unit 602 may thus be detachably mounted to surfaces 28 and 30 of parts orientation member 25 via fasteners 64a, 64b, 124a and 124b as discussed hereinabove. Tooling unit 602 defines a generally concave channel 610 longitudinally therethrough for feeding and orienting correspondingly configured parts 612. Concave channel 610 may be symmetrical about a center axis thereof, and may be sized to have a predefined radius. As such, parts 610 may be cylindrical or tubular in shape, with an outer radius complimentary to the radius of channel 610.

Pivotal top confinement apparatus 55 includes a generally flat top confinement blade 604 which may be suitably adjusted as discussed hereinabove to confine parts 612 within channel 610.

Figure 23:
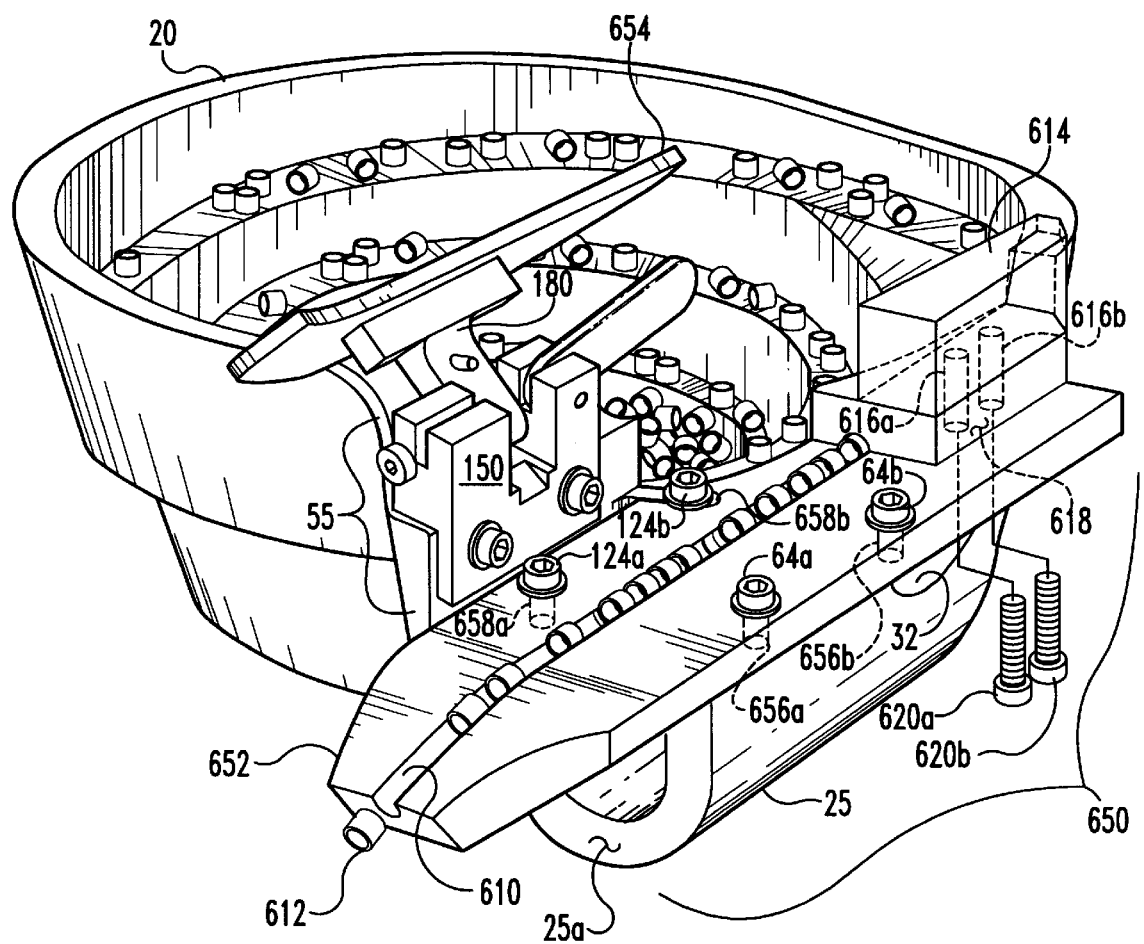
FIG. 23 is a front perspective view of the vibratory bowl of FIG. 10 showing still a further embodiment of parts orientation tooling attached thereto in accordance with the present invention.

Referring now to FIG. 23, a modification 650 of the parts orientation unit 600 is shown which includes a parts orientation tooling unit 652 defining bores 656a, 656b, 658a, as well as channel 658b therethrough. As with tooling unit 600, the bores and channel align with inserts 42a, 42b, 44a and 44b such that tooling unit 650 may be attached to surfaces 28 and 30 of parts orientation member 25 via fasteners 64a, 64b, 124a and 124b. Tooling unit 652 further defines channel 610 longitudinally therethrough, identical to channel 610 of tooling unit 600, for feeding and orienting parts 612. Unlike tooling unit 602, however, tooling unit 652 includes a portion thereof extending beyond end wall 25a of parts orientation member 25 that is sloped generally downwardly away from surfaces 28 and 30 and tapered inwardly toward channel 610. Preferably, this curved portion is sloped at an angle of approximately 35° downwardly from a plane defined by surfaces 28 and 30 of parts orientation member 25, although the present invention contemplates providing this curved portion with other desired angles. As discussed with reference to FIGS. 11–12 and 20, pivotal top confinement apparatus 55 includes a top confinement blade 654 attached thereto which has a parts confining surface configured complimentarily to the curved surface of tooling unit 652.

Parts orientation unit 600 and 650 each define a pair of bores therethrough (not shown) which align with bores 616a and 616b defined in a bottom surface 618 of entrance block 614. A pair of fasteners 620a and 620b extend through tooling unit 602 or 652 into engagement with bores 616a and 616b of entrance unit 614 to thereby attach entrance unit 614 to either of tooling units 602 or 652.

Figure 24:
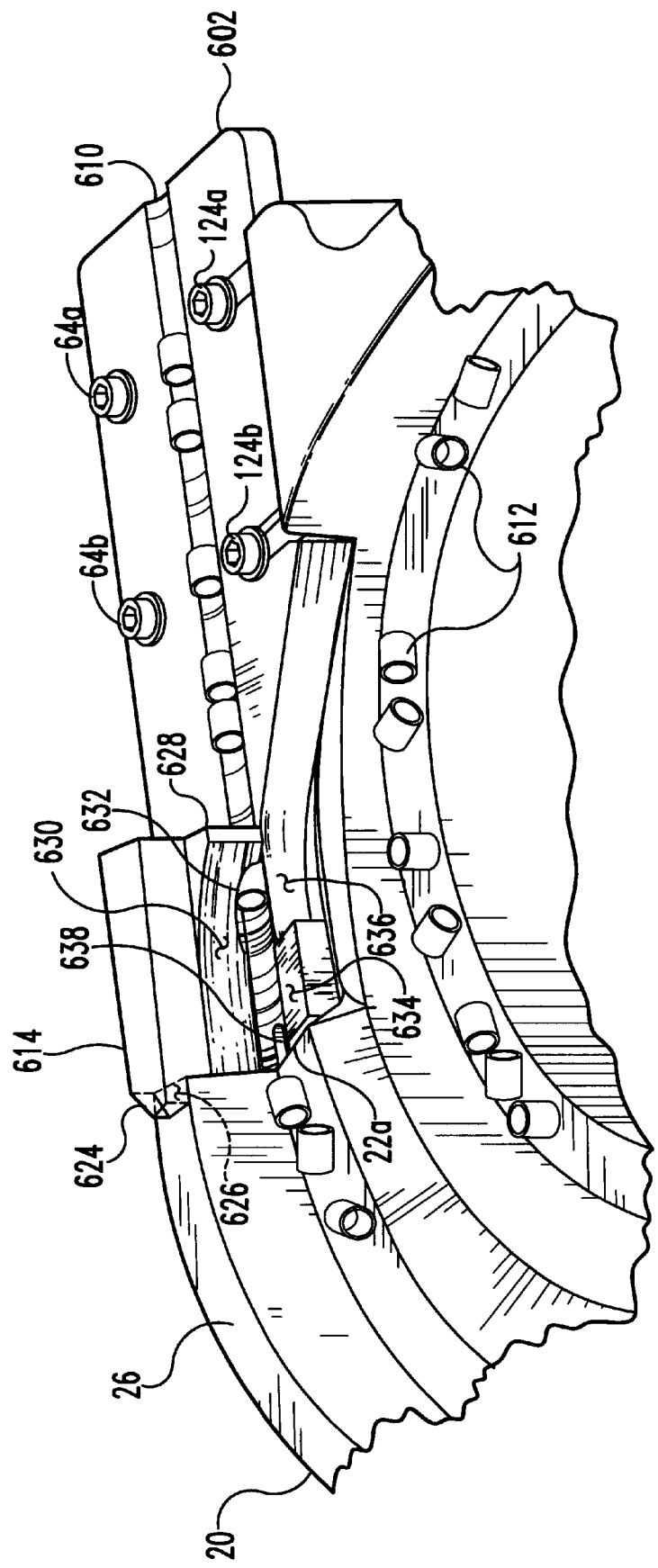
FIG. 24 is a view similar to that of FIGS. 5 and 6 showing further details of the embodiment of FIG. 22.

Referring now to FIG. 24, entrance unit 614 includes a clamp member 624 extending therefrom defining a bottom surface 626 forming a press fit with upper rim 26 of vibratory bowl 20 as entrance unit 614 is attached to tooling unit 602 or 652. In this manner, the end of tooling unit 602 or 652 positioned above scrap chute 32 and adjacent to discharge port 22a is secured to vibratory bowl 20 as discussed hereinabove. Entrance block 614 further includes a projection 628 extending over channel 610 which defines a generally concave surface 630 extending in front of channel 610 adjacent to parts discharge port 22a. Over channel 610, projection 628 defines a recess 632 having a generally concave profile that is shaped complimentarily to the outer surface of parts 612. As discussed with respect to FIG. 21, tooling units 602 and 652 define a surface 634 between discharge port 22a and protrusion 628 that is approximately level with the bottom of channel 610, and further includes a cutout portion 636 adjacent to protrusion 628. As discussed with respect to FIG. 21, the concave surface 630 of protrusion 628, as well as surfaces 634 and cutout portion 636 are operable to direct parts 612 having orientations other than those directly aligned with channel 610, back into the interior of vibratory bowl 20.

Channel 610 further defines a scrap port 638 therethrough adjacent to discharge port 22a that is open to scrap chute 32. Scrap port 638 is operable to direct small scrap particles from parts 612 into scrap chute 32 in order to reduce the presence of scrap particles in and around the parts orientation unit. Although scrap port 638 is shown and described only with respect to channel 610 of FIG. 24, it is to be understood that such a scrap port may be provided within the parts orientation channels of any of the closed channel embodiments discussed herein. Moreover, such a scrap port need not be positioned directly adjacent to discharge port 22a, but may be positioned anywhere along the parts orientation channel so long as such a scrap port is in communication with the scrap chute 32 of vibratory bowl 20.

Figure 25:
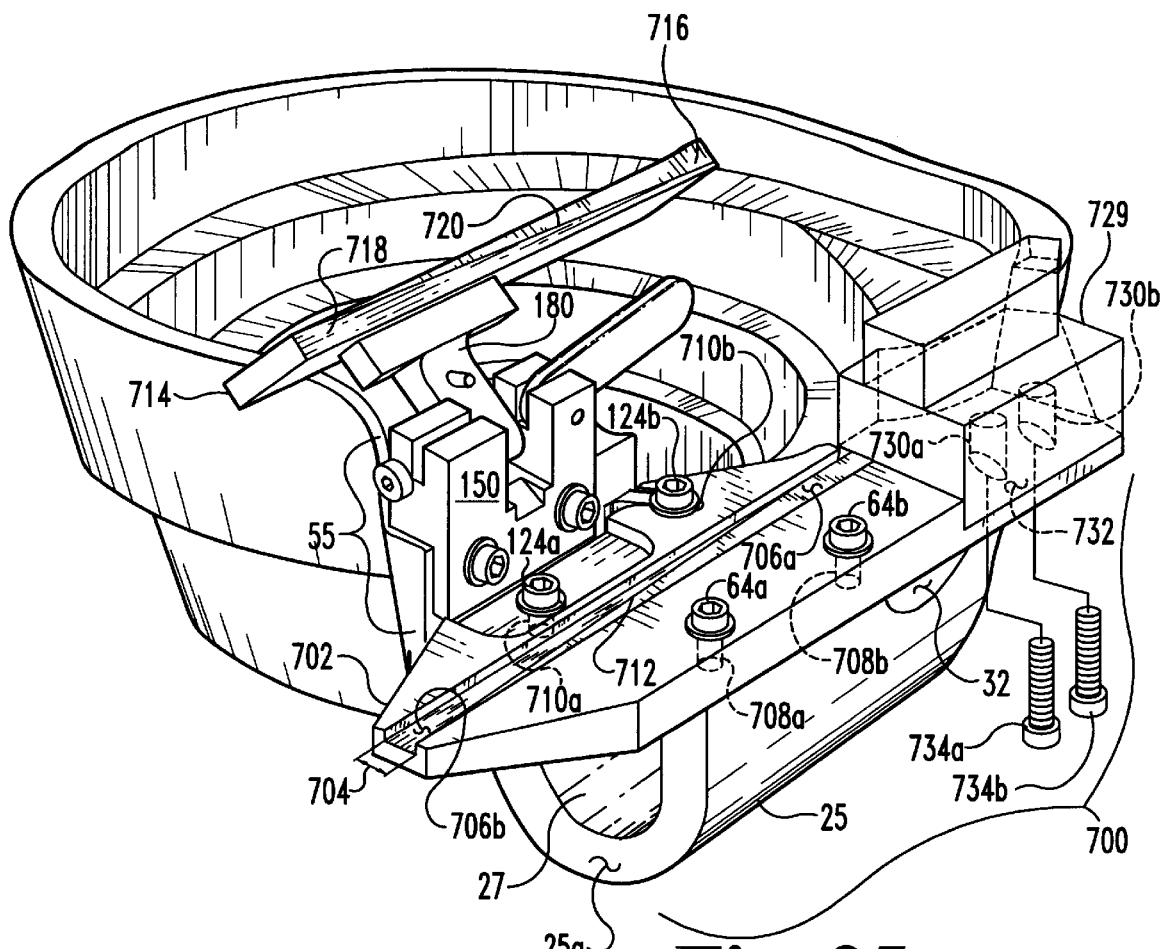
FIG. 25 is a front perspective view of the vibratory bowl of FIG. 20 showing yet a further embodiment of parts orientation tooling attached thereto in accordance with the present invention.

Referring now to FIG. 25, still another embodiment of a parts orientation unit 700, for use in conjunction with the vibratory bowl 20 and pivotal top confinement apparatus 55 of FIG. 10 is shown. Parts orientation unit 700 includes a substantially flat parts orientation tooling unit 702 defining bores 708a, 708b, 710a, as well as channel 710b, therethrough, which align with inserts 42a, 42b, 44a and 44b of surfaces 28 and 30 respectively of parts orientation member 25. Fasteners 64a, 64b, 124a and 124b are thus used to attach tooling unit 702 to parts orientation member 25 of vibratory bowl 20 as discussed hereinabove. Tooling unit 702 defines a rectangular channel 704 longitudinally therethrough having a predetermined depth and width. Channel 704 defines a first channel surface 706a at one end of tooling unit 702 adjacent discharge port 22a and a second channel surface 706b at an opposite end thereof. A diagonal line 712 extends across channel 704 and defines channel surfaces 706a and 706b on either side thereof. Preferably, channel surface 706a is sloped away from pivotal top confinement apparatus 55 in a direction perpendicular to a longitudinal axis of channel 704, and channel surface 706b is generally parallel with a plane defined by surfaces 28 and 30 of vibratory bowl 20. In one embodiment, channel surface 706a is sloped downwardly away from channel surface 706b at an angle of approximately 10° relative thereto, although the present invention contemplates sloping channel surface 706a downwardly away from channel surface 706b at any desired angle. The end of tooling unit 702 adjacent to channel surface 706b is tapered inwardly toward channel 704.

Figure 25A:
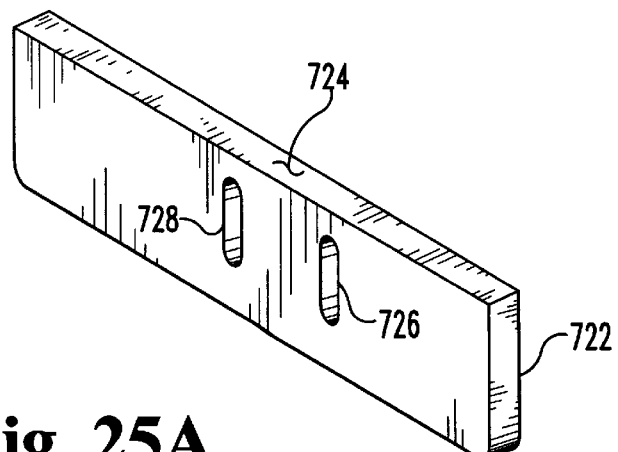
FIG. 25a is a perspective view illustrating an alternate embodiment of parts confining surface of the parts confining blade of FIG. 25.

Pivotal top confinement apparatus 55 includes a top confinement blade 714 attached thereto which defines a first parts confining surface 716 adjacent one end thereof, a second parts confining surface 718 adjacent an opposite end thereof, and a diagonal line 720 extending across the parts confining surface of top confinement blade 714 to define surfaces 716 and 718 therebetween. Preferably, parts confining surfaces 716 and 718 of top confinement blade 714 are configured complimentarily to channel surfaces 706a and 706b respectively. Thus, parts confining surface 718 is preferably substantially flat, whereas parts confining surface 716 slopes away from surface 718 at an angle of approximately 10°. An alternative embodiment of top confinement blade 722 is shown in FIG. 25a, which defines a parts confining surface 724 that is sloped perpendicularly away from a longitudinal axis thereof. In one embodiment, parts confining surface 724 is sloped away from pivot block 180 at an angle of approximately 5°. In either case, top confinement blade 714 or 722 define a pair of elongated slots 726 and 728 therethrough for attachment to pivot block 180 as described hereinabove.

Figure 27:
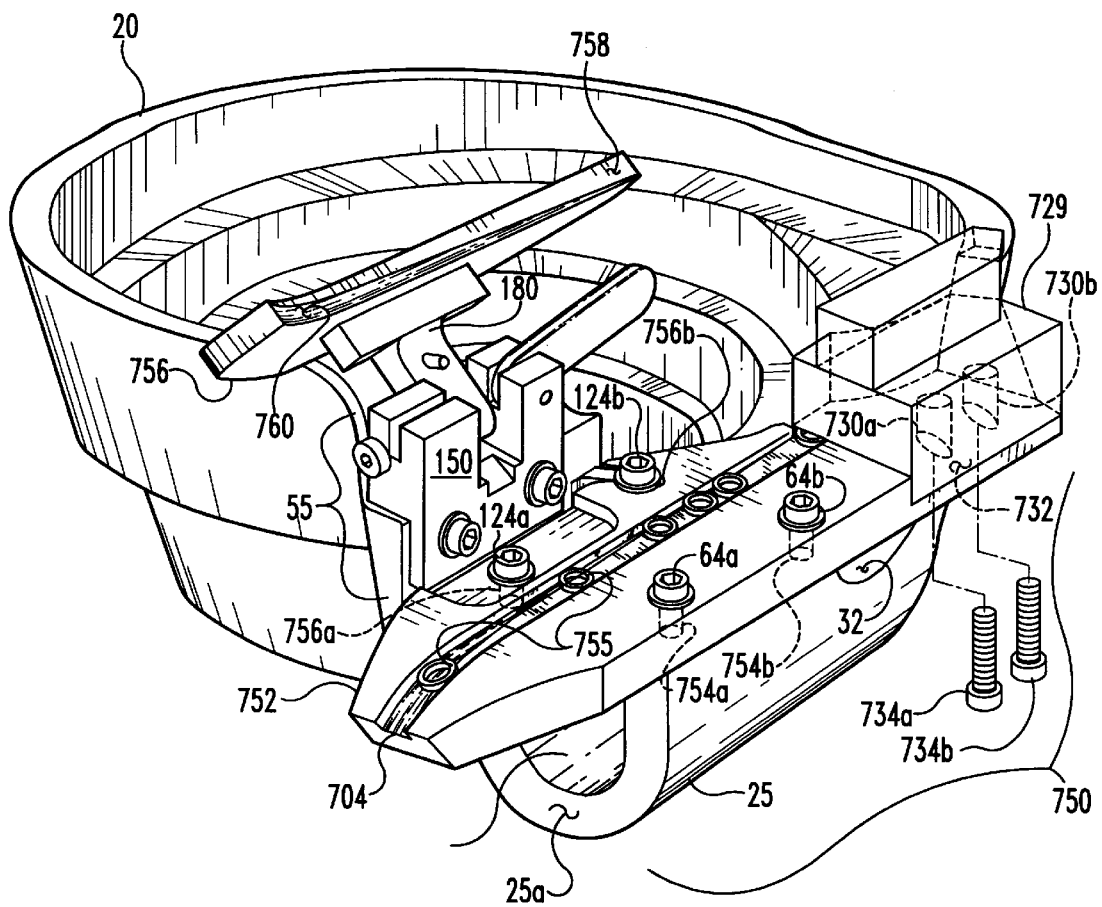
FIG. 27 is a front perspective view of the vibratory bowl of FIG. 10 showing yet another embodiment of parts orientation tooling attached thereto in accordance with the present invention.
Figure 27A:
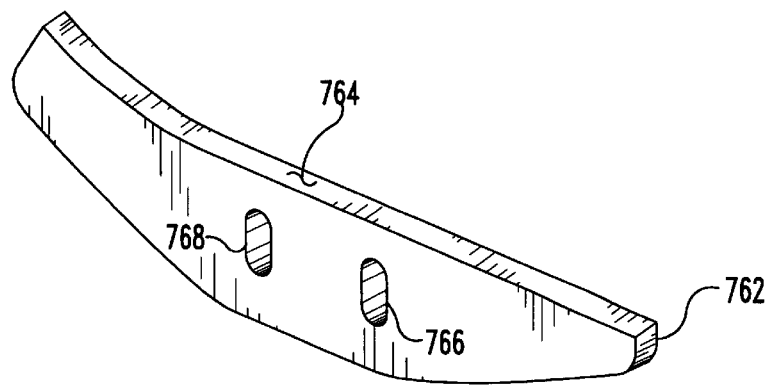
FIG. 27A is a perspective view illustrating an alternate embodiment of parts confining surface of the parts confining blade of FIG. 27.

Referring now to FIG. 27, a modification 750 of the parts orientation unit 700 of FIG. 25 is shown. Parts orientation unit 750 includes a parts orientation tooling unit 752 defining bores 754a, 754b, 756a, and slot 756b, therethrough which align with inserts 42a, 42b, 44a and 44b respectively of vibratory bowl 20. As with tooling unit 702, tooling unit 752 is similarly attachable to surfaces 28 and 30 of parts orientation member 25 via fasteners 64a, 64b, 124a and 124b. Tooling unit 752 further defines a channel 704, identical to channel 704 of tooling unit 702, longitudinally therethrough. Unlike tooling unit 702, however, tooling unit 752 includes a curved portion thereof extending away from end surface 25a of parts orientation member 25 that is sloped generally downwardly at a predefined angle away from a plane defined by a surfaces 28 and 30 of parts orientation member 25 and is tapered inwardly toward channel 704 curved. Preferably, this portion of tooling unit 752 is sloped downwardly at an angle of approximately 35° relative to surfaces 28 and 30, although the present invention contemplates providing such a slope at any desired angle relative to surfaces 28 and 30. Pivotal top confinement apparatus 55 includes a top confinement blade 756 having parts confining surfaces 758 and 760 configured identically to surfaces 716 and 718 respectively of top confinement blade 714 (FIG. 25), wherein surface 760 is further configured complimentarily to the curved surface of tooling unit 752. Alternatively, top confinement blade 762 of FIG. 27A may be attached to pivot block 180 wherein blade 762 defines a parts confining surface 764 configured identically to parts confining surface 724 of top confinement blades 722, yet surface 764 is sloped complimentarily to the top surface of tooling unit 752. In either case, top confinement blade 756 or 764 define a pair of elongated slots 766 and 768 therethrough for adjustable attachment to pivot block 180 as described hereinabove.

Parts orientation units 700 and 750 each include an entrance block 729 attached thereto. Tooling units 702 and 752 each define a pair of bores therethrough (not shown) which align with bores 730a and 730b defined in a bottom surface 732 of entrance block 729. Fasteners 734a and 734b extend through tooling unit 702 or 752 into engagement with bores 730a and 730b respectively to attach entrance block 729 to tooling unit 702 or 752.

Figure 26:
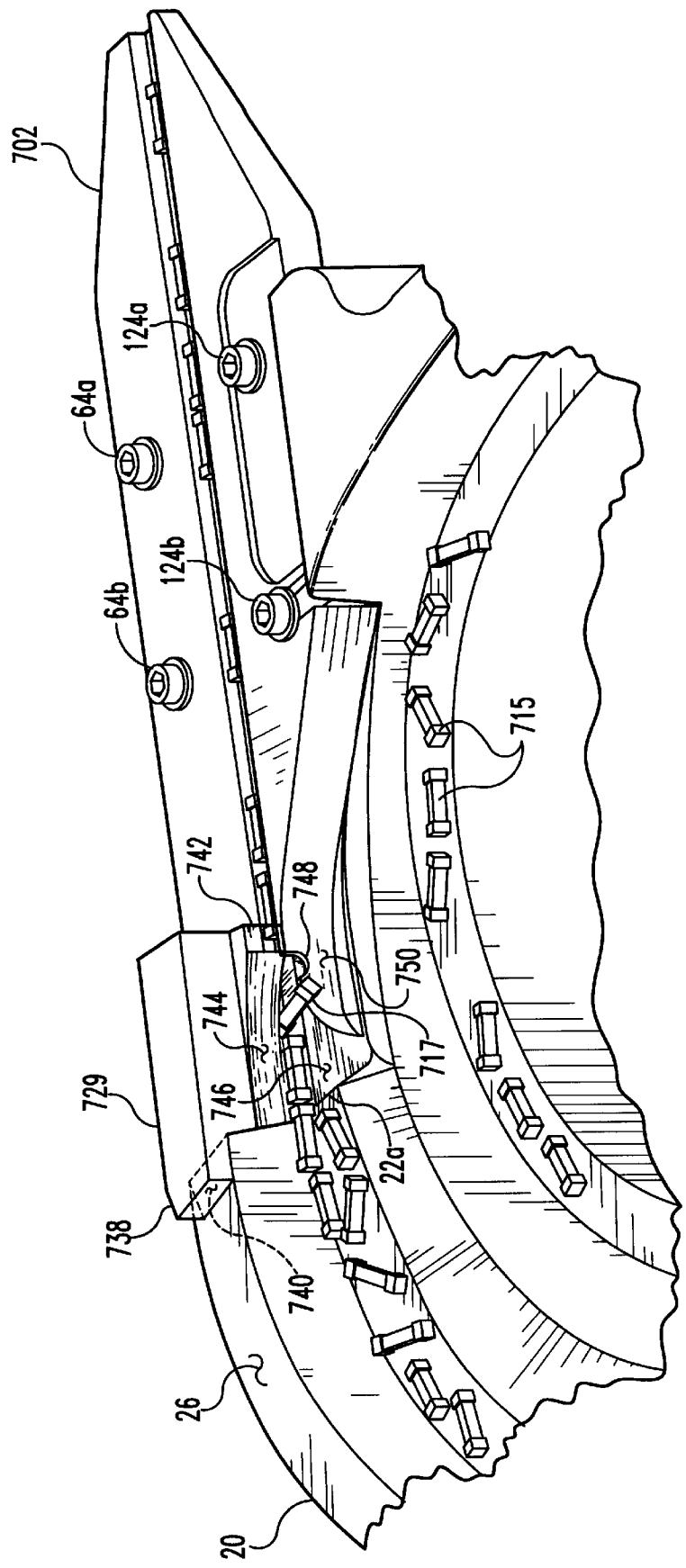
FIG. 26 is a view similar to that of FIGS. 5 and 6 showing further details of the embodiment of FIG. 25.

Referring now to FIG. 26, entrance block 729 includes a clamp member 738 extending therefrom which defines a bottom surface 740 forming a press fit with upper rim 26 of vibratory bowl 20 as entrance block 729 is attached to tooling unit 702 or 752. In this manner, the end of tooling unit 702 or 752 adjacent to parts discharge port 22a is rigidly secured to vibratory bowl 20 as discussed hereinabove.

Entrance block 729 further includes a projection 742 extending therefrom across channel 704 which defines a generally concave vertical surface 744 extending between discharge port 22a and the end of protrusion 742. Tooling unit 702 or 752 further defines a surface 746 adjacent discharge port 22a that is approximately flat, or parallel to channel surface 706b, and further defines a cutout portion 750 adjacent to protrusion 742 of entrance block 729.

Tooling units 702 and 752 are intended to feed and orient parts having a generally flat and rectangular or square configuration such as, for example, chip resistors 715, chip capacitors and the like. As discussed hereinabove with respect to earlier embodiments, flat surface 746 of tooling units 702 and 752, and concave surface 744 of entrance block 729, are each operable to direct misoriented parts 715 back into the interior of vibratory bowl 20. With the tooling unit 702 or 752, parts that are longitudinally aligned with channel 704 are directed by the vibratory action of vibratory bowl 20 onto sloped channel surface 706a. Sloped surface 706a forces properly aligned parts 715, under the action of gravity, against entrance block 729 as the parts 715 are fed deeper into channel 704. Once past projection 742 of entrance block 729, the channel surface 706a slowly transitions to channel surface 706b that is generally parallel to a plane defined by surfaces 28 and 30 of parts orientation member 25.

In the feeding of parts toward channel 704 from discharge port 22a of vibratory bowl 20, it is possible that parts may orient themselves sideways and yet be forced by channel surface 706a against entrance block 729 as illustrated by part 717. In order that such parts do not cause jams, tooling units 702 and 752 include a cutout area 748 from channel surface 706a adjacent to projection 742. Preferably, cutout 748 is configured in a half-moon shape and extends into channel surface 706a only sufficiently to cause a misoriented part such as part 717 to fall, under the action of gravity, back into vibratory bowl 20. Half-moon cutout 748 is thus operable to remove just enough channel surface 706a so that the weight of a misoriented part 717 causes the part to fall back into the interior vibratory bowl 20.

Figure 28:
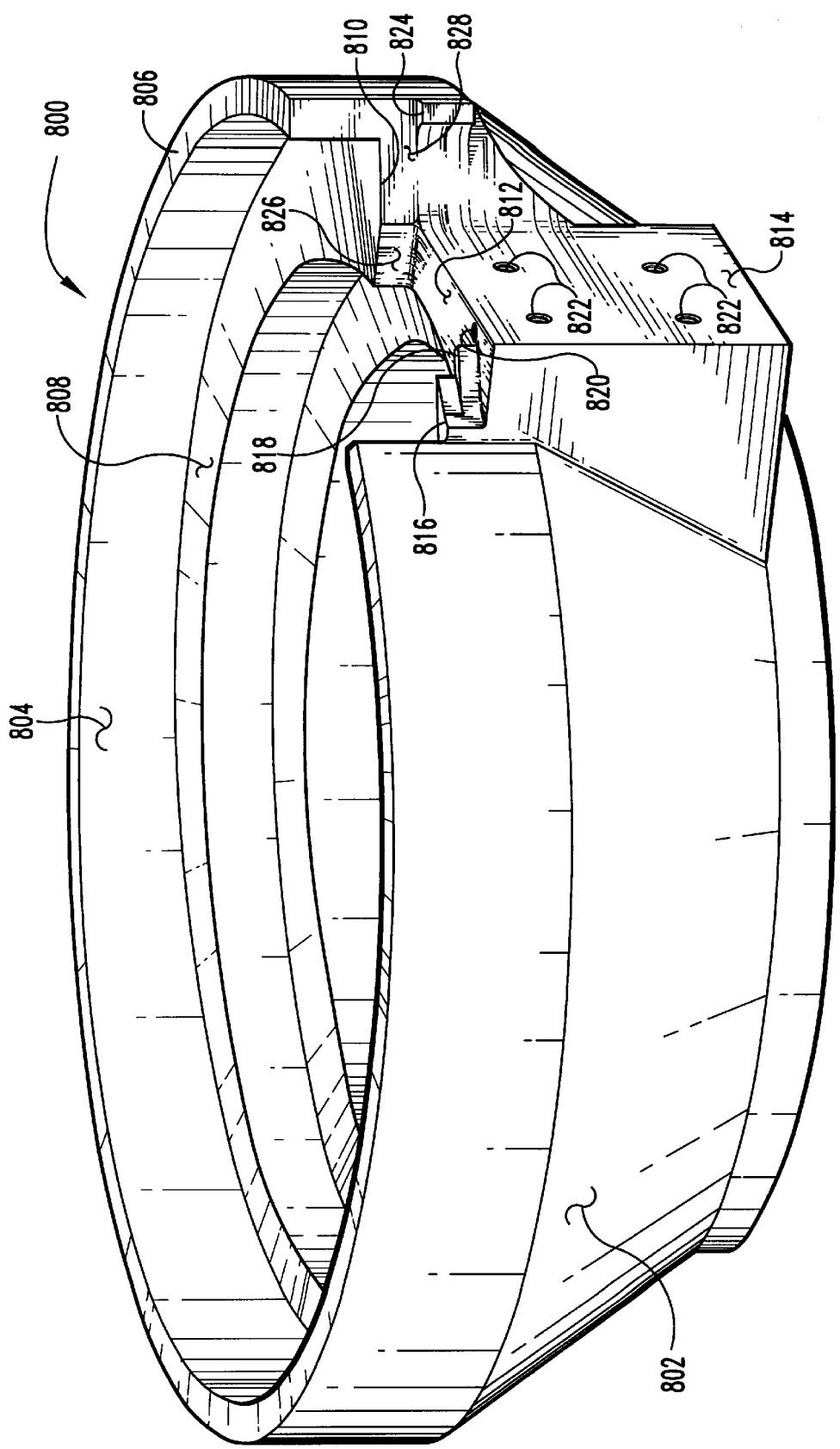
FIG. 28 is a perspective view of another embodiment of a vibratory bowl, in accordance with an aspect of the present invention.

Referring now to FIG. 28, another embodiment of a vibratory bowl 800, in accordance with the present invention, is shown. Vibratory bowl 800 is preferably a polycast bowl, although the present invention contemplates that bowl 800 may be constructed from other suitable materials as is known in the art. Vibratory bowl 800 defines a bowl outer surface 802, an opposite bowl inner surface 804 and an upper rim 806 therebetween. A helical parts transport path 808 is formed along the bowl inner surface 804 and extends from a bowl bottom 830 (FIG. 30) to a parts discharge port 810. Generally vertical walls 826 and 828 extend downwardly away from discharge port 810, wherein wall 826 terminates at a support surface 812 disposed adjacent to the parts discharge port 810. Support surface 812 is preferably substantially parallel to a plane defined by the bowl bottom 830. A plate mounting surface 814 extends downwardly away from support surface 812, and is preferably perpendicular thereto. Bowl 800 further defines a first protrusion 818 extending upwardly from support surface 812 and a second protrusion 816 extending upwardly from protrusion 818. Protrusions 816 and 818 form a stepped member, the purpose of which will be discussed more fully hereinafter.

Within support surface 812, bowl 800 defines a bore 820, which is preferably provided by a threaded insert, such as insert 42a, 42b, 44a or 44b shown and described with respect to FIG. 10, which is molded into surface 812. Plate mounting surface 814 similarly defines a number of bores 822 therein, which are also preferably provided by threaded inserts as discussed hereinabove. While the present invention contemplates that plate mounting surface 814 may define any number of bores 822 therein, four such bores 822 are provided in one preferred embodiment of bowl 800 as shown in FIG. 28. Adjacent to discharge port 810 and below rim 806, bowl 800 defines a projection 824 which extends generally perpendicularly away from vertical surface 828 of bowl 800.

Figure 29:
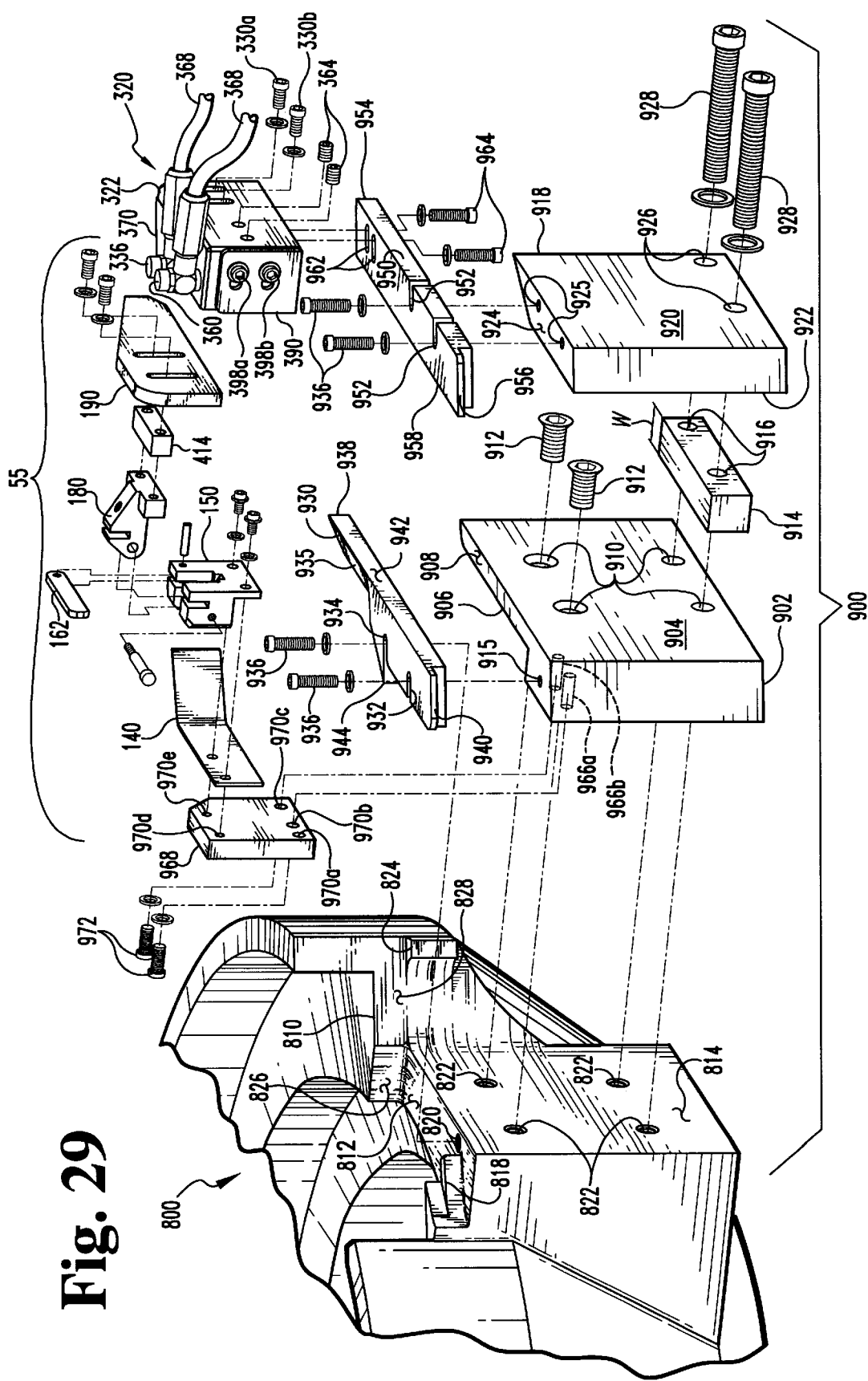
FIG. 29 is an assembly drawing illustrating one embodiment of parts orientation tooling detachably mountable to the vibratory bowl of FIG. 28, in accordance with another aspect of the present invention.

Referring now to FIG. 29, one embodiment of a parts orientation unit 900, detachably mountable to bowl 800, is shown in assembly. As will be more fully described hereinafter, parts orientation unit 900 is detachably mountable to bowl 800 to thereby provide for orientation of a variety of headed parts as described hereinabove. Parts orientation unit 900 includes several components described hereinabove with respect to some of the FIGS. 1–27A, and identical numbers are therefore used to identify these components. Such components will not be described further hereinafter, it being understood that these components serve the same functions as previously described.

Parts orientation unit 900 includes a first support plate 902 defining an outer plate surface 904, an inner plate surface 906 and an edge surface 908 therebetween. Plate 902 defines a number of bores 910 therethrough from outer plate surface 904 to inner plate surface 906 which are aligned with bores 822 defined within plate mounting surface 814. A number of fasteners 912 and 928, preferably threaded, extend through bores 910 into bores 822 to thereby detachably mount support plate 902 to bowl 800 with inner plate surface 906 adjoined with plate mounting surface 814. In one preferred embodiment, fasteners 912 and 928 extend through four such bores 910 defined through support plate 902 which align with four bores 822 extending into plate mounting surface 814 as shown in FIG. 29.

Figure 30:
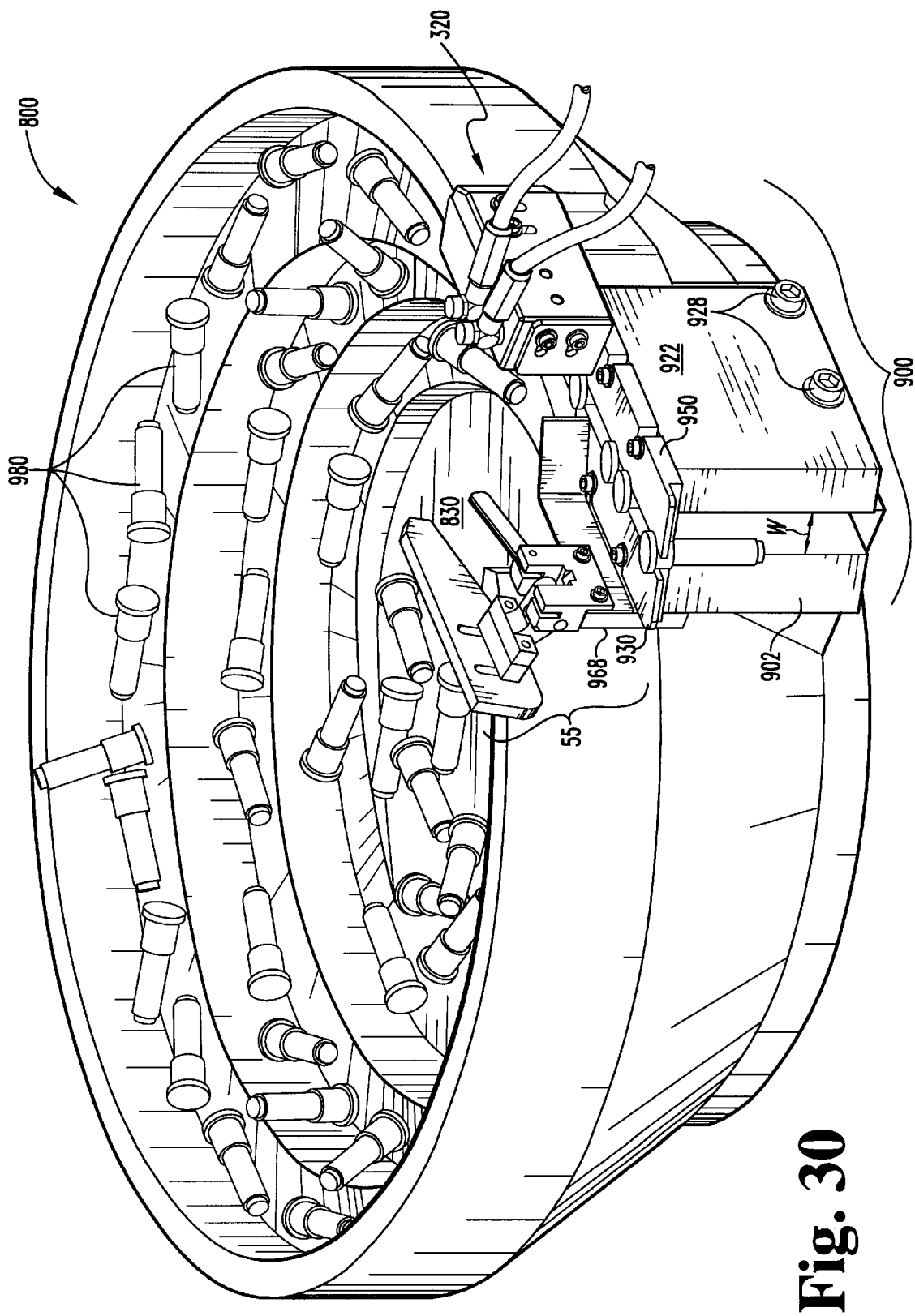
FIG. 30 is a perspective view of the parts orientation tooling of FIG. 29 detachably mounted to the vibratory bowl of FIG. 28.

A spacer block 914 is generally rectangular in shape and defines a number of bores 916 therethrough which are aligned with a corresponding number of bores 910 defined through support plate 902. Preferably, spacer block 914 defines two such bores therethrough which align with the two lower bores 910 of plate 902. A second support plate 918 defines an outer plate surface 920, an inner plate surface 922 and an edge surface 924 therebetween. Second support plate 918 defines a number of bores 916 therethrough from outer plate surface 920 to inner plate surface 922, which are aligned with bores 916 of spacer block 914. Preferably, two such bores 926 are provided which align with two bores 916 of spacer block 914, two lower bores 910 of the first support plate 902 and two lower bores 822 of bowl 800. In assembly, as shown in FIG. 30, fasteners 912 extend through two upper bores 910 of support plate 902 into engagement with two upper bores 822 of bowl 800, and fasteners 928 extend through two bores 926 of support plate 918, through bores 916 of spacer block 914, through two lower bores 910 of support plate 902 and into engagement with two lower bores 822 of bowl 800 to thereby detachably mount support plate 902, spacer block 914 and support plate 918 to vibratory bowl 800. Spacer block 914 has a width, W, which defines a gap, or channel, between support plates 902 and 918 as shown in greater detail in FIG. 30. Preferably, support plates 902 and 926 are sized such that edges surfaces 908 and 924 thereof lie in a common horizontal plane.

Referring again to FIG. 29, parts orientation unit 900 further includes a parts receiving unit which is comprised of a pair of parallel blades 930 and 950 which are detachably mountable to edge surfaces 908 and 924 respectively of support plates 908 and 918. Blade 930 defines a first channel 932 therethrough which aligns with a bore 915 defined in edge surface 908 of support plate 902, and a second channel 934 therethrough which aligns with bore 820 defined in support surface 812 of vibratory bowl 800. Fasteners 936 extend through channels 932 and 934 and into bores 915 and 820 respectively to thereby detachably mount blade 930 to edge surface 908 of support plate 902 and to support surface 812 of vibratory bowl 800. Blade 930 further defines a protrusion 944 extending away from channel 934 which cooperates with protrusion 818 of bowl 800 to maintain a relatively constant surface therebetween, thereby minimizing the likelihood of parts jams and directing misoriented parts back into bowl 800 as discussed hereinabove. When detachably mounted to support plate 902 and support surface 812 of bowl 800, blade 930 defines a first end 938 positioned adjacent to parts discharge port 810 and a second end 940 extending away from parts discharge port 810. Blade 930 further defines an inclined surface 935 adjacent blade end 938 which slopes generally toward support surface 812 of bowl 800 to thereby direct misoriented parts back into bowl 800 (see also FIGS. 32A and 32B).

Blade 950 defines a first pair of channels 952 therethrough which align with corresponding bores 925 defined in edge surface 924 of support plate 918. Fasteners 936 extend through channels 952 and into bores 952 to thereby detachably mount blade 950 to edge surface 924 of support plate 918. Blade 950 further defines a second pair of channels 962 therethrough which align with a corresponding pair of bores 376a and 376b (FIG. 14a) defined in air supply block 322 forming part of parts entrance unit 320. A pair of fasteners 964 extend through bores 962 and into bores 376a and 376b to thereby detachably mount air supply block 322 (and the parts receiving unit 320) to blade 950. When detachably mounted to support plate 918, blade 950 defines a first end 954 positioned adjacent to parts discharge port 810 and a second end 956 extending away from parts discharge port 810. A bottom surface 960 of blade 950 adjacent to first end 954 is, in assembly (FIG. 31), supported by projection 824 of bowl 800.

Figure 31:
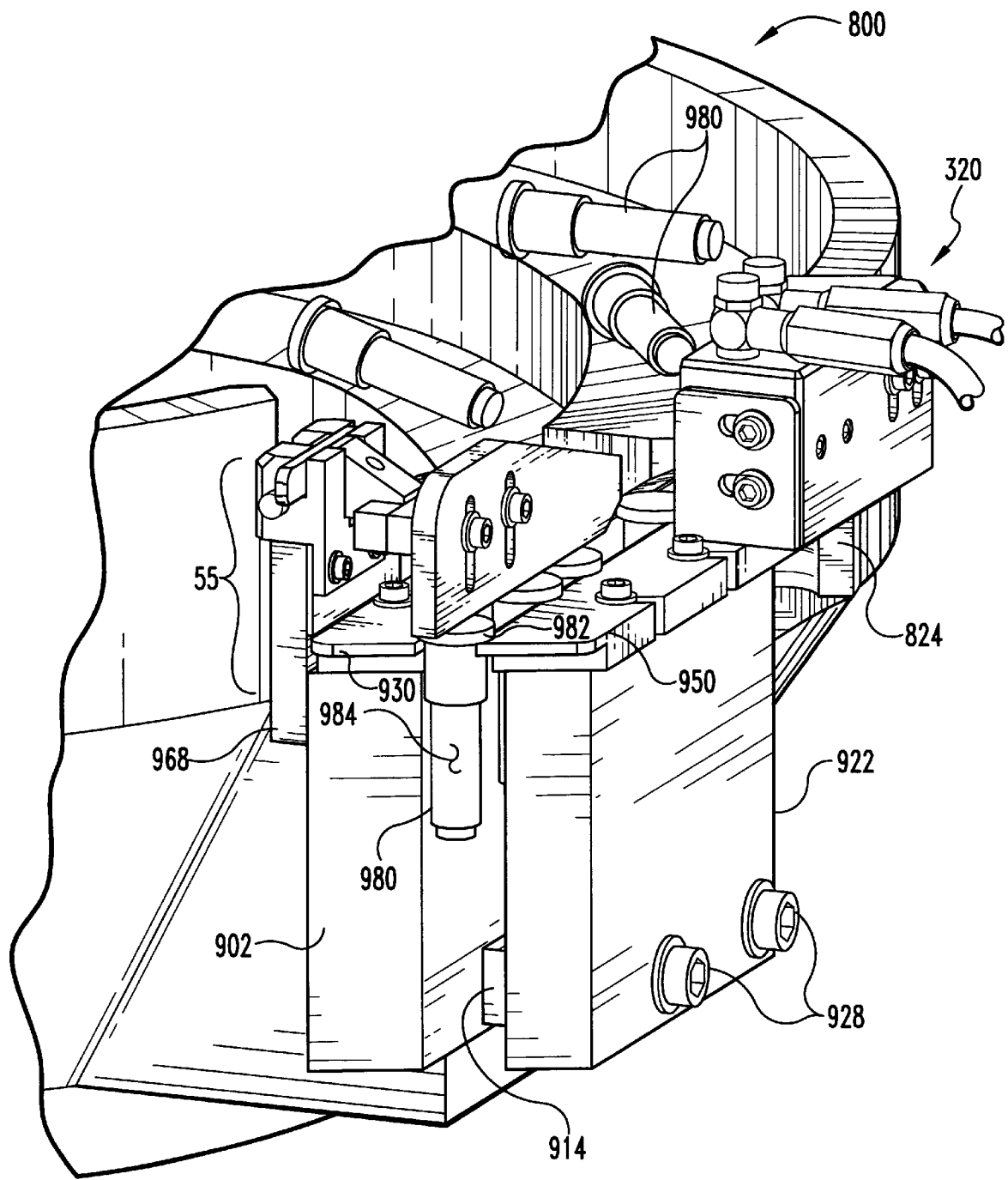
FIG. 31 is a perspective view of the parts orientation tooling of FIG. 30 shown with the parts confinement tooling thereof in a parts confining position.

Blade 930 defines a first channel edge 942, and blade 950 defines a second channel edge 958 which together define a parts orienting channel therebetween. Parts orientation unit 900 includes two mechanisms for adjusting the width of the parts orienting channel defined between channel surfaces 942 and 958. Specifically, spacer block 914, having a width W, provides a rough definition of the width of the channel between blade surfaces 942 and 958, and blades 930 and 950 are further adjustable toward and away from each other via the adjustable positioning of fasteners 936 within channels 932, 934 and 952. Preferably, spacer block 914 defines a maximum width W of the parts orienting channel defined between blade surfaces 942 and 958, and the minimum width of the parts orienting channel is defined by length of channels 932, 934 and 952. It is to be understood that while blades 930 and 950 are shown in FIGS. 29–31 as having a relatively flat configuration, blades 930 and 950 may alternatively be provided with a sloped configuration similar to that shown and described with respect to FIGS. 11 and 12.

Parts entrance unit 320 is identical to that described hereinabove with respect to FIGS. 13–16, and includes air supply block 322 detachably mounted to guide block 370 via fasteners 330a and 330b, and stop plate 390 detachably mounted to air supply block 322 via fasteners 398a and 398b. In a preferred embodiment, of parts orientation unit 900, air supply block includes two air turrets 336 and 360 detachably secured within air supply block 322 via fasteners 364, although the present invention contemplates providing air supply block 322 with only a single air turret or more than two air turrets as described hereinabove with respect to FIG. 14a.

Parts orientation unit 900 further includes a pivotal top confinement apparatus 55, as described hereinabove, detachably mountable to support plate 902 via attachment plate 968. Plate 968 defines a first set of bores 970a–c therethrough adjacent to a lower end thereof, wherein bores 970b and 970c align with bores 966a and 966b defined in support plate 902. Fasteners 972 extend through bores 970b and 970c and into bores 966a and 966b respectively to thereby detachably mount attachment plate 968 to support plate 902. Attachment plate 968 further defines a second set of bores 970d and 970e therethrough adjacent to an upper end thereof, wherein bores 970d and 970e are aligned with corresponding bores defined through deflector 140 and pivot support block 150. A pair of fasteners 972 extend through bores 970d and 970e, through the corresponding bores defined through deflector 140 and into engagement within the corresponding bores defined in pivot support block 150 to thereby detachably mount pivotal top confinement apparatus 55 to attachment plate 968.

As described hereinabove, pivotal top confinement apparatus 55 includes, in the embodiment shown in FIGS. 29 and 30, a deflector 140, pivot support block 150, locking lever 162, pivot block 180, top confinement blade 190 and extension block 414, each interconnected as described hereinabove. Alternatively, deflector 140 may be replaced with deflector 400 (FIG. 16).

Referring now to FIG. 30, parts orientation unit 900 is shown detachably mounted, as described above, to vibratory bowl 800 with pivotal top confinement apparatus 55 shown pivoted away from its parts confining position. Parts orientation unit 900 receives headed parts 980 from parts discharge port 810, and parallel blades 930 and 950 define an adjustable width parts orienting channel therebetween which is operable to orient the parts 980 as shown. Parts 980 having orientations other than that which allows receipt within the parts orientation channel as shown are directed by various components of parts orientation unit 900 back into the vibratory bowl as described hereinabove.

Referring now to FIG. 31, parts orientation unit 900 is shown with pivotal top confinement apparatus 55 pivoted to its parts confining position above the parts orientation channel defined between blades 930 and 950. As described hereinabove, apparatus 55 is pivotable between a first (parts confining) position adjacent to the parallel blades 930 and 950 as shown in FIG. 31 and a second (non-confining) position remote from the parallel blades 930 and 950 as shown in FIG. 30. Headed parts 980 include a headed portion 982 and a shaft portion 984 extending therefrom, wherein the parts orientation channel defined between blades 930 and 950 is adjusted to allow the shaft portions 984 to extend therethrough while supporting the headed portions 982 as shown.

Figure 32B:
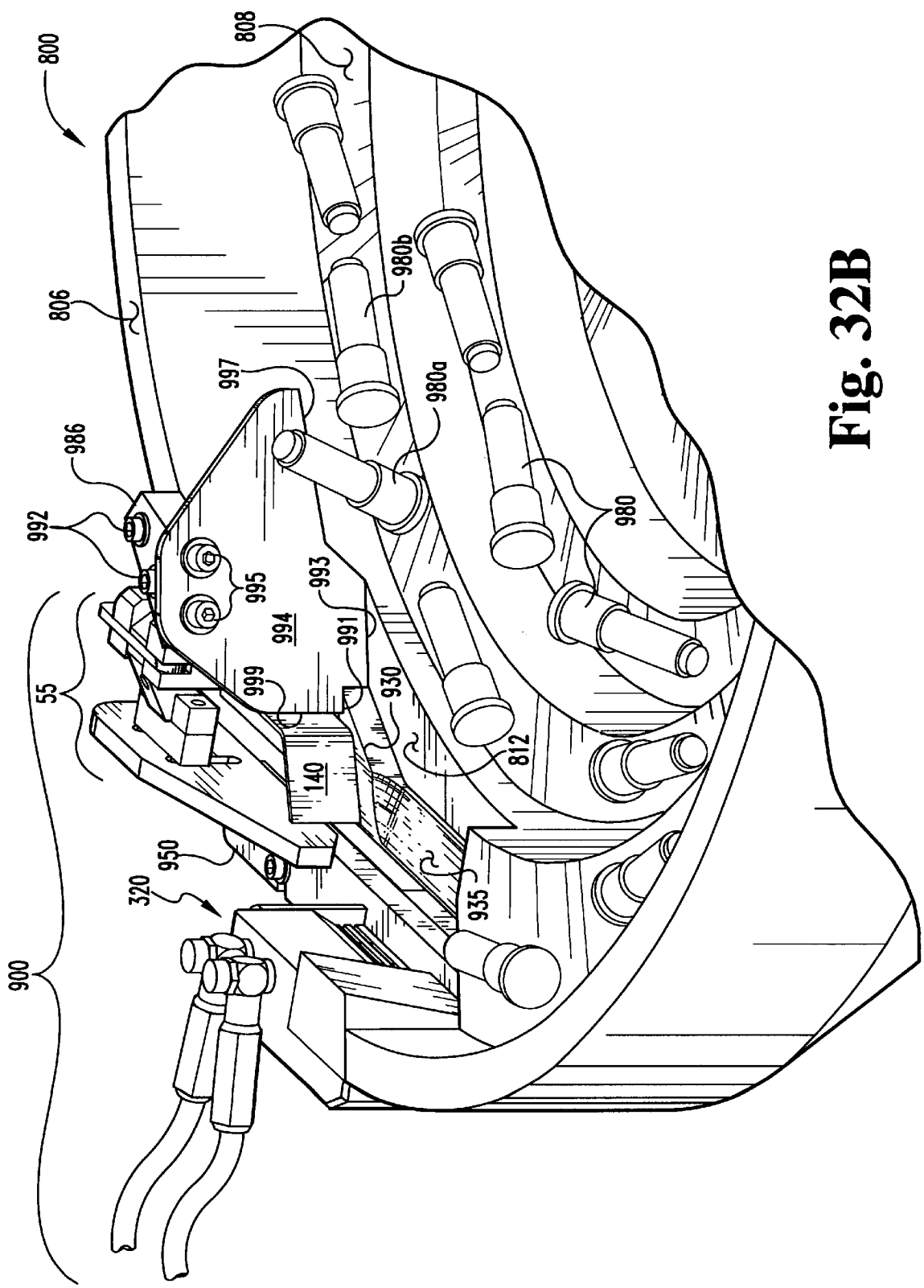
FIG. 32B is a perspective view of the parts orientation tooling of FIGS. 29 and 30 showing the parts sweep assembly of FIG. 32A mounted to the vibratory bowl.

Referring now to FIGS. 32A and 32B, parts orientation unit 900 may further include a parts sweep plate 994 detachably mounted to vibratory bowl 800 adjacent to pivotal top confinement apparatus 55. Parts sweep plate 994 defines a pair of bores 996 therethrough which align with a first pair of bores 998 defined within a sweep mounting member 986. A pair of fasteners 995 extend through bores 996 and into engagement within bores 998 to thereby detachably mount parts sweep plate 994 to sweep mounting member 986. Sweep mounting member 986 further defines a second pair of bores 988 therethrough which align with a corresponding pair of bores 990 defined within the upper edge 806 of vibratory bowl 800. A pair of fasteners 992 extend through bores 988 and into engagement within bores 990 to thereby detachably mount sweep mounting member 986 and parts sweep plate 994 to the upper edge 806 of vibratory bowl 800.

Parts sweep plate 994 is preferably configured complementary to portions of the vibratory bowl 800 and parts orientation unit 900 to thereby minimize the likelihood of parts jamming therebetween. For example, parts sweep plate 994 is mounted to sweep mounting member 986 such that plate 994 is in contact with vertical surface 834 of bowl 800 adjacent to protrusion 818. Parts sweep plate 994 defines a generally vertical edge 999 which, when mounted to member 986, is disposed in contact with deflector 140, and a generally horizontal edge 993 which, when mounted to member 986, is disposed in contact with support surface 812 of vibratory bowl 800. Between edges 993 and 999, parts sweep plate 994 defines a cut-out portion 991 which, when mounted to member 986, is disposed in contact with protrusion 944 of blade 930. As shown in FIG. 32B, parts sweep plate 994 is designed to fit snugly against vibratory bowl 800 and parts orientation unit 900 so that no potential parts jamming locations are formed by the attachment of plate 994 to bowl 800.

Parts sweep plate 994 further defines a sweep edge 997 which serves at least two functions. One function of sweep edge is to knock over headed parts standing on edge, such as part 980a of FIG. 32B, so that the headed parts are transported along helical parts path 808 toward parts discharge port 810 on their side, such as part 980b of FIG. 32B. Another function of sweep edge 997 is to ensure that parts 980 are provided along helical parts path 808 in serial fashion, and is thereby operable to direct at least one of two side-by-side headed parts standing on edge back into the vibratory bowl 800. While sweep edge 997 is shown in FIGS. 32A and 32B as generally angled upwardly from edge 993, those skilled in the art will recognize that sweep edge 997 may be designed to have any desired configuration that is operable to fulfill the parts sweeping functions just described.

Figure 34:
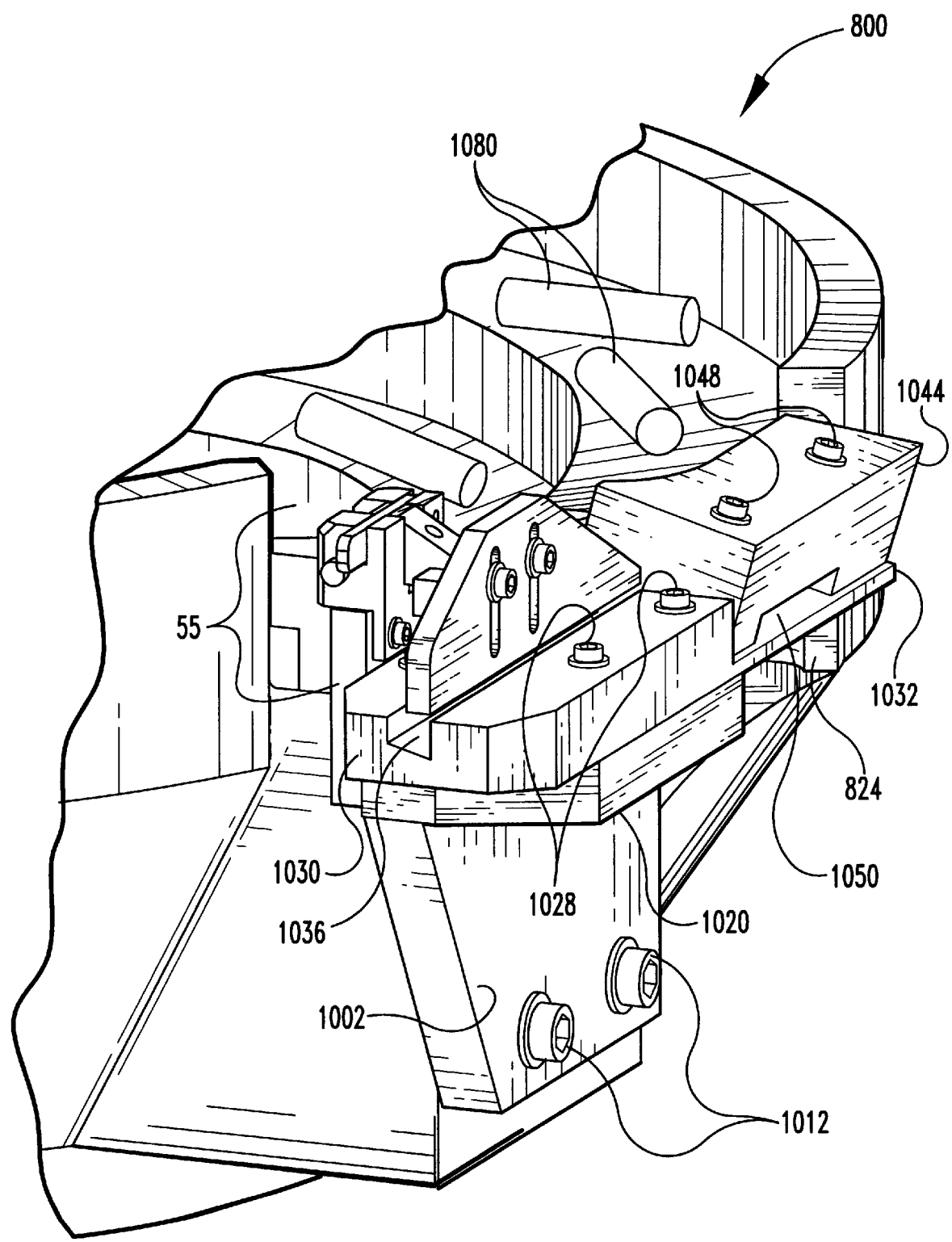
FIG. 34 is a perspective view of the parts orientation tooling of FIG. 33 detachably mounted to the vibratory bowl of FIG. 28 with the parts confining tooling thereof shown in a parts confining position.

Referring now to FIGS. 33 and 34, another embodiment of a parts orientation unit 1000, detachably mountable to bowl 800, is shown in assembly. As will be more fully described hereinafter, parts orientation unit 1000 is detachably mountable to bowl 800 to thereby provide for orientation of a variety of non-headed parts as described hereinabove. As with parts orientation unit 900, parts orientation unit 1000 includes several components described hereinabove with respect to some of the FIGS. 1–27A, and identical numbers are therefore used to identify these components. Such components will not be described further hereinafter, it being understood that these components serve the same functions as previously described.

Parts orientation unit 1000 includes a support plate 1002 defining an outer plate surface 1004, an inner plate surface 1006 and an edge surface 1008 therebetween. Plate 1002 defines a number of bores 1010 therethrough from outer plate surface 1004 to inner plate surface 1006 which are aligned with bores 822 defined within plate mounting surface 814 of vibratory bowl 800. A number of fasteners 1012, preferably threaded, extend through bores 1010 into engagement with bores 822 to thereby detachably mount support plate 1002 to bowl 800 with inner plate surface 1006 adjoined with plate mounting surface 814. In one preferred embodiment, four fasteners 1012 extend through four such bores 1010 defined through support plate 1002 which align with four bores 822 extending into plate mounting surface 814 as shown in FIG. 33.

Parts orientation unit 1000 further includes a parts receiving unit which is comprised of a receiving unit mounting plate 1020 detachably mountable to the edge surface 1008 of the support plate 1002 and a parts orientation member 1030 detachably mountable to the receiving unit mounting plate 1020. Receiving unit mounting plate 1020 defines a number of bores 1016 therethrough which align with a corresponding number of bores 1014 defined within edge surface 1008 of support plate 1002. In one preferred embodiment, four such bores 1016 are defined through receiving unit mounting plate 1020 and four corresponding bores are defined within edge surface 1008 of support plate 1002, although the present invention contemplates providing for any number of such bores through plates 1002 and 1020. In the embodiment shown in FIGS. 33 and 34, four fasteners 1054 are provided which extend through bores 1016 and into engagement within bores 1014 to thereby detachably mount receiving unit support plate 1020 to edge surface 1008 of support plate 1002. Preferably, support plate 1002 and receiving unit mounting plate 1020 are sized such that top surface 1018 of receiving unit mounting plate 1020 is disposed in a common horizontal plane with support surface 812 of vibratory bowl 800 when plate 1002 is detachably mounted to bowl 800 and plate 1020 is mounted to plate 1002 as just described.

Parts orientation member 1030 defines a first top surface 1024, a second top surface 1038 adjacent thereto, and an opposite bottom surface 1040. Top surface 1038 terminates at a first end 1032 of member 1030 and top surface 1024 terminates at a second opposite end 1034 of member 1030. Top surface 1024 defines a parts orienting channel 1036 therein which preferably extends centrally therethrough along an axis parallel to a longitudinal axis of member 1030 defined between ends 1032 and 1034. Channel 1036 is shown in FIGS. 33 and 34 as having a rectangular configuration with a sloped bottom surface, although it is to be understood that channel 1036 may have any of the channel configurations described hereinabove. Those skilled in the art will recognize that parts orientation member 1030 may define a channel 1036 therein having any desired configuration to thereby provide for orientation of any of a variety of part configurations, and that any such desired channel configuration is contemplated by the present invention. Moreover, it is to be understood that parts orientation unit 1030, although shown in FIGS. 33 and 34 as having a relatively flat configuration, may alternatively be provided with a sloped configuration similar to that shown and described hereinabove with respect to FIGS. 20, 23 and 27.

In any event, parts orientation member 1030 defines a number of bores 1028 therethrough from top surface 1024 to bottom surface 1022 on either side of channel 1036. Preferably, member 1030 defines two such bores 1028 on either side of channel 1036 which align with four corresponding bores 1026 defined within top surface 1018 of receiving unit mounting plate 1020, although the present invention contemplates providing any number of bores on either side of channel 1036 as well as a corresponding number of bores within surface 1018. In the embodiment shown in FIG. 33, four fasteners 1035 are provided and extend through bores 1028 and into engagement within bores 1026 to thereby detachably mount parts orientation member to receiving unit mounting plate 1020. When plates 1002 and 1020 and parts receiving unit are mounted to vibratory bowl 800 as just described, a bottom surface 1040 of parts receiving unit 1030 adjacent to end 1032 is supported by protrusion 824 of bowl 800 to thereby provide stability to parts orientation unit 1000 and minimize any vibration thereof independent of the vibratory drive force.

Top surface 1038 of parts orientation member 1030 is preferably sloped perpendicularly away from the longitudinal axis of channel 1036 and defines a pair of bores 1042 therethrough to bottom surface 1040. A parts entrance unit 1044 defines a corresponding pair of bores 1046 therethrough which align with bores 1042 of parts orientation member 1030. A pair of fasteners 1048 extend through bores 1046 and into engagement within bores 1042 to thereby detachably mount parts entrance unit 1044 to top surface 1038 of parts orientation member 1030. As shown in greater detail in FIGS. 35A and 35B, parts entrance unit includes a projection 1052 extending over channel 1036 which defines a generally concave surface 1055 extending in front of channel 1036 adjacent to parts discharge port 810. A bottom surface 1054 of projection 1052 cooperates with channel 1036, top surface 1038 of parts orientation member 1030 and concave surface 1055 of parts entrance unit 1044 to orient and direct parts 1080 (FIG. 34) into channel 1036. Parts 1080 having orientations other than those which allow for entrance into channel 1036 are directed by these same features back into the vibratory bowl 800. It is to be understood that while a specific embodiment of parts entrance unit 1044 is shown in FIGS. 33–36, the actual structure of any particular parts entrance unit depends primarily upon the type and configuration of parts being fed. In this regard, parts entrance unit 1044 may alternatively be appropriately configured to direct the particular parts being fed into the parts orientation member 1030, and may therefore include at least the parts entrance unit configurations illustrated and described with respect to FIGS. 7–9 and 19–27.

Figure 35A:
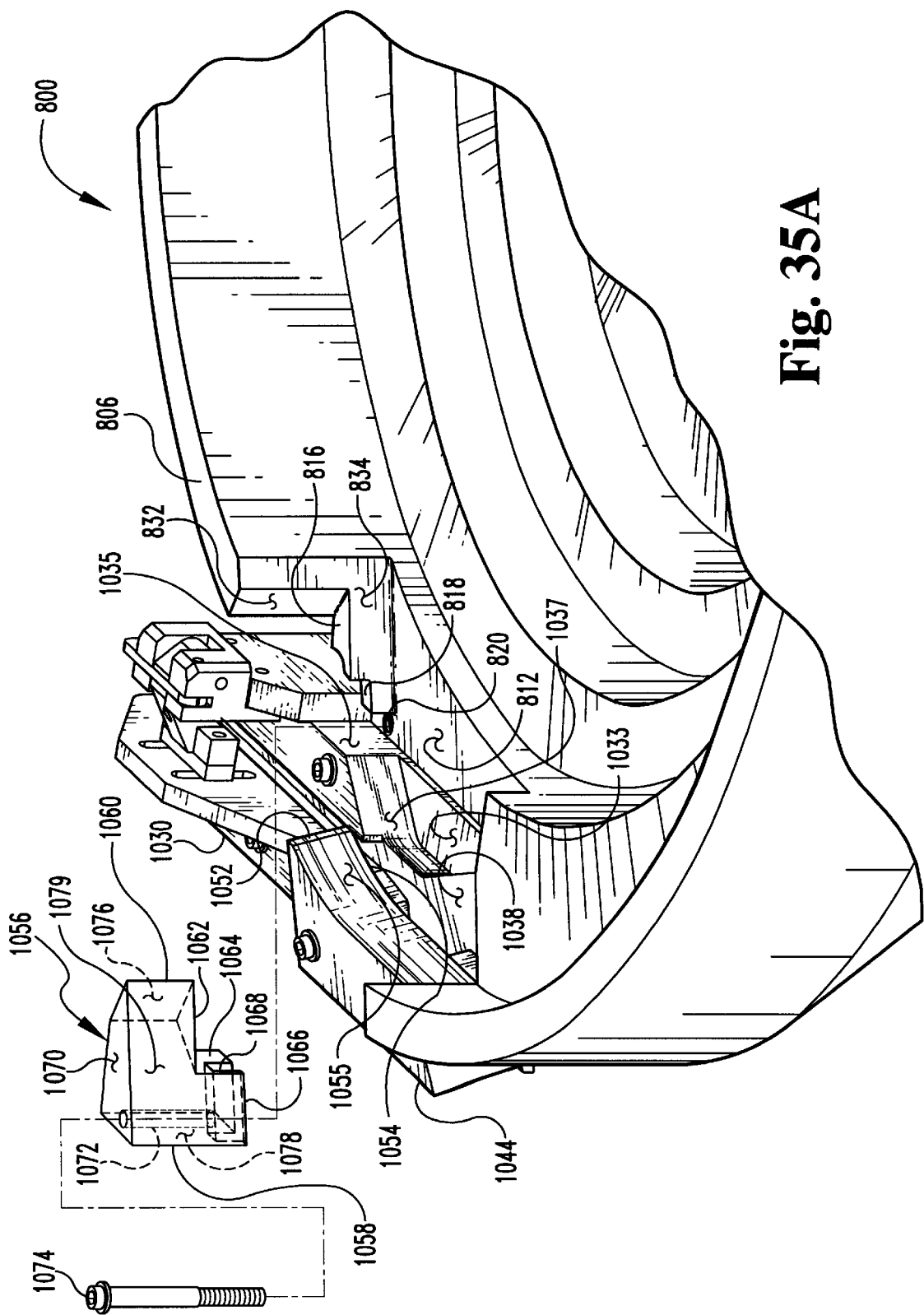
FIG. 35A is a perspective view of the parts orientation tooling and vibratory bowl of FIGS. 33 and 34 showing a parts directing assembly detachably mountable to the vibratory bowl adjacent to the parts orientation tooling.
Figure 35B:
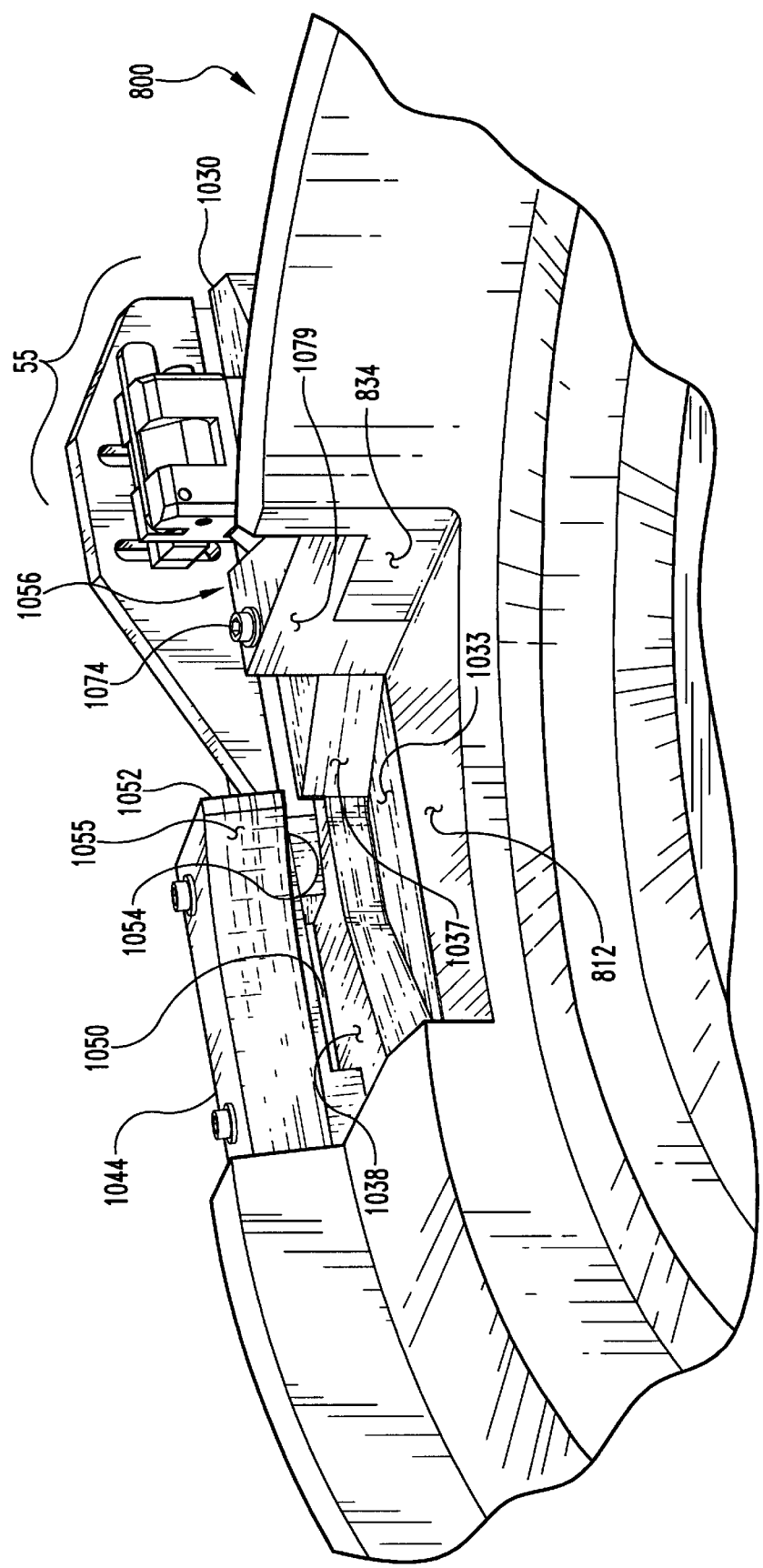
FIG. 35B is a perspective view of the parts orientation tooling and vibratory bowl of FIGS. 33 and 34 showing the parts directing assembly of FIG. 35A detachably mounted to the vibratory bowl.

In one embodiment, parts entrance unit 1044 defines a cut-out portion 1050 in a bottom surface 1051 thereof between bores 1046. When parts entrance unit 1044 is detachably mounted to parts orientation member 1030 as shown in FIGS. 34 and 35B, cut-out portion 1050 defines a scrap chute for directing scrap and other debris out of vibratory bowl 800. The sloped surface 1038 facilitates such scrap and debris removal and further facilitates directing of parts 1080 into channel 1036.

In the embodiment shown in FIG. 33, bores 970a and 970c of attachment plate 968 align with corresponding bores 1022a and 1022b defined within receiving unit mounting plate 1020. Fasteners 972 extend through bores 970a and 970c and into engagement within bores 1022a and 1022b to thereby detachably mount attachment plate 968 to receiving unit mounting plate 1020. It bears pointing out that by providing attachment plate 968 with three suitably positioned bores 970a–c, plate 968 may advantageously be used with both parts orientation units 900 and 1000, thereby reducing the number of unique components required by each.

Parts orientation unit 1000 further includes pivotal top confinement apparatus 55, as described hereinabove, detachably mountable to attachment plate 968 as described with respect to FIGS. 29 and 30. As described hereinabove, pivotal top confinement apparatus 55 includes, in the embodiment shown in FIGS. 33 and 34, a pivot support block 150, locking lever 162, pivot block 180, top confinement blade 190 and extension block 414, each interconnected as described above.

Parts orientation unit 1000 further includes a parts directing member 1056 configured to cover stepped protrusions 816 and 818 of vibratory bowl 800 and provide a surface 1079 (FIG. 35B) which defines a smooth transition between parts orientation member 1030 and an inner surface 834 of the inside of bowl 800 to thereby direct misoriented parts from member 1030 back into the bowl 800. Parts directing member 1056 includes a body portion 1058 and a projection 1060 extending therefrom, wherein projection 1060 defines a wall surface 1076 terminating at a bottom surface 1062 which terminates at a sidewall 1064 of body portion 1058. Body portion 1058 defines a bottom surface 1066 which defines a cut-out portion 1068 approximately centrally therein. Parts directing member 1056 further defines a bore 1072 through a top surface 1070 thereof which extends into cut-out portion 1068, and a back wall 1078 that extends between top surface 1070 and bottom surface 1066. Member 1056 is configured as described to fit over stepped projections 816 and 818 such that bottom surface 1062 covers projection 816, projection 818 is disposed within cut-out portion 1068, wall surface 1076 abuts a wall surface 832 of vibratory bowl 800 extending between upper edge 806 and protrusion 816, and back wall 1078 abuts a sidewall 1035 of parts orientation member 1030 (see FIGS. 33, 35A and 35B). In such a position, bore 1072 is aligned with bore 820 defined in support surface 812 of vibratory bowl 800, and a fastener 1074 extends through bore 1072 into engagement within bore 820 of bowl 800 to thereby detachably mount parts directing member 1056 to bowl 800.

Referring now to FIG. 34, parts orientation unit 1000 is shown detachably mounted, as described above, to vibratory bowl 800 with pivotal top confinement apparatus 55 shown pivoted to its parts confining position over channel 1036. Parts orientation unit 1000 receives non-headed parts, an example of which is illustrated in FIG. 34 as tubular parts 1080, from parts discharge port 810, and parts orientation member 1030 is configured to direct suitably oriented parts into channel 1036.

As with the parts entrance unit 1044 and parts directing member 1056, member 1030 is further configured to direct misoriented parts back into the vibratory bowl 800. Referring, to FIGS. 35A and 35B, parts orientation member 1030 defines a cut-out portion adjacent to inclined surface 1038, wherein the cut-out portion defines a sidewall 1037 which terminates at a surface 1033 that terminates substantially coextensive with support surface 812 of vibratory bowl 800. Preferably, surface 1033 is sloped generally downwardly from wall 1037 to support surface 812. In operation, the cut-out portion just described cooperates with inclined surface 1038 to direct any misoriented parts toward surfaces 1033 and 812 which further direct such misoriented parts back into the bowl 800. As shown in FIG. 35B, sidewall 1037, surface 1079 of parts directing member 1056 and wall 834 of bowl 800 preferably cooperate to provide a substantially uniform surface for directing misoriented parts back into the bowl and thereby minimize any likelihood of creating one or more parts jamming locations.

Referring now to FIG. 36, parts orientation unit 1000 may further include a parts sweep unit comprising sweep plate 1090 and sweep mounting member 986. Sweep mounting member 986 is identical to that described with respect to FIGS. 32A and 32B, and is attached to the edge 806 of bowl 800 via fasteners 992. Like sweep plate 994, sweep plate 1090 defines a pair of bores therethrough (not shown) which align with bores 998 of sweep mounting member 986 and a pair of fasteners 995 extend through the sweep plate bores and into engagement within bores 998 to thereby detachably mount sweep plate 1090 to sweep mounting member 986. Sweep plate 1090 is identical in most respects to sweep plate 994 of FIGS. 32A and 32B, although plate 1090 need not define a cut-out portion therein. Instead, plate 1090 defines a side edge 1092 having a profile complementary to the sidewall 1035 of parts orientation member 1030, and a bottom edge 1094 having a profile complementary to the support surface 812 of vibratory bowl 800. In detachably mounting sweep plate 1090 to sweep mounting member 986, side edge 1092 contacts sidewall 1034 of parts orientation member 1030 adjacent to wall portion 1037, and bottom edge 1094 contacts support surface 812 to thereby form a smooth and approximately integral transition between wall portion 1037 of parts orientation member 1030 and sweep plate 1090, and between support surface 812 and sweep plate 1090.

Sweep plate 1090 further defines a sweep edge 1096 configured to sweep stacked and/or side-by-side non-headed parts back into the bowl 800 to thereby provide for strictly serial transportation of parts along the helical parts path 808. In the case of elongated non-headed parts, sweep edge 1096 is further operable to knock such parts on their side as discussed hereinabove. While sweep edge 1096 is shown in FIG. 36 has being angled upwardly from bottom edge 1094, those skilled in the art will recognize that edge 1096 may be designed to have any desired configuration, which typically depends upon the profile of the parts being fed, to fulfill the sweep function(s) just described.

Figure 37:
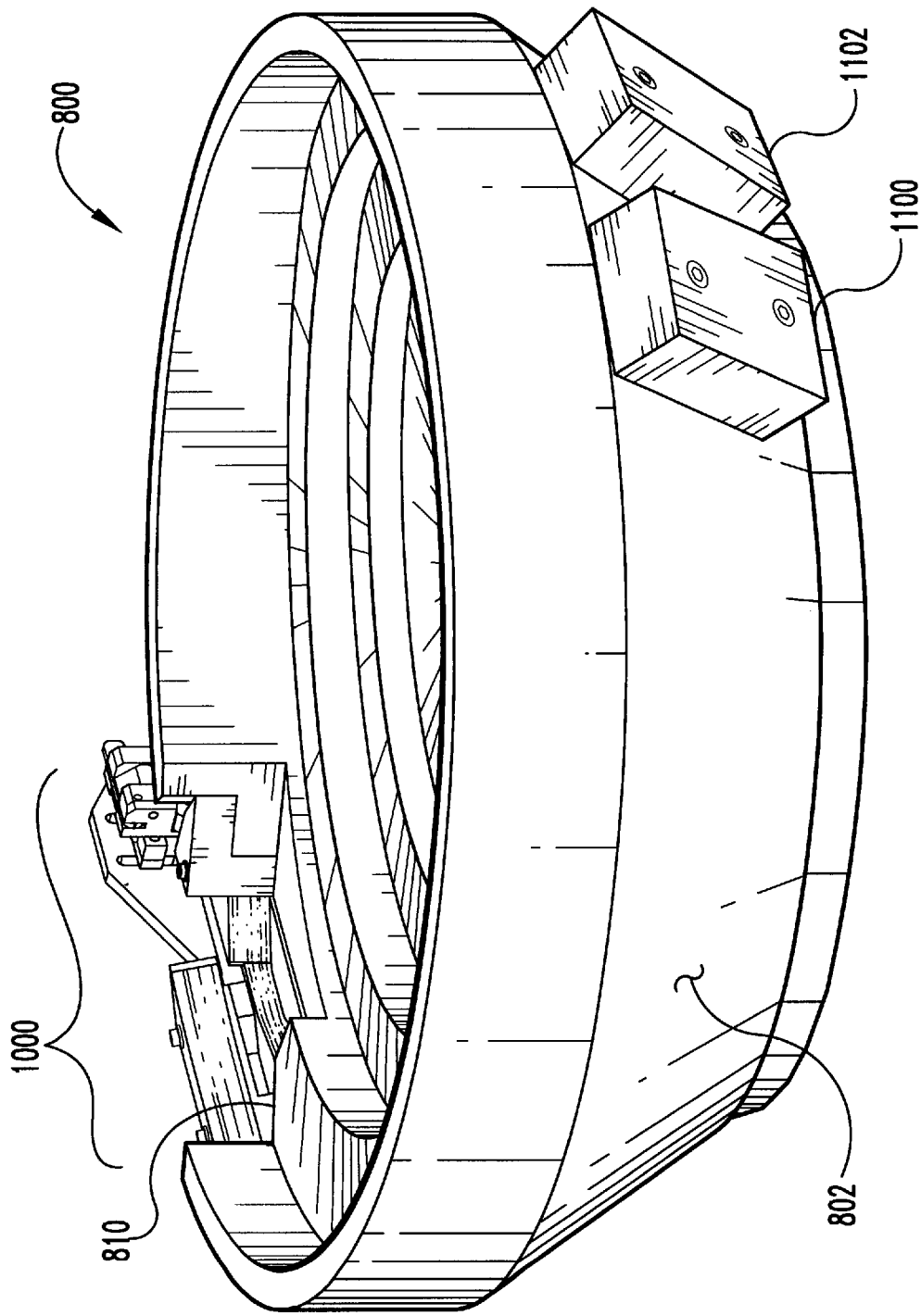
FIG. 37 is a perspective view of the vibratory bowl of FIG. 28 having the parts orientation tooling of FIGS. 33 and 34 detachably mounted thereto, illustrating a counterweight assembly mounted to the bowl opposite the parts orientation tooling.

Referring now to FIG. 37, vibratory bowl 800 may have a number of counterweights attached thereto, in accordance with another aspect of the present invention. While vibratory bowl 800 is illustrated in FIG. 37 as having two such counterweights 1100 and 1102 attached thereto via a suitable attachment mechanism, the present invention contemplates providing for attachment of any number of such counterweights having any desired configuration to an outside surface 802 of bowl 800. In the embodiment shown in FIG. 37, the counterweights 1100 and 1102 are positioned along outside surface 802 of bowl 800 approximately diametrically opposite to a parts orientation unit attached to the vibratory bowl adjacent to the parts discharge port 810. In general, the positions of counterweights 1100 and 1102 along the outside surface 802 of bowl 800 are chosen so as to balance the rotational motion of vibratory bowl 800, which may be otherwise unbalanced due to the attachment of a parts orientation unit thereto adjacent discharge port 810. The combined weight of counterweights 1100 and 1102 should be chosen to be approximately equal to that of the combined weight of all components of the particular parts orientation unit being used (e.g. parts orientation unit 1000 without sweep plate 1090 and sweep mounting member 986 illustrated in FIG. 37). In operation, the total weight of counterweights 1100 and 1102 as well as the positioning thereof along outer bowl surface 802 should be selected so as to offset any unbalancing effects on the rotational motion of bowl 800 resulting from attachment thereto of a parts orienting unit.

Figure 38:
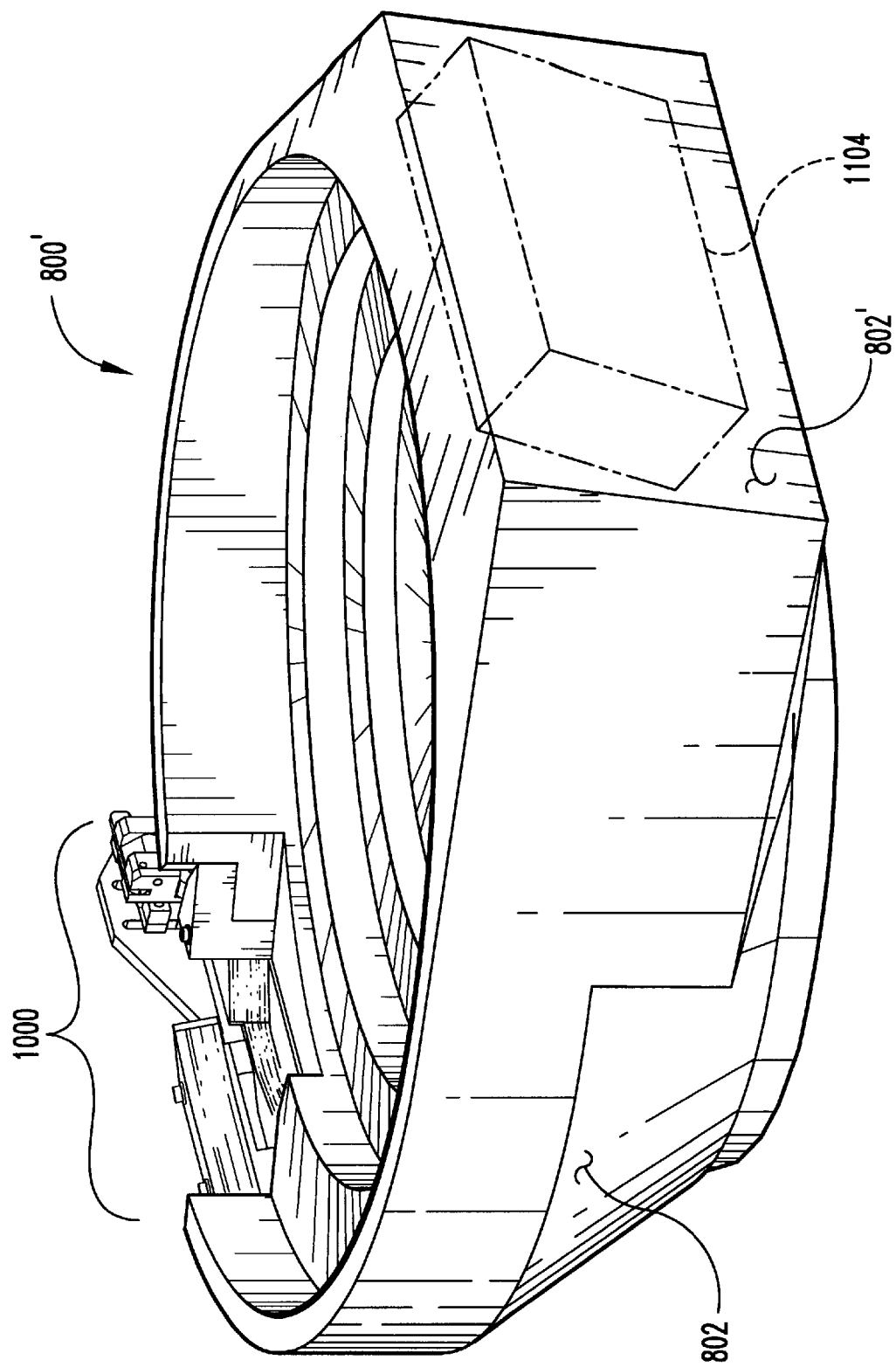
FIG. 38 is a perspective view of another embodiment of a vibratory bowl having the parts orientation tooling of FIGS. 29 and 30 detachably mounted thereto, illustrating a counterweight integrally contained within the bowl opposite the parts orientation tooling, in accordance with yet another aspect of the present invention.

Referring now to FIG. 38, an alternate embodiment of a vibratory bowl 800', in accordance with yet another aspect of the present invention, is shown. Vibratory bowl 800' is identical in many respects to vibratory bowl 800, and differs only in that a portion 802' of outer surface 802 diametrically opposite to the parts orientation unit attachment location is extended outwardly and a counterweight 1104 is positioned therein. Preferably, vibratory bowl 800' is a polycast bowl and counterweight 1104 is cast therein as bowl 800' is formed. The positioning and weight of counterweight 1104 are selected according to the same criteria as discussed hereinabove. It is to be understood that either of the counterweight embodiments illustrated in FIGS. 37 and 38, while described with respect to vibratory bowls 800 and 800', may alternatively be attached to, or cast within, vibratory bowl 20 of FIGS. 1–27, wherein such counterweight(s) must be suitably sized and located along the outer bowl surface to take into account the total weight and positioning of all components of the parts orientation unit.

Figure 39:
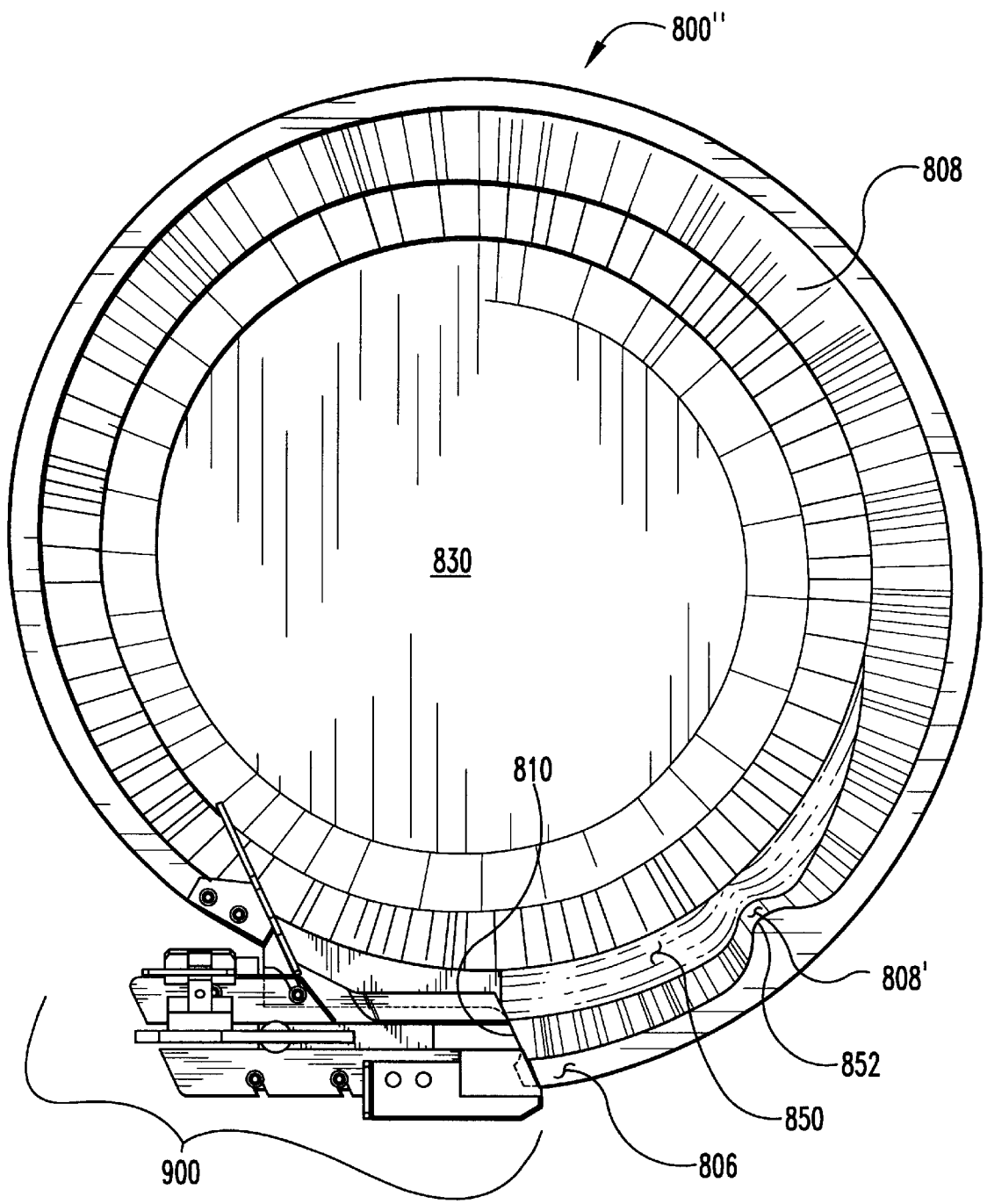
FIG. 39 is a top plan view of yet another embodiment of a vibratory bowl showing an inner wall thereof extending into the helical parts path of the bowl adjacent to a parts discharge port thereof, in accordance with still another aspect of the present invention.

Referring now to FIG. 39, another alternate embodiment of a vibratory bowl 800", in accordance with yet another aspect of the present invention, is shown. Bowl 800" is identical in most respects to bowl 800, and differs only in that the helical parts track 808 is reconfigured near the parts discharge port 810. Specifically, a portion 852 of the sidewall 804 near the discharge port 810 protrudes into the helical parts path 808 to thereby create a bend 808' therein. Preferably, the bend portion 808' of the helical parts path 808 is reduced in width, and a portion of the bowl sidewall 804 beyond and before the bend 808' is configured to slope away from the parts path 808 toward bowl bottom 830.

In the operation of vibratory bowls, it is known that parts may typically be provided to the discharge port 810 of the vibratory bowl at a faster rate than parts are processed through a parts orientation unit, such as unit 900 of FIG. 39. As a result, parts tend to arrange themselves along the parts path 808 adjacent to discharge port 810 in contacting relationship, thereby creating what is known in the art as "back pressure" on the parts being transported through the parts orientation unit and beyond. Such back pressure is undesirable and tends to facilitate formation of parts jams at the exit location of the parts orientation unit and downstream therefrom, as well as creating an opportunity for parts to climb on top of each other and over the top edge 806 of the bowl adjacent to the discharge port 810. The bend 808' formed in parts path 808 and illustrated in FIG. 39 addresses this back pressure concern by diverting some of the parts traveling along path 808 adjacent to the discharge port 810 back into the vibratory bowl 800", thereby relieving some of the back pressure. In general, the number of parts diverted back into the bowl relative to the number of parts continuing toward parts discharge port 810 is dictated by the severity and size of the bend portion 808' of parts path 808, and such a bend 808' may be sized accordingly.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, while only some of the parts orientation tooling units are shown and described herein as defining an end thereof opposite to the end positioned adjacent to the parts discharge port that tapers inwardly toward the parts orientation channel, it is to be understood that any parts orientation tooling unit contemplated by the present invention may be so configured. In some cases, such a tapered configuration may significantly reduce the weight of the parts orientation tooling.

What is claimed is:

1. A parts feeding apparatus for providing oriented parts having common configuration, comprising:
   a vibratory bowl configured to receive a disoriented mass of parts therein and transport said parts toward a bowl discharge port under vibratory action, said bowl defining a number of attachment locations therein adjacent said discharge port;
   a first support plate defining an inside plate surface, an opposite outside plate surface and a first edge surface therebetween, said first support plate defining a first number of bores therethrough from said inside surface to said outside surface thereof aligned with said number of attachment locations, each aligned pair of said first number of bores and said attachment locations receives a fastener therein which detachably mounts said first support plate to said vibratory bowl;
   a parts receiving unit detachably mounted to said first edge surface of said support plate, said parts receiving unit adapted to receive parts having a number of orientations from said discharge port and serially provide said parts with a predetermined orientation; and
   a confining member detachably mounted to said first support plate and operable to confine said parts within said parts receiving unit in said predetermined orientation.

2. The parts feeding apparatus of claim 1 wherein said vibratory bowl defines a protrusion adjacent said discharge port, said protrusion supporting one end of said parts receiving unit.

3. The parts feeding apparatus of claim 1 further including means for directing a stream of pressurized air generally across and above said receiving unit adjacent to said discharge port.

4. The parts feeding apparatus of claim 1 further including a counterweight detachably mounted to an exterior surface of the vibratory bowl at a location generally opposite said receiving unit, said counterweight having a weight approximately equal to a weight of said receiving unit.

5. The parts feeding apparatus of claim 1 wherein said confining member is pivotably attached to said first support plate.

6. The parts feeding apparatus of claim 1 wherein said part receiving unit includes a parts receiving unit mounting plate detachably mounted to said first edge surface of said first support plate, said confining member is pivotably attached to said parts receiving unit mounting plate.

7. The parts feeding apparatus of claim 1 wherein said vibratory bowl is cast from an epoxy resin material.

8. The parts feeding apparatus of claim 1 wherein said vibratory bowl is constructed from a metalic material.

9. The parts feeding apparatus of claim 8 wherein said vibratory bowl is constructed from stainless steel.

10. The parts feeding apparatus of claim 1 wherein said vibratory bowl defines a helical parts transport path adjacent an inner sidewall thereof, said vibratory bowl operable to transport parts along said helical parts path toward said bowl discharge port under vibratory action.

11. The parts feeding apparatus of claim 10 further including a parts sweep detachably mounted to said vibratory bowl adjacent said receiving unit, said parts sweep permitting advancement of only parts having less than a predefined height along said helical parts path.

12. The parts feeding apparatus of claim 1 wherein each of said number of attachment locations includes an attachment member adapted to engage a corresponding fastening member to thereby secure said first support plates to said vibratory bowl.

13. The parts feeding apparatus of claim 12 wherein said vibratory bowl is cast from an epoxy resin material;
   and wherein said attachment members are cast within said vibratory bowl.

14. The parts feeding apparatus of claim 12 wherein said vibratory bowl is constructed from a metalic material.

15. The parts feeding apparatus of claim 14 wherein said vibratory bowl is constructed from stainless steel.

16. The parts feeding apparatus of claim 1 wherein said parts receiving unit includes:
   a receiving unit mounting plate detachably mounted to said first edge surface of said first support plate; and
   a parts orientation member detachably mounted to said receiving unit mounting plate.

17. The parts feeding apparatus of claim 16 wherein said first edge surface of said first support plate defines a second number of bores therein;
   and wherein said receiving unit mounting plate defines a third number of bores therethrough aligned with said second number of bores, each of said second and third number of bores adapted to receive a fastener therein for detachably mounting said receiving unit mounting plate to said first support plate.

18. The parts feeding apparatus of claim 17 wherein said receiving unit mounting plate defines a fourth number of bores therein;
   and wherein said parts orientation member defines a fifth number of bores therethrough aligned with said fourth number of bores, each of said fourth and fifth number of bores adapted to receive a fastener therein for detachably mounting said parts orientation member to said receiving unit mounting plate.

19. The parts feeding apparatus of claim 18 wherein said parts orientation member defines a parts orienting channel therein extending from a first end of said parts orientation member adjacent said discharge port to a second end of said parts orientation member extending away from said discharge port.

20. The parts feeding apparatus of claim 1 further including an entrance block mounted to said receiving unit adjacent the discharge port, said entrance block directing parts having said predefined orientation from said discharge port into said parts receiving unit.

21. The parts feeding apparatus of claim 20 wherein said entrance block defines a scrap chute therethrough, said scrap chute directing material smaller than a predefined size away from the vibratory bowl.

22. A parts feeding apparatus for providing oriented parts having common configuration, comprising:
   a vibratory bowl configured to receive a disoriented mass of parts therein and transport said parts toward a bowl discharge port under vibratory action, said bowl defining a number of attachment locations therein adjacent said discharge port;
   a first support plate defining an inside plate surface, an opposite outside plate surface and a first edge surface therebetween, said first support plate defining a first number of bores therethrough from said inside surface to said outside surface thereof aligned with said number of attachment locations, each aligned pair of said first number of bores and said attachment locations adapted to receive a fastener therein for detachably mounting said first support plate to said vibratory bowl;
   a second support plate defining an outside plate surface, an inside plate surface and a second edge surface therebetween, said second support plate defining a second number of bores therethrough from said inside surface to said outside surface thereof aligned with at least some of said first number of bores, each aligned pair of said first and second number of bores adapted to receive a fastener therein for detachably mounting said first and second support plates to said vibratory bowl;
   a parts receiving unit detachably mounted to said first edge surface of said support plate and said second edge surface of said second support plate, said parts receiving unit adapted to receive parts having a number of orientations from said discharge port and serially provide said parts with a predetermined orientation; and
   a confining member detachably mounted to said parts feeding apparatus and operable to confine said parts within said parts receiving unit in said predetermined orientation.

23. The parts feeding apparatus of claim 22 wherein said parts receiving unit includes:
   a first orientation blade detachably mounted to first edge surface of said first support plate; and
   a second orientation blade detachably mounted to said second edge surface of said second support plate, said first and second orientation blades defining an adjustable width channel therebetween adapted to receive elongated parts therein and provide said elongated parts according to said predefined orientation.

24. The parts feeding apparatus of claim 23 wherein said first orientation blade defines a first channel therethrough generally aligned with a first fastening location defined in said first edge surface of said support plate and a second channel therethrough generally aligned with a second fastening location defined in said vibratory bowl, each of said first and second channels and corresponding first and second fastening locations adapted to receive a fastener therein for securing said first orientation blade to said first support plate and to said vibratory bowl.

25. The parts feeding apparatus of claim 24 wherein said second orientation blade defines third and fourth channels therethrough generally aligned with third and fourth fastening locations defined in said second edge surface of said support plate, each of said third and fourth channels and corresponding third and fourth fastening locations adapted to receive a fastener therein for securing said second orientation blade to said second support plate, said first and second orientation blades adjustably positionable relative to each other to thereby define said adjustable width channel therebetween.

26. The parts feeding apparatus of claim 25 further including a spacer block defining a third number of bores therethrough aligned with said second number of bores defined through said second support plate, said spacer block detachably mounted to said vibratory bowl between said first and second support plates to thereby define a predetermined space therebetween.

27. The parts feeding apparatus of claim 26 wherein said predetermined space defined between said first and second support plates by said spacer block defines a maximum width of said adjustable width channel.

28. A parts feeding apparatus for providing oriented parts having common configuration, comprising:
   a vibratory bowl configured to receive a disoriented mass of parts therein and transport said parts toward a bowl discharge port under vibratory action, said bowl defining a number of attachment locations therein adjacent said discharge port;
   a first support plate defining an inside plate surface, an opposite outside plate surface and a first edge surface therebetween, said first support plate defining a first number of bores therethrough from said inside surface to said outside surface thereof aligned with said number of attachment locations, each aligned pair of said first number of bores and said attachment locations adapted to receive a fastener therein for detachably mounting said first support plate to said vibratory bowl;
   a parts receiving unit detachably mounted to said first edge surface of said support plate, said parts receiving unit adapted to receive parts having a number of orientations from said discharge port and serially provide said parts with a predetermined orientation; and
   a confining member pivotably attached to said parts feeding apparatus, said confining member being pivotable between a first position adjacent said parts receiving unit to confine said parts within said parts receiving unit in said predetermined orientation and a second position remote from said parts receiving unit.

29. The parts feeding apparatus of claim 28 wherein said confining member includes a locking member defining a locked position and an unlocked position, said locking member operable in said locked position to secure said confining member in said first position and in said unlocked position to permit pivoting of said confining member between said first and second positions.

30. The parts feeding apparatus of claim 29 wherein said confining member is pivotably attached to said first support plate.

31. The parts feeding apparatus of claim 29 wherein said part receiving unit includes a parts receiving unit mounting plate detachably mounted to said first edge surface of said first support plate, said confining member is pivotably attached to said parts receiving unit mounting plate.

32. A parts feeding apparatus for providing oriented parts having common configuration, comprising:
   a vibratory bowl configured to receive a disoriented mass of parts therein and transport said parts toward a bowl discharge port under vibratory action, said bowl defining a number of attachment locations therein adjacent said discharge port;

a first support plate defining an inside plate surface, an opposite outside plate surface and a first edge surface therebetween, said first support plate defining a first number of bores therethrough from said inside surface to said outside surface thereof aligned with said number of attachment locations, each aligned pair of said first number of bores and said attachment locations adapted to receive a fastener therein for detachably mounting said first support plate to said vibratory bowl;

a parts receiving unit detachably mounted to said first edge surface of said support plate, said parts receiving unit adapted to receive parts having a number of orientations from said discharge port and serially provide said parts with a predetermined orientation;

a stepped structure defined by said bowl and positioned between said parts receiving unit and an inner surface of said bowl;

a parts directing member detachably mounted to said bowl over said stepped structure, said parts directing member directing misoriented parts into said bowl; and a confining member detachably mounted to parts feeding apparatus and operable to confine said parts within said parts receiving unit in said predetermined orientation.

* * * * *

UNITED STATES PATENT AND TRADEMARK OFFICE
CERTIFICATE OF CORRECTION

PATENT NO : 5,913,428
DATED : June 22, 1999
INVENTOR(S): S. Neal Graham

It is certified that error appears in the above-identified patent and that said Letters Patent is hereby corrected as shown below:

Column 9, line 44, after "angle", insert -- $\alpha$ --.

Column 19, line 26, after "unit", change "So" to --50--.

Signed and Sealed this

Second Day of May, 2000

Attest:

Q. TODD DICKINSON

*Attesting Officer*   *Director of Patents and Trademarks*